US012609817B2

(12) United States Patent　　　(10) Patent No.:　US 12,609,817 B2
Nix　　　　　　　　　　　　　　　　(45) Date of Patent:　　Apr. 21, 2026

(54) SYSTEMS AND METHODS FOR A QUANTUM SAFE CERTIFICATE LEDGER

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 296 days.

(21) Appl. No.: 18/408,108

(22) Filed: Jan. 9, 2024

(65) Prior Publication Data

US 2025/0030540 A1　　Jan. 23, 2025

Related U.S. Application Data

(60) Provisional application No. 63/479,435, filed on Jan. 11, 2023.

(51) Int. Cl.
H04L 9/08　　　(2006.01)
H04L 9/32　　　(2006.01)
H04L 9/40　　　(2022.01)

(52) U.S. Cl.
CPC .......... H04L 9/0852 (2013.01); H04L 9/3247 (2013.01); H04L 63/0861 (2013.01)

(58) Field of Classification Search
CPC .. H04L 9/0852; H04L 9/3247; H04L 63/0861
See application file for complete search history.

(56) References Cited

U.S. PATENT DOCUMENTS

| 10,762,481 | B2 | 9/2020 | Haldenby et al. |
| 11,004,067 | B2 | 5/2021 | Cheng et al. |

| 11,424,911 | B2 | 8/2022 | Narayanaswami et al. |
| 11,449,476 | B2 | 9/2022 | Oberhofer et al. |
| 11,488,176 | B2 | 11/2022 | Padmanabhan et al. |
| 11,544,487 | B2 | 1/2023 | Ebrahimi et al. |
| 11,720,888 | B2 | 8/2023 | Norton et al. |
| 12,401,505 | B2 * | 8/2025 | Nagaraja ............... H04L 63/045 |
| 12,413,389 | B2 * | 9/2025 | Davis ..................... G06Q 20/02 |
| 2021/0367795 | A1 | 11/2021 | Brown et al. |

(Continued)

OTHER PUBLICATIONS

Cooper, et al., "Recommendation for Stateful Hash-Based Signature Schemes", NIST Special Publication 800-208, Oct. 2020.

(Continued)

*Primary Examiner* — Jeffrey C Pwu
*Assistant Examiner* — Paul J Skwierawski
(74) *Attorney, Agent, or Firm* — GrowIP Law Group LLC

(57)　　　　　　ABSTRACT

A quantum safe blockchain system can operate with quantum safe blockchain nodes (QSBN) and validators. A QSBN can generate a pending register certificate transaction comprising a public key, a fingerprint for a certificate, a URL for the certificate, a first registration number for a parent certificate of the certificate, and a digital signature. The QSBN can transmit the pending register certificate transaction to the quantum safe blockchain system. A validator can receive the pending transaction, validate the digital signature using the public key and include a confirmed register certificate transaction in a block. The confirmed transaction can include a second registration number for the certificate. The QSBN can receive the confirmed transaction and store in a database the fingerprint, the first registration number, and the second registration number. The QSBN can generate a pending certificate revocation transaction for the certificate, and transmit the pending transaction to the blockchain system.

20 Claims, 11 Drawing Sheets

(56) References Cited

U.S. PATENT DOCUMENTS

| | | | | |
|---|---|---|---|---|
| 2021/0377049 A1* | 12/2021 | Nix | .................... | H04L 9/0877 |
| 2022/0150073 A1 | 5/2022 | Androulaki et al. | | |
| 2023/0104717 A1 | 4/2023 | Ching et al. | | |
| 2024/0121108 A1* | 4/2024 | Nix | .................... | H04L 9/3249 |
| 2025/0266991 A1* | 8/2025 | Nix | .................... | H04L 9/0852 |

OTHER PUBLICATIONS

Fredriksson, "A Distributed Public Key Infrastructure for the Web Backed by a Blockchain", KTH Royal Institute of Technology School of Computer Science and Communication, Jul. 8, 2017.
Shi Bai et al, "CRYSTALS—Dilithium Algorithm Specifications and Supporting Documentation(Version 3.1)", https://pq-crystals.org/dilithium/, Feb. 8, 2021.
Wikipedia, "NIST Post-Quantum Cryptography Standardization", https://en.wikipedia.org/wiki/NIST_Post-Quantum_Cryptography_Standardization, Nov. 23, 2022.
Wood, "Ethereum: A Secure Decentralised Generalised Transaction Ledgerberlin Version", https://ethereum.github.io/yellowpaper/paper.pdf, Oct. 24, 2022.

* cited by examiner

Figure 1A:
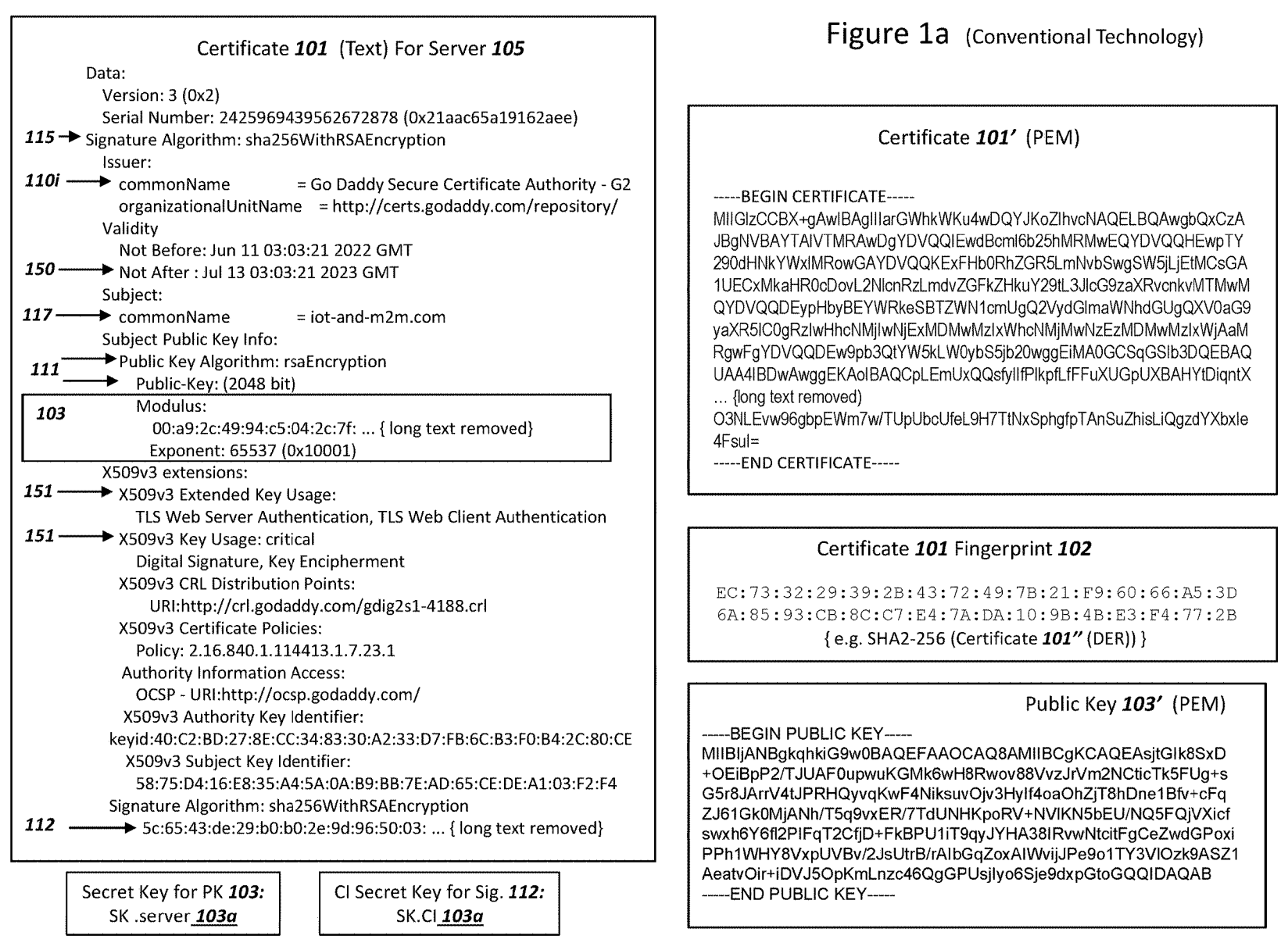

Figure 1a (Conventional Technology)

Certificate 101 (Text) For Server 105

Data:
  Version: 3 (0x2)
  Serial Number: 2425969439562672878 (0x21aac65a19162aee)
115 → Signature Algorithm: sha256WithRSAEncryption
  Issuer:
110i → commonName          = Go Daddy Secure Certificate Authority - G2
       organizationalUnitName = http://certs.godaddy.com/repository/
  Validity
       Not Before: Jun 11 03:03:21 2022 GMT
150 → Not After : Jul 13 03:03:21 2023 GMT
  Subject:
117 → commonName          = iot-and-m2m.com
  Subject Public Key Info:
111 → Public Key Algorithm: rsaEncryption
       Public-Key: (2048 bit)

103   Modulus:
        00:a9:2c:49:94:c5:04:2c:7f: ... { long text removed}
       Exponent: 65537 (0x10001)

X509v3 extensions:
151 → X509v3 Extended Key Usage:
       TLS Web Server Authentication, TLS Web Client Authentication
151 → X509v3 Key Usage: critical
       Digital Signature, Key Encipherment
  X509v3 CRL Distribution Points:
       URI:http://crl.godaddy.com/gdig2s1-4188.crl
  X509v3 Certificate Policies:
       Policy: 2.16.840.1.114413.1.7.23.1
  Authority Information Access:
       OCSP - URI:http://ocsp.godaddy.com/
  X509v3 Authority Key Identifier:
       keyid:40:C2:BD:27:8E:CC:34:83:30:A2:33:D7:FB:6C:B3:F0:B4:2C:80:CE
  X509v3 Subject Key Identifier:
       58:75:D4:16:E8:35:A4:5A:0A:B9:BB:7E:AD:65:CE:DE:A1:03:F2:F4
  Signature Algorithm: sha256WithRSAEncryption
112 → 5c:65:43:de:29:b0:b0:2e:9d:96:50:03: ... { long text removed}

| Secret Key for PK 103: | CI Secret Key for Sig. 112: |
| SK .server 103a | SK.CI 103a |

Certificate 101' (PEM)

-----BEGIN CERTIFICATE-----
MIIGlzCCBX+gAwIBAgIIarGWhkWKu4wDQYJKoZIhvcNAQELBQAwgbQxCzA
JBgNVBAYTAlVTMRAwDgYDVQQIEwdBcml6b25hMRMwEQYDVQQHEwpTY
290dHNKYWxIMRowGAYDVQQKExFhb0RhZGR5LmNvbSwgSW5jLjEtMCsGA
1UECxMkaHR0cDovL2NlcnRzLmdvZGFkZHkuY29tL3JlcG9zaXRvcnkvMTMwM
QYDVQQDEyphHbyBEYWRkeSBTZWN1cmUgQ2VydGlmaWNhdGUgQXV0aG9
yaXR5IC0gRzIwHhcNMjIwNjExExMDMwMzIxWhcNMjMwNzEzMDMwMzIxWjAaM
RgwFgYDVQQDEw9pb3QtYW5kLW0ybS5jb20wggEiMA0GCSqGSIb3DQEBAQ
UAA4IBDwAwggEKAoIBAQCpLEmUxQQsfyliIfPlkpfLfFFuXUGpUXBAHYtDiqntX
... {long text removed}
O3NLEvw96gbpEWm7w/TUpJbcUfeL9H7TtNxSphgfpTAnSuZhisLiQgzdYXbxle
4Fsul=
-----END CERTIFICATE-----

Certificate 101 Fingerprint 102

EC:73:32:29:39:2B:43:72:49:7B:21:F9:60:66:A5:3D
6A:85:93:CB:8C:C7:E4:7A:DA:10:9B:4B:E3:F4:77:2B
{ e.g. SHA2-256 (Certificate 101'' (DER)) }

Public Key 103' (PEM)

-----BEGIN PUBLIC KEY-----
MIIBIjANBgkqhkiG9w0BAQEFAAOCAQ8AMIIBCgKCAQEAsjtGlk8SxD
+OEiBpP2/TJUAF0upwuKGMk6wH8Rwov88VvzJrVm2NCticTk5FUg+s
G5r8JArV4tJPRHQyvqKwF4NiksuvOjv3Hylf4oaOhZjT8hDne1Bfv+cFq
ZJ61GkOMjANh/T5q9vxER/7TdUnHKpoRV+NVIKN5bEU/NQ5FQjVXicf
swxh6Y6fl2PIFqT2CfjD+FkBPU1iT9qyJYHA38IRvwNtcitFgCeZwdGPoxi
PPh1WHY8VxpUVBv/2JsUtrB/rAlbGqZoxAIWvijJPe9o1TY3VIOzk9ASZ1
AeatvOir+iDVJ5OpKmLnzc46QgGPUsjlyo6Sje9dxpGtoGQQIDAQAB
-----END PUBLIC KEY-----

Figure 1B:
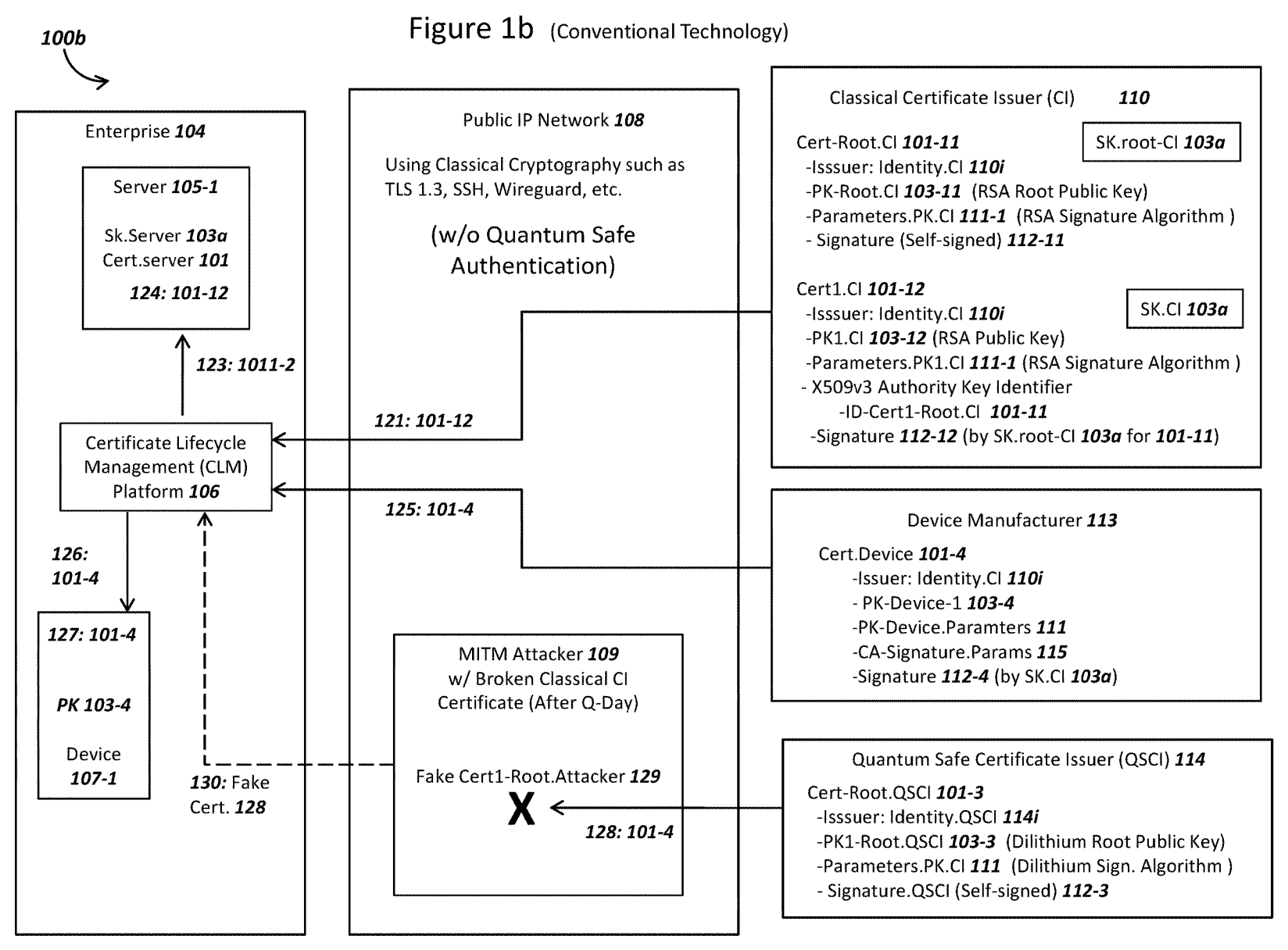

Figure 1b   (Conventional Technology)

Classical Certificate Issuer (CI)   110    [SK.root-CI 103a]

Cert-Root.CI 101-11
- Isssuer: Identity.CI 110i
- PK-Root.CI 103-11 (RSA Root Public Key)
- Parameters.PK.CI 111-1 (RSA Signature Algorithm )
- Signature (Self-signed) 112-11

Cert1.CI 101-12    [SK.CI 103a]
- Isssuer: Identity.CI 110i
- PK1.CI 103-12 (RSA Public Key)
- Parameters.PK1.CI 111-1 (RSA Signature Algorithm )
- X509v3 Authority Key Identifier
  - ID-Cert1-Root.CI 101-11
- Signature 112-12 (by SK.root-CI 103a for 101-11)

Device Manufacturer 113

Cert.Device 101-4
- Issuer: Identity.CI 110i
- PK-Device-1 103-4
- PK-Device.Paramters 111
- CA-Signature.Params 115
- Signature 112-4 (by SK.CI 103a)

Quantum Safe Certificate Issuer (QSCI) 114

Cert-Root.QSCI 101-3
- Isssuer: Identity.QSCI 114i
- PK1-Root.QSCI 103-3 (Dilithium Root Public Key)
- Parameters.PK.CI 111 (Dilithium Sign. Algorithm )
- Signature.QSCI (Self-signed) 112-3

Public IP Network 108

Using Classical Cryptography such as
TLS 1.3, SSH, Wireguard, etc.

(w/o Quantum Safe Authentication)

121: 101-12

125: 101-4

MITM Attacker 109
w/ Broken Classical CI
Certificate (After Q-Day)

Fake Cert1-Root.Attacker 129

X

128: 101-4

Enterprise 104

Server 105-1

Sk.Server 103a
Cert.server 101

124: 101-12

123: 1011-2

Certificate Lifecycle Management (CLM) Platform 106

130: Fake Cert. 128

126: 101-4

127: 101-4

PK 103-4

Device 107-1

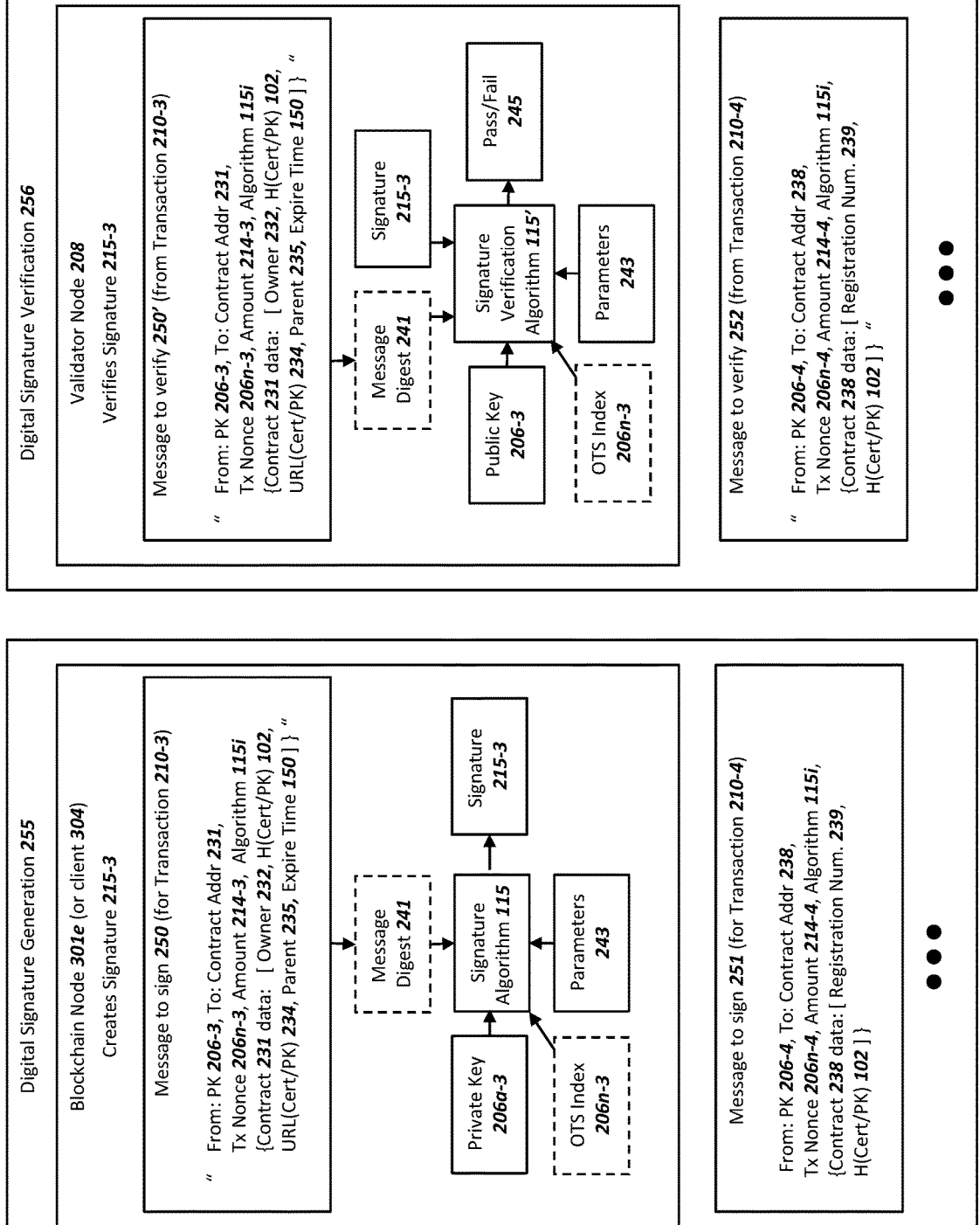

Digital Signature Verification 256

Validator Node 208

Verifies Signature 215-3

Message to verify 250' (from Transaction 210-3)

" From: PK 206-3, To: Contract Addr 231,
Tx Nonce 206n-3, Amount 214-3, Algorithm 115i
{Contract 231 data: [ Owner 232, H(Cert/PK) 102,
URL(Cert/PK) 234, Parent 235, Expire Time 150 ] } "

Message Digest 241

Signature 215-3

Signature Verification Algorithm 115'

Pass/Fail 245

Public Key 206-3

Parameters 243

OTS Index 206n-3

Message to verify 252 (from Transaction 210-4)

" From: PK 206-4, To: Contract Addr 238,
Tx Nonce 206n-4, Amount 214-4, Algorithm 115i,
{Contract 238 data: [ Registration Num. 239,
H(Cert/PK) 102 ] } "

Digital Signature Generation 255

Blockchain Node 301e (or client 304)

Creates Signature 215-3

Message to sign 250 (for Transaction 210-3)

" From: PK 206-3, To: Contract Addr 231,
Tx Nonce 206n-3, Amount 214-3, Algorithm 115i
{Contract 231 data: [ Owner 232, H(Cert/PK) 102,
URL(Cert/PK) 234, Parent 235, Expire Time 150 ] } "

Message Digest 241

Signature Algorithm 115

Signature 215-3

Private Key 206a-3

Parameters 243

OTS Index 206n-3

Message to sign 251 (for Transaction 210-4)

From: PK 206-4, To: Contract Addr 238,
Tx Nonce 206n-4, Amount 214-4, Algorithm 115i,
{Contract 238 data: [ Registration Num. 239,
H(Cert/PK) 102 ] }

Figure 9
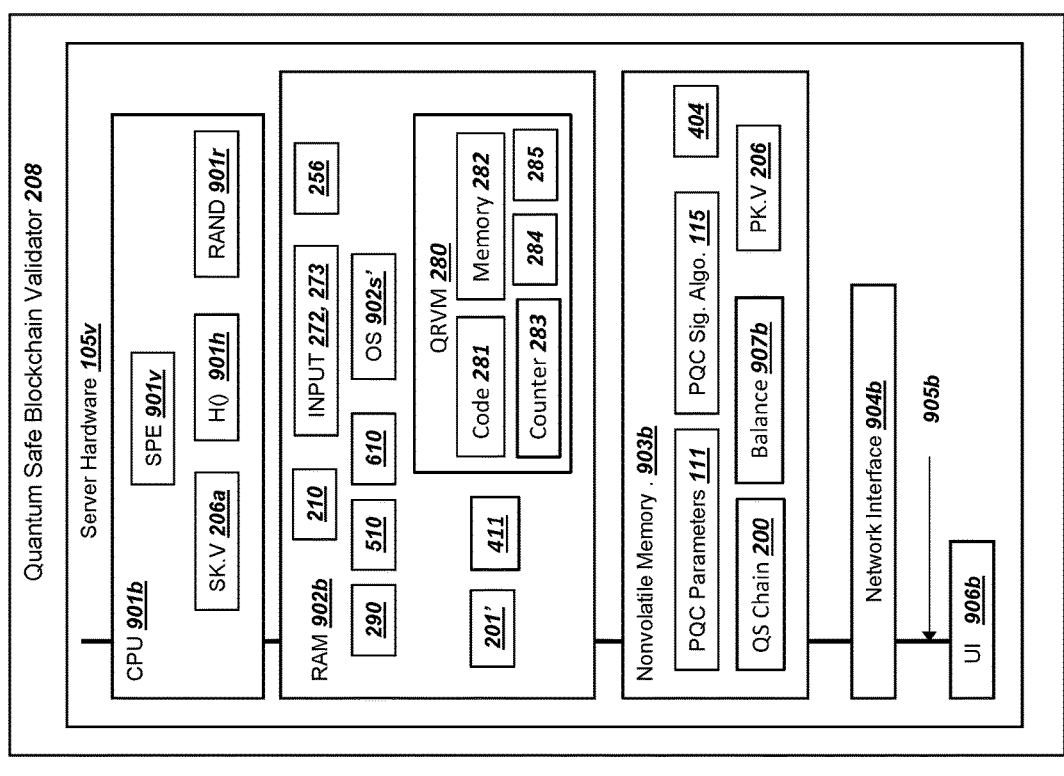
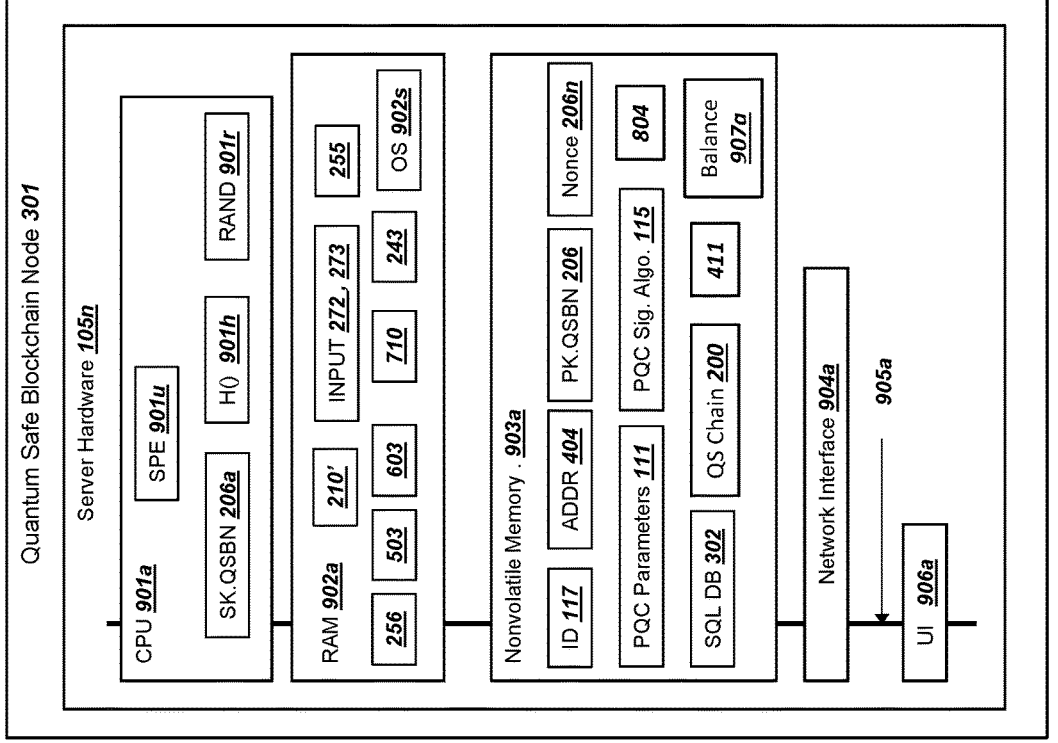

SYSTEMS AND METHODS FOR A QUANTUM SAFE CERTIFICATE LEDGER

CROSS REFERENCE TO RELATED APPLICATIONS

The present application is a U.S. Non-Provisional application which claims priority to U.S. Provisional Application No. 63/479,435, filed Jan. 11, 2023, which is herewith incorporated by reference into the present application.

BACKGROUND

Technical Field

The present systems and methods relate to a quantum-safe distributed ledger system for secure distribution and revocation of X.509 certificates and associated static public keys, and more particularly, a blockchain system for clients and nodes to securely register, receive, and revoke certificates through the use of transactions with smart contracts.

Description of Related Art

A significant portion of authenticated communications over the Public Internet is secured by Public Key Infrastructure (PKI) and the use of X.509 certificates. Examples include Transport Layer Security (TLS), Secure Shell (SSH), IP Security (IPSec), Extensible Authentication Protocol (EAP) and other examples exist as well. These protocols provide both security from encrypting data with a shared secret and authentication of at least one of the communicating parties. Authentication is most frequently achieved through the use of digital signatures and certificates, where at least (i) one party such as a server uses a digital signature algorithm and a private key to generate a digital signature and (ii) the other party such as a client or device uses the corresponding public key to verify the digital signature. The primary algorithms used with digital signatures and the above example protocols as of 2022 are based on RSA and Elliptic Curve Cryptography (ECC) algorithms, although other examples exist as well.

For the past ~30 years, authentication protocols using the Internet have standardized on the use of X.509 certificates, where the primary current standard is version 3. The use of fields and formats of data within X.509 certificates has been standardized by the International Telecommunications Union (ITU) and the Internet Engineering Task Force (IETF), such as the Request for Comments (RFC) 5280 titled "Internet X.509 Public Key Infrastructure Certificate and Certificate Revocation List (CRL) Profile". The standard use of X.509 records (i) a single public key, (ii) parameters and/or algorithms for the single public key, (iii) a digital signature from a certificate issuer or certificate authority for the public key, (iv) algorithms used to generate the digital signature, as well as (v) an identifier of a parent certificate or public key that can be used to verify the digital signature. The X.509 certificate structure is deeply embedded in most layers of software and firmware throughout the Internet, and would be relatively difficult and costly to modify the existing certificate structure for most applications.

Although the use of RSA and ECC digital signature algorithms are included in many different protocols and standards, quantum computers are expected to be able to solve both (i) the elliptic curve discrete logarithm problem (for ECC algorithms) and (ii) the integer factorization problem (for RSA algorithms) in polynomial time, while classical computers solve the problem in exponential time. As of early 2020, estimates for the number of logical qubits required to break a 256 bit ECC public key with Shor's algorithm to determine the private key with a reasonable computation time are approximately 2000-4000 logical qubits. Estimates for the number of qubits required to break a 3072 bit RSA based PKI public key to determine the private key are approximately 4000-8000 logical qubits, also with Shor's algorithm. In late December, 2022, a group from China published a paper titled "Factoring Integers with Sublinear Resources on a Superconducting Quantum Processor", which received significant industry press coverage. Using Schnorr's factoring algorithm, a noisy, intermediate scale quantum (NISQ) computer with only ~372 physical qubits can factor an RSA-2048 public key, although the running time still may not be practical until further improvements are made.

Using the well-established Shor's algorithm, industry projections of the required number of qubits for operating quantum computers shows this number of qubits could be available for a computing device in approximately 5 to 10 years and likely within 15 years. However, a comprehensive change across the Internet of digital signature algorithms from RSA or ECC algorithms to entirely new and relatively unproven but "quantum safe" post-quantum cryptographic algorithms will also likely require more than a decade. Alternatively, if using Schnorr's algorithm presented in the December 2022 paper mentioned in the paragraph above proves practical and also with sufficient speed, then RSA-2048 risks being broken by a quantum computer before the end of 2027. In any case, networks and computers connected to the public Internet should begin updating authentication and related certificate infrastructure in the next few years.

The National Institute of Standards and Technology (NIST) is currently conducting a project for Post-Quantum Cryptography Standardization. The field of post-quantum cryptography continues to develop with proposed algorithms currently undergoing revisions for standardization as of November 2022. In general, the leading candidates for post-quantum cryptography digital signature algorithms propose using lattice or hash-based, algorithms. These proposed algorithms are described by the Wikipedia article for "Post-Quantum Cryptography" dated Nov. 23, 2022, which is hereby incorporated by reference. NIST announced selected algorithms in July of 2022, and complete standards for quantum-safe cryptographic algorithms are expected to be published around 2024.

The transition from classical cryptography to post-quantum cryptography will require relatively rapid migration for the X.509 PKI certificate infrastructure that secures most communications over the Internet today. Server X.509 Certificates are the foundation of most authentication algorithms and many communication protocols, including TLS/HTTPS, code signing, 5G networks, document signing, embedded SIMs, and the Matter standard. In addition, shared public keys without certificates, such as PEM files are frequently used for other protocols including SSH, Wireguard, IPSec, and securing communications for the "Internet of Things". All of the above will need to transition from classical cryptography with RSA/ECC to PQC within the next 5-10 years.

"Q-day" can be referred to as the day when quantum computers can break classically secure public keys. Protocols such as TLS are no longer secure when a widely shared root certificate can be broken. A conservative estimate for the arrival of Q-day is 2032. For example, the BSI of the German Federal Government "acts on the working hypothesis that cryptographically relevant quantum computers will be available in the early 2030s". Assuming Q-day arrives by 2032 (conservative estimate), 52% of the Windows certificate store for Windows 10 PCs in 2022 expire after Q-Day. Revoking pre-installed root/CA certificates has large costs, security issues, and often very poor experiences for end-users. Alternative operating systems such as Android, and Apple IoS would have similar levels of root certificates that expire after Q-day. An "aggressive" estimate for the arrival of Q-day could be sooner than 2027 if recent progress such as with Schnorr's algorithm continues to accelerate.

The arrival of Q-day will result in very large increases in X.509 certificate revocation over many years. Whenever a root/CA certificate is revoked, every single child/grandchild/ etc. certificate should also be revoked. However, current standards for certificate revocation are either (i) weak (from time delays), or (ii) not even implemented. For example, the options for web browsers to check for certificate revocation are through using either (i) a "Certificate Revocation List" (CRL) and/or (ii) Online Certificate Status Protocol (OCSP). A 2022 report from APNIC noted (i) "CRLs are typically not used by end clients when setting up a TLS session", (ii) for OSCP, "a revoked certificate is only detected by some 21% of the client population", and (iii) for OSCP stapling, "stapling OCSP adds nothing to the outcome of revocation checking beyond OCSP queries." In summary, "the situation points to the uncomfortable conclusion that as far as the security of the Internet is concerned, we are still placing undue reliance on a security framework that, at best, offers same week service in a nanosecond world." A need exists in the art for fast and accurate checks of certificate revocation status as Q-day approaches. With current, commercially used technology, only a certificate issuer or certificate authority can revoke a certificate, while an end-user such as a website operator may need to revoke their certificate. A need exists in the art for an end-user to revoke their own certificate in a standard and secure way that can readily be checked by web browsers.

After Q-day, the secure distribution of PQC root/CA certificates through a network secured by ECC/RSA becomes a major problem. A root/CA PQC certificate may be by endpoints in order to securely authenticate using PQC. But, if the root/CA PQC certificate is distributed through legacy communications such as TLS 1.3 (protected by insecure algorithms such as RSA/ECC after Q-day), the PQC certificate cannot be fully trusted. In other words, once an existing RSA/ECC CA certificate or root certificate can be broken by a quantum computer, a "man-in-the-middle" imposter could operate between a client and a server with a fraudulent server certificate (since the parent CA certificate could be broken). This means, a PQC certificate could no longer be securely received through the legacy communications channel such as TLS. In turn, this creates a very significant security problem for clients and servers that still operate with only TLS 1.3/1.2 after Q-day, since they cannot securely receive a PQC CA certificate through the legacy communications channel. A need exists in the art for endpoints after Q-day to be able to securely receive PQC CA certificates through a legacy network protected by insecure algorithms such as RSA and ECC.

Many other examples exist as well for needs in the art for the secure use of two digital signature algorithms for the establishment of secure sessions over packet switched networks and the Internet, and the above are examples are just a few and intended to be illustrative instead of limiting.

SUMMARY

A quantum safe blockchain system can operate with quantum safe blockchain nodes (QSBN) and validators. The blockchain system can support a quantum safe virtual machine (QSVM) for the execution of transaction with smart contracts. A blockchain network can comprise a plurality of the QSBN and validators, where validators confirm and execute transactions and propose blocks for the blockchain network. The blockchain system can support at least a Register Certificate/Public Key transaction and an Owner Revoke Certificate/Public Key transaction, where each transaction includes a corresponding contract address for receiving pending transactions with input data. The pending transactions can use a digital signature algorithm that supports post-quantum cryptography such as stateful hash-based algorithms or lattice-based algorithms.

A QSBN can receive data for an X.509 v3 certificate, such as a certificate for a web server supporting TLS, a certificate issuer certificate used to sign child certificates, and other possibilities exist as well. A QSBN could also receive a static public key for use with protocols that depend on public keys and not certificate, such as with Wireguard. The description below within this summary will focus upon transactions and data for certificates, but the equivalent steps are applicable for static public keys. The QSBN can generate a fingerprint comprising a secure hash value for the certificate. The QSBN can also receive from a first network a uniform resource locator where the certificate can be downloaded. The QSBN can include a PQC private key and public key, and generate digital signatures for blockchain transactions using the PQC private key. The QSBN can also receive from the network a registration number for the parent certificate of the certificate, where a digital signature within the certificate can be verified by a public key for the parent certificate.

The QSBN can generate a pending register certificate transaction comprising the public key, the fingerprint for the certificate, the URL for the certificate, a first registration number for a parent certificate of the certificate, and a digital signature over the transaction data, where the digital signature was generated using the private key and the PQC digital signature algorithm. The recipient or destination for the pending transaction can be a smart contract address. The smart contract can execute bytecode or opcodes in order to process the transaction. The QSBN can transmit the pending register certificate transaction to the quantum safe blockchain network. The plurality of QSBN and validators for the network can communicate in a peer-to-peer manner and the pending register certificate transaction can be received by substantially all the nodes in the network within a few seconds.

A validator can receive the pending transaction, validate the digital signature using the public key and include a confirmed register certificate transaction in a block. The validator can operate with QSVM with contract code that executes in the QSVM in order to process the pending transaction as well as other transactions for other smart contracts. Upon successful execution of the pending register certificate transaction by the validator, the validator can propose a block with the confirmed register certificate transaction. The confirmed register certificate transaction can include all of the data for the pending register certificate transaction, but with the additional data for a block such as within a block number and also having a block transaction number for the confirmed register certificate transaction. The validator can propose the block and other validators or nodes can vote on the proposed block and when a majority of nodes approve of the block then the block can be confirmed. The confirmed transaction can include a second registration number for the certificate.

A second network with a second QSBN on the blockchain network can receive the confirmed block with the confirmed register certificate transaction. An SQL database connected to the second QSBN can receive the confirmed register certificate transaction data from the confirmed block and store data such as the fingerprint, the URL, and the parent certificate registration number in database tables. HTTP/S clients connected to the second network and SQL database can receive the certificate from a server over a non-quantum safe communications channel, such as a session implemented with the TLS v 1.3 protocol. After Q-day, or the day when quantum computers can feasibly break RSA keys that are cryptographically relevant, the use of TLS v 1.3 to receive a server certificate (such as the certificate for the pending register certificate transaction) can be insecure. An attacker or imposter could conceivable forge the certificate.

Using the blockchain system and blockchain network, the HTTP/S client can calculate a fingerprint for the received certificate from the TLS v 1.3 session. The HTTP/S client can query the SQL database for the URL of the certificate based upon the fingerprint. The HTTP/S client can also independently download the certificate using the URL and calculate the fingerprint of the downloaded certificate. If the calculated fingerprint for the downloaded certificate matches the calculated fingerprint for the received certificate from the TLS v 1.3 session, then the HTTP/S client can determine that the certificate received in the TLS session is secure. The QSBN can also later generate a pending certificate revocation transaction for the certificate, and transmit the pending transaction to the blockchain system.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1a is a graphical illustration of an X.509 certificate, a certificate fingerprint, and a public key, in accordance with conventional technology and exemplary embodiments;

FIG. 1b is a graphical illustration of an exemplary system for computers to receive certificates over the Internet, in accordance with conventional technology and exemplary embodiments;

FIG. 2b is a flow chart illustrating exemplary steps for digital signature generation and digital signature verification using PKI keys, parameters, and data input, in accordance with exemplary embodiments;

FIG. 9 is a graphical illustration of hardware, firmware, and software components for a quantum safe blockchain node and a quantum safe blockchain validator, in accordance with exemplary embodiments.

DETAILED DESCRIPTION OF EXEMPLARY EMBODIMENTS OF THE INVENTION

FIG. 1a

Figure 2A:
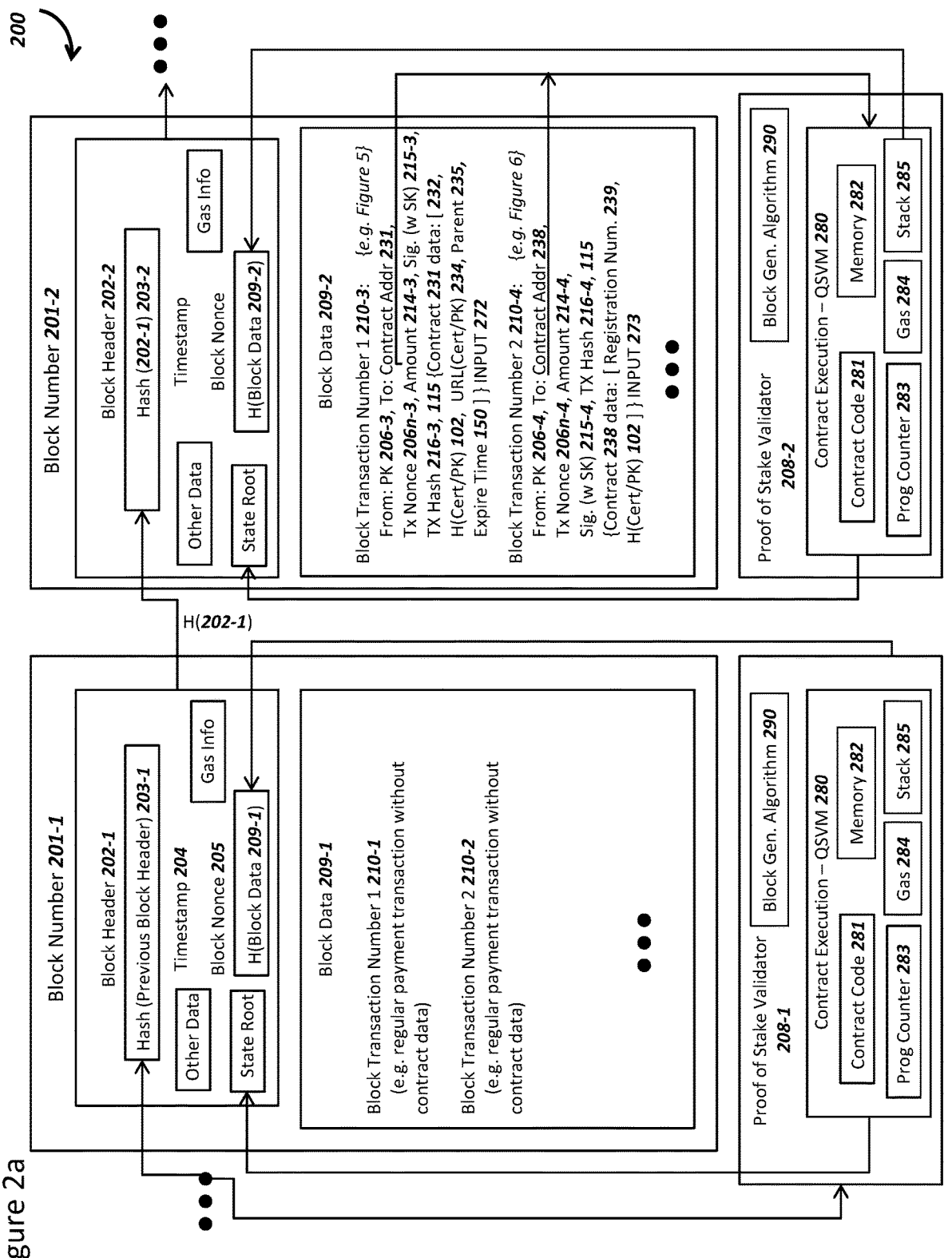
FIG. 2a is a graphical illustration of an exemplary blockchain system for the secure distribution and revocation of digital certificates, in accordance with exemplary embodiments.

FIG. 1a is a graphical illustration of an X.509 certificate, a certificate fingerprint, and a public key, in accordance with conventional technology and exemplary embodiments. The illustration of a certificate 101 in text form and the corresponding certificate 101' in PEM ("privacy enhanced mail") format are exemplary. Certificate 101 includes (i) a public key 103 and (ii) a digital signature 112 from a certificate issuer or certificate authority. A server 105 or computer operating with certificate 101 can include private key SK.server 103a corresponding to the public key 103 in the certificate 101. The digital signature 112 can be generated with a signature algorithm 115 using the data within certificate 101 (but excluding the digital signature 112 itself) and a private key SK.CI 103a, where the private key SK.CI 103a corresponds to a CI public key in a parent certificate 101 for the certificate issuer with identity 110i.

Certificate 101 can include a plurality of fields supporting widely deployed software and firmware for authenticating digital signatures generated by the server or computer corresponding to the certificate 101. Some certificates 101 can apply to a plurality of servers 105, including a plurality of servers for a domain name and other possibilities exist as well for a plurality of servers or computers to operate with the same certificate 101 and private key SK.server 103a. The fields and data within certificate 101 could be specified by IETF RFC 5280, including subsequent and related versions of standards for implementing or using certificates based on the X.509 standards. The certificate 101 depicted in FIG. 1a is for use with TLS, but other standards could be supported as well. Some fields and values within a certificate 101 have been omitted, and other fields commonly used with commercially used certificates could be included also in the certificate 101 depicted in FIG. 1a. The full length of keys and data have been truncated or shortened for depiction purposes, where the depicted value of " . . . " means that the full string of hexadecimal data is not displayed. Although the certificate 101 in FIG. 1a is depicted for a public key 103 used with authentication, some certificates 101 could include a public key with algorithms for key exchange or key encapsulation mechanisms (KEM).

A certificate 101 can include a name or identity of a signature algorithm 115. With conventional technology, the signature algorithm 115 can support (i) the Digital Signature Algorithm (DSA) as specified in Federal Information Processing Standard (FIPS) 186, (ii) the RSA digital signature algorithm as described in IETF RFC 4055 titled "Additional Algorithms and Identifiers for RSA Cryptography for use in the Internet X.509 Public Key Infrastructure Certificate and Certificate Revocation List (CRL) Profile", or (iii) ECC based digital signature algorithms such as the Elliptic Curve Digital Signature Algorithm (ECDSA). Other possibilities exist as well for digital signature algorithms specified by a signature algorithm 115 in a certificate 101, including post-quantum cryptography (PQC) such as Dilithium, Falcon, XMSS, LMS, or Sphincs+. Conventional technology with X.509 certificates and standard protocols such as TLS, SSH, IPSec, EAP, and VPNs support the specification of both (i) a single digital signature algorithm 115 and (ii) a single public key 103 within a certificate 101.

A certificate 101 can include an identity for a certificate issuer comprising identity.CI 110$i$. The identity. CI 110$i$ can include strings or values to identify a certificate issuer, such as a name, location, etc. Note that the identity.CI 110$i$ can also include cryptographic parameters in the name, such as the name of the certificate issuer being dedicated to or associated with a specific algorithm or parameters such as the use of a specific secure hash algorithm or digital signature algorithm. The exemplary identity.CI 110$i$ can describe the entity issuing the certificate. Additional data in the certificate 101 can be associated with the certificate issuer using identity.CI 110$i$, such as policies, the authority key identifier, etc. In general, a device receiving the certificate 101 can verify the received certificate with another, parent certificate securely stored and associated with the certificate issuer using identity. CI 110$i$ and the authority key identifier, and other possibilities exist as well for looking up a parent certificate for a certificate 101.

A certificate 101 includes a public key 103. The public key 103 in certificate 101 can be for a server 105-1 depicted in FIG. 1$b$ below. The public key 103 can correspond to the private key SK.Server 103$a$. A key pair generation algorithm supporting parameters 111 could be used to generate the public key 103 with the private key SK.server 103$a$. Parameters 111 can specify values and settings for use with the public key 103, such as values for an elliptic curve cryptography (ECC) curve name (for ECC keys), RSA modulus (for RSA keys), key length, key formatting (e.g. compressed or uncompressed), encoding rules, etc. For use of ECC algorithms, parameters 111 can specify elliptic curve names such as, but not limited to NIST P-256, sect283k1, sect283r1, sect409k1, sect409r1, and other possibilities exist as well. Parameters 111 could also specify digital signature algorithms supporting post-quantum cryptography such as XMSS. For some embodiments, the parameters 111 for use with the public key 103 can be different than the digital signature algorithm 115 used to verify the certificate 101, and for these embodiments then the parameters 111 the identity of a signature algorithm 115 can correspond to different cryptographic algorithms.

Parameters 111 can specify domain parameters for nodes to calculate digital signatures in a compatible manner, such as common base point G for use with ECC PKI key pairs and a defining equation for an elliptic curve. With RSA based signatures, parameters 111 can specify values for padding in order to generate a digital signature. With Dilithium based signatures, parameters 111 can specify a security level for generating verifying digital signatures with the public key 103, which are generated using the private key 103$a$. With XMSS based signatures, parameters 111 can specify a hash algorithms such as SHA2 or SHAKE, along with key lengths and tree heights. In exemplary embodiments for the use of XMSS or LMS digital signature algorithms for the generation of a digital signature 112, then the certificate 101 can also include a one-time signature (OTS) index value used to generate the signature 112. Verification of the digital signature 112 could use both the public key 103 in a parent certificate and the OTS index value.

A certificate 101 can include the server or owner identity 117, such that the identity of a server can be verified using the certificate 101. Certificate 101 can also include an authority key identifier which can be an identity for a public key from the certificate issuer 110$i$ used to verify the digital signature 112 in a certificate 101. The authority key identifier can be used as a reference by the receiver of a certificate 101 in order to query or lookup the public key used to generate the digital signature 101. A certificate 101 will also include a digital signature 112, where the digital signature 112 was generated by (i) the digital signature algorithm 115 and (ii) the private key SK.CI 103$a$ for the public key associated with the authority key identifier. The digital signature 112 can be over all previous data in the certificate 101 before the signature 112. The generation and verification of digital signatures will be described in additional detail in subsequent figures below, including FIG. 2$b$.

Certificate 101' corresponds to certificate 101, but with the use of PEM format for the same data. Computers on a network can transmit and receive certificates 101 in the PEM format for certificate 101. Other options are available as well for transferring certificates over a network, including the use of binary data such as "distinguished encoding rules" (DER). For the exemplary embodiments contemplated herein, the description or depiction of a certificate 101 can be a certificate in any of (i) text form (as depicted on the left side of FIG. 1$a$), (ii) PEM for as depicted on the right hand side of FIG. 1$a$, or (iii) in a binary form such as DER. Other digital formats for a certificate 101 are possible as well without departing from the scope of the present invention.

A certificate fingerprint 102 can be a unique value corresponding to the certificate 101 based upon inputting the DER format of the certificate 101 (e.g. certificate 101″) into a secure hash algorithm, where the output of the secure hash algorithm is the certificate fingerprint 102. FIG. 1$a$ depicts the certificate fingerprint for the certificate 101 using the SHA2-256 hash algorithm. Some communications protocols or applications may not depend on a certificate 101, but rather a public key 103. An example protocol would be Wireguard, and other examples exist as well. For these protocols or applications, a public key 103' could comprise the public key 103 in PEM format. Other formats are possible as well for a public key 103 to be shared, such as using DER format.

FIG. 1$b$

FIG. 1$b$ is a graphical illustration of an exemplary system for computers to receive certificates over the Internet, in accordance with conventional technology and exemplary embodiments. System 100$b$ includes an enterprise 104, a public IP network 108 which could be the public Internet, and a plurality of different certificate issuers. Public IP network 108 may also be referred to herein as the Internet 108. An enterprise 104 could operate a plurality of servers 105 and devices 107. An exemplary single server for enterprise 104 is depicted in FIG. 1$b$ as a server 105-1, and an exemplary single device for enterprise 104 is depicted in FIG. 1*b* as a device 107-1. Enterprise 104 could use the public IP network 108 in order to communicate with certificate issuers using classically secure cryptography and protocols such as TLS version 1.3, IPSec, EAP-TLS, etc. Enterprise 104 may optionally use a certificate lifecycle management platform (CLM) 106, which stores and records certificates 101 for a plurality of computing devices within enterprise 104, including servers 105 and devices 107. CLM 106 can also provide management and administrative functions related to certificates 101 for enterprise 104, such as determining when new certificates are needed, revoking certificates before expiration, supervising the requests and generation of new certificates for new devices or computers added to enterprise 104, and other possibilities exist as well. Example software for CLM 106 as of 2022 includes Keyfactor Command, DigiCert CertCentral, and AppViewX CERT+. Although the use of a CLM 106 is depicted, some servers 105 and devices 107 could obtain their certificates 101 either directly from a certificate issuer or through other means via the Internet 108. An enterprise 104 could also optionally omit the use of a CLM 106 and manage certificates through other means, including an SQL database.

Note that the classically secure cryptography and protocols would not provide quantum safe authentication, where quantum safe authentication normally requires using at least one pre-installed PQC CI certificate 101-4 (or pre-installed PQC public key 103) for communications over the Internet 108. In other words, without some chain of CI certificates 101 based upon PQC algorithms, the communications between enterprise 104 and certificate issuers through the public IP network 108 would not be quantum safe. The certificate issuers for enterprise 104 could include a classical certificate issuer 110 with an identity 110*i*, a device manufacturer 113 that generates a certificate 101 for device 107-1, and a quantum safe certificate issuer (QSCI) 114.

A server 105-1 could operate with a server certificate 101 for a private key SK.server 103*a*. The parent certificate from CI 110 for certificate 101 could be certificate 101-12, which comprises an intermediate certificate between server certificate 101 and root certificate 101-1. In order to authenticate with clients connecting with server 105-1, server 105-1 may normally need to send the CI intermediate certificate 101-12 along with server certificate 101 in order for clients to successfully authenticate, where the clients can pre-store root certificate 101-11. In other words, clients can (i) receive server certificate 101 and CI intermediate certificate 101-12, (ii) verify server certificate 101 with CI intermediate certificate 101-12, and then (iii) verify intermediate certificate 101-12 with root certificate 101-11. Other possibilities for the number of levels of intermediate or parent certificates between a server certificate cert.server 101 and a root certificate exist as well. Enterprise 104 could receive a message 121 with the CI intermediate certificate 101-12 for certificate 101. Enterprise 104 could send a message 123 with the CI intermediate certificate 101-12 to server 105-1. Server 105-1 could store the CI intermediate certificate 101-12 within a server 101-5 in a step 124.

Similarly, a device 107-1 may need a current, valid device certificate 101-4 in order to authenticate with servers or other networks. As one example, a previous device certificate may have an expiration date 150 (shown in FIG. 1*a*) which has passed, so the device certificate is no longer valid. A device manufacturer 113 could store the device public key 103-4 and issue the current, valid device certificate 101-4 for the stored device public key 103-4. Enterprise 104 could receive a message 125 with the current, valid device certificate 101-4 for device 107-1 such as a new device certificate that had not expired. Enterprise 104 could send a message 126 with the current, valid device certificate 101-4 to device 107-1. Device 107-1 could store current, valid device certificate 101-4 for device 107-1 in a step 127.

FIG. 1*b* depicts a significant problem for conventional technology that continues to rely upon classical cryptography such as RSA and ECC after Q-day has arrived. With the arrival of Q-day, if a server 105-1 or a device 107-1 needs a certificate 101, including a certificate that is quantum safe, such as CI cert 103-3 from Quantum Safe Certificate Issuer (QSCI) 114, the received certificate 101 cannot be trusted when classical cryptography encrypts the communications channel. In other words, with conventional technology, enterprises, servers, and devices using classical cryptography only (e.g. RSA and/or ECC) cannot be safely upgraded to PQC using the Internet 108 after Q-day. The arrival of Q-day, or soon thereafter such as within a year, means that quantum computers have the capability of breaking a public key within certificates that use classical algorithms. The arrival of Q-day also means that the authentication of sessions established through protocols such as TLS 1.3 can no longer be trusted. Without trust of communications over the public IP network 108, then a quantum safe CI certificate 103-4 cannot be securely received. Without storing or operating with a quantum safe CI certificate 103-4 (such as a root certificate), then a device or server cannot establish a secure session that is quantum safe. In summary, if devices and servers have not received and stored required PQC certificates before Q-day, then the devices and servers cannot be securely upgraded using the Internet 108 in order to support PQC algorithms.

An example for the problem described in the above paragraph is depicted in FIG. 1*b*, when using conventional technology. After Q-day, quantum computers can break the public keys within existing certificates that use RSA and ECC algorithms. A "man-in-the-middle" (MITM) attacker 109 only needs to break a single public key 103 in any of the certificates 101 within the certificate chain used to establish a "secure" session through the Internet 108, where the "secure" session utilizes RSA and/or ECC cryptography. Breaking a public key in this context means finding the corresponding private key. A fundamental assumption for secure PKI is that finding the random private key corresponding to a given public key would be infeasible.

With a broken public key in the certificate chain, the MITM attacker 109 can establish a "fake" server with a fake cert.server certificate 101 that would successfully pass the authentication checks by clients connecting to the "fake" server, since the broken private key could be used to generate valid appearing fake certificate. The MITM attacker 109 could then have many different avenues for additional attack vectors, with one attack vector depicted in FIG. 1*b*. A significant attack vector would be substituting a "fake" root certificate for the Quantum Safe Certificate Issuer (QSCI) 114. The MITM attacker 109 could receive a quantum safe root certificate 101-4 from QSCI 114 in a message 128. The MITM attacker 109 could substitute a fake root certificate 129 and send the fake root certificate 129 in a message 130 to enterprise 104. Although not depicted in FIG. 1*b*, the data transmitted to enterprise 104 could be in response to requests originated by enterprise 104 to certificate issuers. A MITM attacker 109 could also successfully complete other attacks, such as reading transmitted data from enterprise 104 through the public IP network 108.

FIG. 2*a*

FIG. 2*a* is a graphical illustration of an exemplary blockchain system for the secure distribution and revocation of digital certificates, in accordance with exemplary embodiments. Blockchain technology for processing payment transactions in digital currencies have existed since the introduction of Bitcoin in 2009. Blockchain technology for supporting the use of smart contracts in addition to processing payment transactions have existed at least since the introduction of Ethereum in 2015. System 200 depicted in FIG. 2*a* builds upon conventional technology for payment transactions and the use of smart contracts, with specific capability for the secure recording of certificate issuance and revocation in a scalable manner. A detailed description for the leading, initial blockchain for Bitcoin was described in the 2008 whitepaper by the author "Satoshi Nakomoto", which is a presumed pseudonym for a different individual or group, and this whitepaper is herein incorporated by reference in its entirety. A detailed description for the leading, subsequent blockchain for Ethereum is described in the Ethereum "Yellow Paper" by Dr. Gavin Wood, which is periodically updated. The current version as of November 2022 is the "Berlin version" dated Oct. 24, 2022, which is also herein incorporated by reference in its entirety.

In general, a blockchain represent a distributed ledger which is shared by a plurality of nodes. The collection of nodes can comprise a blockchain network, which is depicted and described on connection with FIG. 4 below. The blockchain includes a series of blocks that identified with a block number 201. A block number 201 is an integer number that increases over time from a genesis block as transactions are added. The blocks include at least block data 209 for transactions and header data 202, where nodes or clients generate the transactions between the times when blocks are issued. The time for a block can be identified by a timestamps 204 when blocks are generated. Nodes processing blocks operate with a block generation algorithm 290, which contains the logic and structure for adding block data 209 to header data 202 in order to generate the blocks. Bitcoin uses miners which find a nonce value according to a scaling algorithm, such as difficulty, where the algorithm is defined as a certain number of leading zeros for a nonce value 205 within the block header 202. For depiction in FIG. 2*a*, (i) the left block has block number 201-1 and the right block has the next integer number of 201-2, (ii) the complete series of blocks from genesis to block number 201-1 is represented by the " . . . " on the left, and (iii) the subsequent series of blocks after block number 201-2 is represented by the " . . . " on the right. A block within system 200 can be equivalent to the definition of a block according to section 4.3.x of the Ethereum "Yellow Paper."

Many subsequent blockchains to Bitcoin, such as Ethereum, use "Proof of Stake" validators 208 instead of miners, which can be vastly more energy efficient than mining as specified with Bitcoin. Although two validators 208-1 and 208-2 are depicted in FIG. 2*a*, a blockchain network (such as the example network depicted in FIG. 4 below) will have a plurality of nodes and validators 208 to process blocks. With current, conventional technology, a specific validator 208 will be selected as the block proposer for each block number 201, and other validators 208 will vote on or confirm the proposed new block number 201 is valid. The specific validators 208 depicted in FIG. 2*a* can be considered the block proposer for each depicted block number 201. Validators 208 "stake" an amount of cryptocurrency defined by the chain, where the "stake" can be burned or lost if the validator acts in bad faith (or in error) and proposes a block which is not agreed to by other validators. A block proposer is selected randomly form the group of all participating validators. Currently with Ethereum, block proposers are selected every 12 seconds to propose a block and block number 201 with transactions 210.

Validators 208 will include both block generation algorithms 290 and a virtual machine. Although not depicted in FIG. 2*a*, some nodes within a system 200 can operate without functioning as validators, such as nodes which do not submit enough tokens for "staking". Electrical components for an exemplary validator 208 are depicted and described in connection with FIG. 9 below. Validators and nodes can include block verification algorithms, which can be similar to block generation algorithms, except with the function of verifying submitted blocks instead of generating new blocks.

With conventional technology for Ethereum, which supports classical cryptography using elliptic curves and specifically curve secp256k1, a virtual machine will process smart contract code according to data within transactions 210, if the transactions 210 call smart contract addresses. The technology for the virtual machine in the present disclosure uses quantum safe cryptography and subsequently is depicted in FIG. 2*a* as "QSVM" for a quantum safe virtual machine 280. In other words, the virtual machine operated by validators 208 in the present disclosure does not depend on elliptic curve cryptography and instead operates with post-quantum cryptography (PQC). In exemplary embodiments, the supported digital signature algorithms for QSVM are either XMSS or Dilithium.

A QSVM 280 operated by each of the validators 208 in order to generate or process or vote on proposed blocks can include contract code 281, memory 282, a program counter 283, gas information 284, and a stack 285. A QSVM 280 can support a set of opcodes, or instructions, for executing contract code 281. Each of the opcodes can be associated with a gas level or number, such that executing each opcode deducts the gas level or number from a value input with a transaction or gas level stored with the contract. A collection of opcodes for contract code 281 can also be referred to as a "smart contract". Smart contracts operating within the quantum safe virtual machine can also be referred to as "quantum safe smart contracts". Contract code 281 can be a series of bytecode that includes opcodes.

The contract code 281 depicted in FIG. 2*a* represents the collection of all quantum safe smart contracts that have been created by individual transactions that create separate quantum safe smart contracts. A transaction to create a quantum safe smart contract can be bytecode that runs a contract constructor, initializes the contract state, and returns final contract bytecode. Contract creation also generates a contract Application Binary Interface (ABI), which provides a public interface for transactions or other contracts to interact with the contract. Although not depicted in FIG. 2*a*, example ABI would be used for the transactions with contracts depicted in step 510 for FIG. 5 below and step 610 for FIG. 6 below. The QSVM 280 depicted in FIG. 2*a* can be compatible with the execution model for the Ethereum Virtual Machine (EVM) as described in section 9 of the Ethereum "Yellow Paper".

Memory 282 for the QSVM can be both (i) "transient" memory which is temporarily allocated for processing transactions related to a current block and then released or removed, and (ii) persistent or storage memory with an associative map of keys and values. The creation or allocation of both (i) transient memory for processing transactions and (ii) persistent memory for storage between block generation can use gas, such that there is a pre-defined cost for contracts storing data in either "transient" memory or storage memory. Memory 282 depicted in FIG. 2a can include both the "transient" memory and "storage memory" for all contracts and contract code 281 operating within the QSVM 280, where separate portions of memory 282 can be allocated to each of the created contracts for the QSVM 280.

The QSVM 280 can use a register stack 285 for passing values to functions. The stack 285 can have a maximum number of items, such as 1024 for the EVM and each item can be a word of x bits in length, such as 256 bit words with the EVM. For example, PUSH instructions or opcodes can add data to the stack in sequence and then other opcodes can process data within the stack and remove items from the stack in the process of conducting the opcode. For example the ADD instruction can take two items from the stack for addition, and leave one item on the stack as the output. Other possibilities exist as well. For the QSVM 280, the stack can be a sandboxed, dynamic virtual stack within each node to support the execution of QSVM-compatible smart contract bytecode.

The program counter 283 can function as a pointer to which bytecode is currently being executed by the QSVM. For the start of execution of a contract within contract code 281, the program counter starts at zero and increments by one for the execution of each bytecode, unless a JUMP call branches to a different bytecode. In this manner the QSVM 280 can keep track of the proper sequence of bytecodes for processing. The QSVM can also include a program counter 283 for each smart contract operating in the virtual machine, where the program counter starts at zero and increments by an integer (unless JUMP or similar codes move the program counter to a different opcode). The program counter 283 depicted in FIG. 2a can be for each of the plurality of smart contracts which can operate within the QSVM 280.

The QSVM 280 can use gas 284 for processing contracts. Gas 284 can represent the count of gas available with a submitted transaction and gas used for individual contract. The execution of each opcode can require a specified level of gas, which can also be stored within gas 284. The underlying purpose of gas is to create a basic cost for executing code on the blockchain system 200, such that denial of service (or simply programming errors with potentially infinite loops and such) would have costs that eventually and reasonably terminate code execution when gas runs out. Gas is also priced per opcode based on the resource intensity of the opcode, such that higher resource intensity has higher gas values. A value of gas is normally submitted along with all transactions 210 that call contracts, and the execution of the contract will deduct gas using gas 284. Any remaining gas after the execution of the contract can be returned to the address of the caller of the contract. Gas 284 within the QSVM 280 can support the functionality for the use of gas as described in the Ethereum "Yellow Paper".

Upon successful execution of transactions 210 for a block, which can include transaction data for smart contracts, a validator 208 using the block generation algorithm 290 and QSVM 280 can propose the new block for block number 201-1. The new block will include a list of transactions and the validator will include a secure hash value over the block data 209-1, as depicted in FIG. 2a. The secure hash value can be generated using algorithms such as SHA2-256, SHA3-256, and other possibilities exist as well without departing from the scope of the present invention. Execution of transactions 210 and smart contract data, such as input for the smart contracts, will also update the state root for the blockchain in each block. The state root can also be a secure hash value over all data in the blockchain, including storage memory and contract code for the block number 201-1. The state root in FIG. 2a can be a secure hash value for a world state, where the world state is described in section 4.1 of the Ethereum "Yellow Paper".

Each block with a block number 201 can include a block header 202. Block header 202 can include data for the blockchain upon processing transactions 210 within block data. Block header 202 can include (i) a secure hash value over the previous block header 203, e.g. H(previous block header) 203, (ii) a timestamp 204 for the block, a nonce 205 for the block, (iii) the state root described in the previous paragraph, (iv) the secure hash value over the block data 209, e.g. H(block data 209), (v) other data, and (vi) gas information for the block. The timestamp 204 can be a decimal number formatted for UNIX time when the block was generated by a validator 208. The block nonce 205 can be a nonce value generated by block generation algorithm 290 within the validator generating the block. Other data for block header 202 can include additional values for supporting a system 200, such as an address for receipt of fees by the validator 208 generating the block, a transactions root value, a receipts root value, and extra data, where these values are also described in section 4.3 of the Ethereum "Yellow Paper". The gas info within the block header can include a gas limit for the current limit for gas expenditure in a block as well as gas used by all the transactions 210 within the block. Additional data for supporting a blockchain are possible as well within a block header 202 without departing from the scope of the present invention.

Block data 209 within a block can include a list of transactions 210 for the block. Transactions can be selected for inclusion by validators 208 from pending transactions 210' generated by nodes and clients. An example for the generation of a pending transaction 210' by a node or client and then propagation of the pending transaction 210' across the network until receipt by a validator 208 is depicted and described in connection with FIG. 4 below. The first block number 201-1 with block data 209-1 depicted in FIG. 2a can include at least a first transaction 210-1 and a second transaction 210-2. The first transaction 210-1 and second transaction 210-2 can be payment or transfer transactions to transfer tokens from a sending address to a receiving address. Since the present invention focuses on the use of blockchain for the secure generation, recording, and revocation of certificates and public keys, details for the first and second transactions 210-1 and 210-2, which does not pertain to certificates, are not further described herein.

A proof of Stake validator 208 can take the pending transactions 210' and use both block generation algorithm 290 and the quantum safe virtual machine 280 with contract code 281 for any input into smart contracts in order to generate a block 201-1 with transaction 210-1 and 201-2 and additional transactions 210. Assuming all fields are properly specified and compatible with both (i) block generation algorithm 290 and (ii) the quantum safe virtual machine 280, the validator 208 can include the transactions 210-1 and 210-2 in a block 201 for blockchain system 200. Successful execution of the transactions 210 with input for smart contracts can update the state root, as depicted in FIG. 2a and also described above in this FIG. 2a.

Although only a series of two transactions are depicted in FIG. 2a for block 201-1, the block 201-1 could include many more transactions, up to a block size limit such as 5 megabytes, or 10 megabytes, and other possibilities exist as well. Many other different types of transactions than the depicted two transactions within block 201-1 are possible, including any combination of (i) payment transactions equivalent to transaction 210-1, (ii) a CSR request transactions, (iii) Register Certificate transaction 210-3 in block 201-2, and (iv) Revoke Certificate transaction 210-4 in block 201-2. Other transactions possible for a blockchain system 200 include administrative transactions such as periodically specifying amounts 214 in order to interact or transact with smart contracts related to certificates 101 generated or stored in blockchain 200. Another transaction possible for blockchain system 200 includes a transfer ownership transaction, such that a new, different public key 206 or corresponding address 404 (in FIG. 4) would own or control a resulting certificate 101 identified by a certificate fingerprint 102.

After a selected validator 208-1 processes and proposes a block 201-1, the validator 108 can propagate the block 201-1 the network of nodes supporting a blockchain system 200. An example of the propagation of a block 201-2 is depicted and described in connection with FIG. 4 below. A block 201 submitted by a selected validator 208-1 and 208-2 can be voted on by nodes or other validators 208, such that a clear consensus is reached with a supermajority of votes approving the proposed block 201-1. Once the supermajority is reached, then block 201-1 can be considered complete and accepted by the nodes supporting a blockchain system 200. Bad actors or simply errors submitted by a selected validator according to a block generation algorithm 290 would result in an erroneous block 201-1' which would not receive sufficient votes by other validators 208, and in that case the erroneous block 201-1' would be rejected and not included in a blockchain system 200.

After the block 201-1 completes acceptance by a supermajority of nodes and substantially propagates through the network of nodes, the next set of pending transactions 210' submitted by clients and/or nodes participating in the network can be processed by validators into the next block. An example of subsequent or additional transactions for a second block 201 is depicted within block 201-2 in FIG. 2a. Although not depicted in FIG. 2a, pending transactions 210' can be stored by in a memory pool or mempool of validators 208, and transactions 210 included within blocks 201 can be selected by validators 208 from the mempool.

A second block 201-2 in FIG. 2a represents the next block after a first block 201-1 for a system 200. A validator 208 proposing the second block 201-2 can be a different second validator 208-2 than a first validator 208-1 submitting an accepted first block 201-1. A second block 201-2 includes the same fields and structure for a second block header 202-2 as a first block header 202-1 in a first block 201-1. A second validator will include a secure hash value 203-2 for the previous block header 202-1 in the second block header 202-2, which is depicted as "H(202-1) 203-2" in FIG. 2a. Block header 202-2 can include values described above in this FIG. 2a for a block header 202 such as (i) a secure hash value over the previous block header 203, e.g. H(previous block header) 203, (ii) a timestamp 204 for the block, a nonce 205 for the block, (iii) the state root represented by a secure hash value over the blockchain system 200 state, (iv) the secure hash value over the block data 209, e.g. H(block data 209), (v) other data, and (vi) gas information for the block.

Second block data 209-2 within a block can include a list of transactions 210 for the block. Transactions can be selected for inclusion by validators 208 from a memory pool of pending transactions 210'. An example for the generation of a pending transaction 210' by a node or client and then propagation of the pending transaction 210' across the network until receipt by a validator 208 is depicted and described in connection with FIG. 4 below. The second block number 201-2 with second block data 209-2 depicted in FIG. 2a can include at least a third transaction 210-3 and a fourth transaction 210-4. The third block transaction 210-3 can be a Register Certificate/PK transaction to register a new certificate 101 in blockchain system 200. The third transaction 210-3 can be the first transaction 210 within block 201-2. The fourth transaction 210-4 can be an Owner Revoke Certificate transaction for a certificate owner to revoke a certificate 101 in blockchain system 200.

A third transaction 210-3 for block data 209-2 within block number 201-2 can include data for a quantum safe smart contract 231 and the secure recording or registration of a certificate 101 or a public key 103. The numeral depiction of 231 can represent an address for the smart contract on the blockchain, which can comprise a series of unique bytes, such as but not limited to 20 bytes, (selected from a hash value over at least data for the contract such as contract code 281). A smart contract herein can be referred to using the address of the smart contract, and thus the term "contract 231" can refer to the contract with an address value of 231 depicted in FIG. 2a. As depicted in FIG. 2a, additional details for the operation of contract 231 are depicted and described in connection with FIG. 5 below. Note that the smart contract 231 could also be used to register a public key 103 instead of a full certificate 101. In other words, for data described below with a transaction 210-3 below and also depicted in FIG. 2a, the value of a public key 103 could be used instead of a certificate 101.

As depicted in FIG. 2a, the third transaction 210-3 can include (i) a "from" value for a sender/originator of the transaction, where the value can comprise a public key 206-3 for the sender/originator, (ii) the destination contract address 231, and (iii) a transaction nonce $206n$-3. In a preferred exemplary embodiment, the public keys 206 for senders can support a stateful digital signature algorithm of XMSS. For stateful digital signature algorithms, multiple signatures are possible for a private key, but there is a limit to the number of signatures that can be securely generated and a count or index for the current number should be transmitted along with a signature. A node verifying the signature will need at least the public key, the signature, and the transaction nonce $206n$-3 value. In other words, a one-time signature (OTS) key index (or equivalent) is used with stateful signature algorithms in order to keep track of state for the number of signatures issued using a private key. In the present invention the transaction nonce $206n$-3 value can be equal to the OTS key index used to generate signature 215-3 from private key $206a$-3 for public key 206-3. Note that the public key 206-3 can be the same as PK.QSCI 206 depicted and described in connection with FIG. 4 and FIG. 5 below.

As depicted in FIG. 2a, the third transaction 210-3 can include (iv) a transaction amount 214-3, (v) a digital signature 215-3 for the private key and also the transaction nonce $206n$-3, which can be a OTS key index, (vi) a transaction secure hash value 216-3, and (vii) input 272 for the smart contract 231, where the input 272 represents a series of values for executing the smart contract 231. The use of a transaction amount 214-3 for a transaction with a smart contract can represent an amount of tokens or "coins" that are transferred to the smart contract for the transaction. The transaction secure hash value 216-3 can represent a secure hash value over data within the transaction, similar to the unique "fingerprint" 102 depicted in FIG. 1*a* above. The transaction secure hash value 216-3 can also be referred to as a "transaction ID".

Different smart contracts can require the input or sending of different numbers of tokens or "coins", such that a cost is established for interacting with smart contracts on a blockchain system 200. For example, a first contract to register a certificate signing request (CSR) with a CSR smart contract (not shown in FIG. 2*a*) may require a first number of tokens (such as an exemplary number of 0.5). A second contract to register the issuance of a certificate in a "register certificate" smart contract 231 (e.g. in FIG. 5 below) may require a second number of tokens (such as an exemplary number of 1.0). A third contract to record the revocation of a certificate in a "revoke certificate" smart contract 238 may require a third number of tokens (such as an exemplary number of 1.5). If a pending transaction 210' does not include a sufficiently large transaction amount 214 for the specified cost associated with each smart contract, then the pending transaction 210' can fail and the smart contract would not successfully execute.

Other possibilities exist as well for the number of tokens in a transaction amount 214 required to transact with different smart contracts, and the numbers described in the above paragraph are exemplary. A purpose of requiring at least some tokens for interacting with smart contracts ensures at least some cost is incurred for interacting with the smart contracts for managing certificates, and in this manner the blockchain system 200 can avoid being loaded with "frivolous" or "spam" or "denial of service" type data. In exemplary embodiments, a "controlling" smart contract managed by administrators (with administrators depicted and described in connection with FIG. 4 below) can establish and periodically update the number of tokens required in a transaction amount 214 for interaction with each of the smart contracts contemplated herein, such as setting the specific number of tokens or coins to be included in a transaction 210-3 with a transaction amount 214-3 in order to complete the interaction with contract 231 depicted in FIG. 2*a*.

Figure 4:
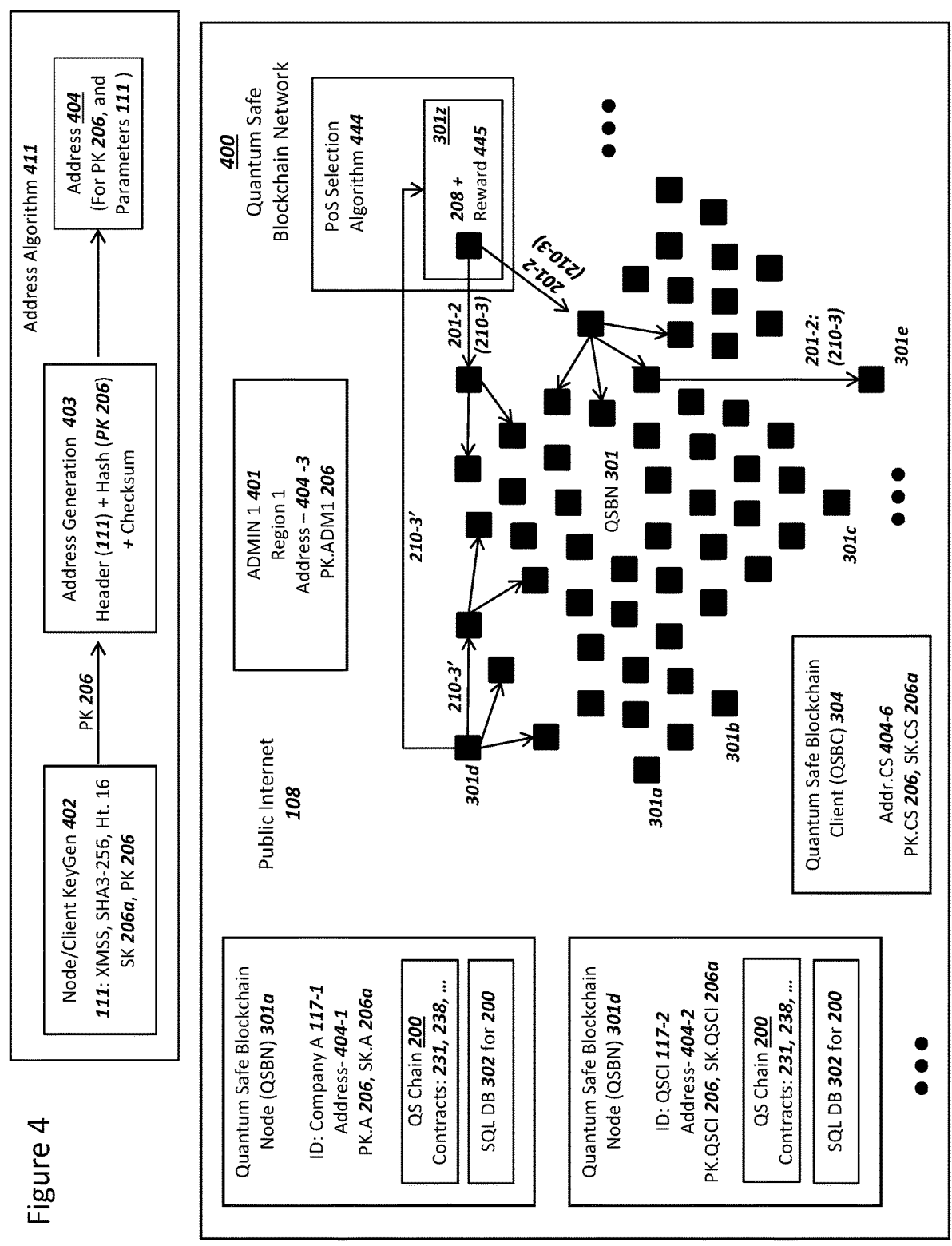
FIG. 4 is a graphical illustration of an exemplary system for a blockchain network and an address algorithm.

The generation and verification of digital signature 215, including the specific digital signature 215-3 depicted with transaction 210-3 in FIG. 2*a*, is depicted and described in connection with FIG. 2*b* below. In summary, each transaction 210 requires a digital signature 215 that is generated by a private key 206*a* corresponding to the public key 206 that is included with a transaction 210. The digital signature 215 is for authenticating that the transaction 210 originated from a node or client that also holds the private key 206*a*. The digital signature 215 will be over data in the transaction, such that all of the data or values or fields inside the transaction 210 can be authenticated and confirmed as not tampered with as the transaction 210 propagates through a blockchain network (as shown in FIG. 4). Any node or validator on the blockchain network can verify and authenticate that the digital signature 215 for a transaction 210 using the public key 206*a* and the associated digital signature algorithm. Nodes, clients, and validators (as a subset of nodes) can agree to supported digital signature algorithms for blockchain system 200. Similarly, nodes, clients, and validators (as a subset of nodes) can agree to a supported secure hash algorithm for blockchain system 200, and in exemplary embodiments the secure hash algorithm for data described as a "secure hash" can comprise one from SHA2, SHA3, and SHAKE.

In exemplary embodiments, the digital signature algorithm for blockchain system 200 (such as with digital signature 215) can support a stateful hash-based signature scheme of either the Leighton-Micali Signature (LMS) system or the eXtended Merkle Signature Scheme (XMSS), as specified in the National Institute of Standards and Technology (NIST) Special Publication 800-208, "Recommendation for Stateful Hash-Based Signature Schemes", which is herein incorporated by reference in its entirety. In another embodiment, the digital signature algorithms in blockchain system 200 (such as with digital signature 215) can support the Dilithium signature algorithm, as specified in the paper "CRYSTALS-Dilithium Algorithm Specifications and Supporting Documentation (Version 3.1)", which is herein incorporated by reference in its entirety, submitted with the third round of the NIST PQC standardization project. Other possibilities exist as well for a post-quantum digital signature algorithm without departing from the scope of the present invention.

As depicted in FIG. 2*a*, a transaction 210 can include a field or value for a digital signature algorithm 115, which can specify the digital signature algorithms used with both the public key 206 and the digital signature 215 for validating or confirming the transaction 210. In a preferred exemplary embodiment, the digital signature algorithm 115 for digital signature 215 and public key 206 for a transaction 210 support the XMSS signature scheme. In another preferred exemplary embodiment, the digital signature algorithm 115 for digital signature 215 and public key 206 for a transaction 210 support the Dilithium stateless signature scheme.

In exemplary embodiments, the blockchain system 200 supports at least two signature algorithms 115 for public key 206 and signature 215 in a transaction 210, such as either XMSS or Dilithium. In this manner, the blockchain 200 can be robust such that if one of the two signature algorithms is found to be weakened, then clients and nodes can more easily migrate to an alternative algorithm since blockchain system 200 supports at least two algorithms for signature 215. An example for including signature algorithm in a transaction 210 is depicted in FIG. 2*b* below for generation and verification of a signature 215-3. Signature algorithm 115 can also specify a security level, such as equivalent to 128 or 256 bits of symmetric encryption security, and other possibilities exist as well for a security level for a value of a signature algorithm 115 in a transaction 210 without departing from the scope of the present disclosure. Note that a first value for signature algorithm 115 in transaction 210-3 to specify the algorithm for signature 215 can be different than the signature algorithm 115 in a certificate 101. In other words, a transaction 210-3 can use the XMSS digital signature algorithm, where the certificate 101 for the transaction 201-3 can use a different signature algorithm, such as Falcon or SPHINCS+.

As depicted in FIG. 2*a*, third transaction 210-3 can include input 272 for the contract 231. As mentioned above, contract 231 can be for "Register Certificate/PK", which is also depicted and described in connection with FIG. 5 below. Input 272 can include (i) owner 232, which can represent an address 404 or public key 206 for the owner of the certificate 101 being registered, (ii) a fingerprint 102 which can be a secure hash value over the certificate 101, where fingerprint 102 was also depicted and described in connection with FIG. 1*a*, (iii) a uniform resource locator (URL) 234 for the certificate 101, (iv) a parent certificate 235 value, which can represent the certificate fingerprint 102 for a parent/CA certificate used to verify the digital signature 112 in the certificate 101 for the Register Certificate 231 transaction. The parent certificate 235 value can also be a registration number 239 representing the combination of the block number 201 and block transaction number 511 (depicted and described in FIG. 5) for a previous Register Certificate/PK 231 transaction to register the parent/CA certificate of certificate 101. In other words, the parent certificate used to verify the digital signature 112 in the certificate 101 for the Register Certificate/PK 231 transaction can be identified based on the parent certificate 235 value. The input 272 can also include (v) an expiration time 150 for the certificate 101 being registered. In exemplary embodiments, the expire time 150 represents a date and time value, such as, but not limited to, the UNIX epoch time.

The fingerprint 102 depicted as H(Cert/PK) 102 over the certificate 101 uniquely identifies the certificate and the full certificate 101 does not need to be recorded in the blockchain system 200 and with a Register Certificate 231 transaction. A secure hash value 102 may comprise an exemplary 32 bytes, while a full certificate 101 supporting industry standard PQC signature algorithm could typically require in the range of 2000-6000 bytes. The URL 234 for the certificate 101 can be a HTTPS address for downloading the certificate 101. By storing the URL 234 for the certificate 101 in a block 201 and a transaction 210, parties storing the blockchain data for system 200 can optionally download the certificate 101 from the URL 234 and calculate the "fingerprint" or secure hash value 102 for the certificate 101. In this manner, parties using the blockchain system 200 to receive and verify a certificate 101 can confirm the calculated secure hash value for a fingerprint 101 of the downloaded certificate 101 from URL 234 matches the recorded fingerprint 102 in the input 272 for transaction 210-3.

As depicted in FIG. 2*a*, a Proof of Stake validator 208 can take the input from a "Register Certificate/PK" transaction 210-3 and use both block generation algorithm 290 and the quantum safe virtual machine 280 with contract code 281 for contract 231 in order to process the transaction 210-3. Assuming all fields are properly specified and compatible with both (i) block generation algorithm 290 and (ii) the quantum safe virtual machine 280, the validator 208 can include the confirmed transaction 210-3 in a block 201 for blockchain 200. Successful execution of the transaction 210-3 with input 272 for contract 238 can update the state root, as depicted in FIG. 2*a* and also described above in this FIG. 2*a*. Additional description related to the processing and execution of a "Register Certificate/PK" transaction 210-3 are depicted and described in connection with FIG. 5 below, including a step 510.

The steps for a validator 208 to process a pending "Register Certificate/PK" transaction 210-3' and generate a confirmed "Register Certificate/PK" transaction 210-3 can include (i) verifying that fingerprint 102 in the pending transaction is unique for input into a contract 231, (ii) verifying the signature 215-3 is correct for the public key 206, and (iii) verifying that a sufficient amount 214-3 and gas (if separately accounted for than with amount 214-3 has been transferred. Failure for any of the above or other steps processed by the contract 231 or pending transaction 210-3' can result in a failure field to be flagged with the confirmed transaction 210-3' that is inserted within the depicted block 201-2. A field for success/failure could be included with any confirmed transaction 210 in a block 201, where the field for success/failure is not depicted for transactions in FIG. 2*a*. Successful confirmed transactions 210 can be marked with a value and designation such as "success" and failed confirmed transactions 210 can be market with a value or designation such as a failure code corresponding to any of (i) through (iii) above in this paragraph and also other failure codes for other reasons for a pending transactions 210' to fail as well could be included with a failure code.

A fourth transaction 210-4 for block data 209-2 within block number 201-2 can include data for a quantum safe smart contract 238 and the secure revocation of a certificate 101 by a certificate owner. An example of a certificate owner could be the entity or identification represented by the common name 117 within a certificate 101. Within a blockchain system 200, the owner 117 can also be identified as owner 232, where owner 232 represents an address 404 (in FIG. 4) or a public key 206 controlled by an entity identified by common name 117. The numeral depiction of 238 can represent an address for the smart contract on the blockchain, which can comprise a series of unique bytes, such as but not limited to 20 bytes, (selected from a hash value over data for the contract such as contract code 281 for the contract 238). A smart contract herein can be referred to using the address of the smart contract, and thus the term "contract 238" can refer to the contract with an address value of 238 depicted in FIG. 2*a*. As depicted in FIG. 2*a*, additional details for the operation of contract 238 are depicted and described in connection with FIG. 6 below. Note that the smart contract 238 could also be used to revoke a public key 103 instead of a full certificate 101.

Note that the secure revocation of a certificate 101 by a certificate owner 232 using a blockchain system 200 and contract 238 provides a significant improvement over conventional technology, where conventional technology normally does not support a certificate owner 232 or identity for a certificate owner 117 to revoke a certificate 101 unilaterally and without interaction with a certificate authority 110 issuing the parent certificate for the digital signature 112 in certificate 101. In other words, with conventional technology, a certificate owner with a name or identity 117 must first contact and rely upon the certificate authority for certificate 101 to revoke the certificate 101. In the present disclosure, a certificate owner can securely submit a transaction 210-4 with contract 238 in order to securely revoke a certificate 101.

As depicted in FIG. 2*a*, the fourth transaction 210-4 can include (i) a "from" value for a sender/originator of the transaction, where the value can comprise a public key 206-4 for the sender/originator, (ii) the destination contract address 238, and (iii) a transaction nonce 206*n*-4. In a preferred exemplary embodiment, the public keys 206 for senders can support a stateful digital signature algorithm of XMSS. For stateful digital signature algorithms, multiple signatures are possible for a private key, but there is a limit to the number of signatures that can be securely generated and a count or index for the current number should be transmitted along with a signature. A node verifying the signature will need at least the public key, the signature, and the transaction nonce 206*n*-4 value. In other words, a one-time signature (OTS) key index (or equivalent) is used with stateful signature algorithms in order to keep track of state for the number of signatures issued using a private key. In the present invention the transaction nonce 206*n*-4 value can be equal to the OTS key index used to generate signature 215-4 from private key 206*a*-4 for public key 206-4.

As depicted in FIG. 2*a*, the fourth transaction 210-4 can include (iv) a transaction amount 214-4, (v) a digital signature 215-4 for the private key 206*a*-4 and also the transaction nonce 206*n*-4, which can be a OTS key index, (vi) a transaction secure hash value 216-4, and (vii) input 273 for the smart contract 238, where the input represents a series of values for executing the smart contract 238. The use of a transaction amount 214-4 for a transaction with a smart contract can represent an amount of tokens or "coins" that are transferred to the smart contract for the transaction. The transaction secure hash value 216-4 can represent a secure hash value over data within the transaction, similar to the unique "fingerprint" 102 depicted in FIG. 1a above. The transaction secure hash value 216-4 can also be referred to as a "transaction ID". The fourth transaction 210-4 can also include a value for an algorithm 115 to specify the use of a digital signature algorithm for verifying the digital signature 215-4 with the public key 206-4.

As depicted in FIG. 2a, fourth transaction 210-4 can include input 273 for the contract 238. As mentioned above, contract 238 can be for "Revoke Certificate/PK" by the certificate or public key owner, which is also depicted and described in connection with FIG. 6 below. Input 273 can include registration number 239, where registration number 239 can be a combination of the block number 202 and block transaction number 511 for the previous Register Certificate/PK 231 transaction to register the certificate 101 or public key 103 being revoked by the transaction 210-4. Input 273 can also include the certificate/PK fingerprint 102 for the certificate 101 or public key 103 being revoked in a transaction 210-4. For some embodiments, only a single value from registration number 239 and certificate/PK fingerprint 102 are required for a transaction 210-4 with contract 238, instead of both registration number 239 and certificate/PK fingerprint 102. However, the inclusion of both provides an additional layer of security and confirmation that the correct and properly identified certificate 101 or public key 103 are being revoked, since both registration number 239 and certificate/PK fingerprint 102 can be checked in contract code 281 for contract 238 for matching the same certificate 101 or public key 103.

As depicted in FIG. 2a, a Proof of Stake validator 208 can take the input from a "Revoke Certificate/PK" transaction 210-4 and use both block generation algorithm 290 and the quantum safe virtual machine 280 with contract code 281 for contract 238 in order to process the transaction 210-4. Assuming all fields are properly specified and compatible with both (i) block generation algorithm 290 and (ii) the quantum safe virtual machine 280, the validator 208 can include the confirmed transaction 210-4 in a block 201 for blockchain 200. Successful execution of the transaction 210-4 with input 273 for contract 238 can update the state root, as depicted in FIG. 2a and also described above in this FIG. 2a. Additional description related to the processing and execution of a "Revoke Certificate/PK" transaction 210-4 are depicted and described in connection with FIG. 6 below.

FIG. 2b

FIG. 2b is a flow chart illustrating exemplary steps for digital signature generation and digital signature verification using PKI keys, parameters, and data input, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

A digital signature generation step 255 can be performed by a client 304 or a node 301 supporting blockchain system 200, where an exemplary client 304 and node 301 are depicted and described in connection with FIG. 3 below. The digital signature generation step 255 creates a digital signature 215, where the use of a digital signature 215 for individual transactions 210 is depicted and described in connection with FIG. 2a above. The exemplary generation of digital signature 215-3 depicted in FIG. 2b corresponds to the generation of digital signature 215-3 for transaction 210-3, which includes data for a "Register Certificate/PK" transaction with smart contract 231 depicted and described above in FIG. 2a and also in FIG. 5 below.

A numeric or alphanumeric code for the signature algorithm 115i can be used to specify the corresponding digital signature algorithm 115 and could comprise a combined value of three separate fields for (i) name of the digital signature algorithm, (ii) a value for the secure hash algorithm used with the digital signature algorithm, and (iii) security level (or PK/signature length) associated with the digital signature algorithm. Example names for the name of the digital signature algorithm include RSA, ECDSA, ECC Schnorr, XMSS, LMS, Dilithium, Falcon, and SPHINCS+. Example secure hash algorithms include SHA2, SHA3, and SHAKE with lengths of 256, 384, or 512 bits. Example security levels can correspond to level 1 with a security or strength equivalent to AES symmetric encryption with 128 bits, level 3 with a security or strength equivalent to AES symmetric encryption with 192 bits, and level 5 with a security or strength equivalent to AES symmetric encryption with 256 bits. Other combinations and values for an identification of a digital signature algorithm 115i in a transaction 210-3 are possible as well, without departing from the scope of the present disclosure.

In FIG. 2b, a signature generation step 255 a node 301 or a client 304 can process and select data to include in a message to sign 250, where the message to sign 250 can include portions of a transaction 210-3 (without the digital signature 215-3 itself). In other words, digital signature 215-3 for a transaction 210-3 can be over all data within the transaction 210-3 except for the digital signature itself. A protocol or specification for blockchain system 200 and blockchain network 400 (in FIG. 4 below) can specify the specific structure, sequence, and format of data to include within both the message to sign 250 from a client 304 or node 301 (in FIG. 3) and the message to verify 250' used by a validator 208 or other nodes 301 in order to verify a transactions 210-3. In exemplary embodiments, the message to sign 250 and the message to verify 250' are identical, where message to sign 250 is selected and processed by a node or client generating the signature 215 and the message to verify 250' is selected and processed at least by a validator before including the data for a transaction 210-3 in a block 201.

The depicted portions of a transaction 210-3 for a message to sign 250 can include (i) a "from" value for a sender/originator of the transaction, where the value can comprise a public key 206-3 for the sender/originator, (ii) the destination contract address 231, (iii) a transaction nonce 206n-3, (iv) owner 232, which can represent an address 404 or public key 206 for the owner of the certificate 101 being registered, (v) a secure hash value 102 over the certificate 101, which can represent the certificate fingerprint 102 in FIG. 1a, (vi) a uniform resource locator (URL) 234 for the certificate 101, (vii) a parent certificate 235 value to uniquely identify a certificate for verifying signature 112 in a certificate 101, and (vii) an expiration time 150 for the certificate 101 being registered. Additional related data could be included in a message to sign 250 for a transaction 210-3 without departing from the scope of the current disclosure, such as the depicted values for a transaction amount 214-3 and an algorithm identifier 115i. For example a transaction nonce 206n-3 can also be included in the message to sign 250.

In FIG. 2b, signature creation step 255 can comprise a step using the sub-steps of (i) obtaining the message to sign 250, (ii) calculating a secure hash value or message digest 241 with a specified secure hash algorithm, (iii) using a private key 206a-3 for the server public key 206-3 with a signature algorithm 115, where a value 115i for the signature algorithm 115 can be in transaction 210-4, selecting parameters 243 for the signature algorithm 115 which could be specified in a protocol or programming code for blockchain 200. Or, the parameters 243 could also be specified by the signature algorithm 115. Note that message digest 241 is depicted with dashed lines, which means the use of a message digest 241, such as SHA3-256 or another secure hash algorithm over the message to sign 250, can be omitted and the full message to sign 250 can be input into the signature algorithm 115 instead of a hash of the message to sign. For example, the Falcon signature algorithm specifies or anticipates that a full message to sign is input into the signature algorithm instead of a hash value or message digest of the message to sign. Consequently, the use of a message digest can depend on a selected signature algorithm.

Signature creation step 255 can also include input of transaction nonce 206n-3 or OTS index 206n-3, which may be required for stateful signature schemes such as XMSS for signature algorithm 115. For stateless signature schemes such as Dilithium, the transaction nonce 206n-3 can be included in the message to sign 250.

Digital signature generation step 255 could comprise a hash-based digital signature algorithm such as XMSS or Sphincs+ or a lattice-based digital signature algorithm such as Dilithium or Falcon, and other possibilities exist as well for a signature algorithm 115 and signature verification algorithm 115' in FIG. 2b without departing from the scope of the present disclosure. In exemplary embodiments the signature generation step 255 could use a post-quantum cryptography digital signature algorithm instead of a classical digital signature algorithm such as RSA or ECSDA or Schnorr digital signatures. The message to sign 250 values can be input into a message digest algorithm or secure hash algorithm 241, which could comprise a standard algorithm such as SHA-256, SHA-3, or similar algorithms. The output of message digest algorithm 241 can be input along with parameters 243 and the private key 206a-3 for public key 206-3 into signature algorithm 115. Parameters 243 can specify encoding rules, padding, key lengths, selected security levels, a tree height (for stateful hash-based algorithms), and other values or fields necessary to utilize a signature algorithm 115. Both a signature creation step 255 and a signature verification step 256 in FIG. 2b can use the same or equivalent values for parameters 243.

The output of the signature algorithm 115 in a step 255 can be a digital signature 215-3, which can be both (i) transmitted to a blockchain network 400 (as depicted in FIG. 4 below) for a pending transaction 210-3' and subsequently (ii) used for input in a digital signature verification step 256. Each of the exemplary transactions 210 in FIG. 2a could include different data for a corresponding message to sign 250 for the transactions 210.

FIG. 2b also depicts a second exemplary message to sign 251 for a transaction 210-4 with a "Owner Revoke Certificate" transaction. Message to sign 251 can include (i) a "from" value for a sender/originator of the transaction, where the value can comprise a public key 206-4 for the sender/originator, (ii) the destination contract address 238, and (iii) a transaction nonce 206*n*-4, (iv) a transaction amount 214-4, (v) an algorithm 115*i* of a value identifying the signature algorithm to use for verifying signature 215-4, and contract data comprising input 273. The contract data comprising input 273 for inclusion in a message to sign 251 can include (i) a registration number 239 for the certificate 101 being revoked, (ii) the secure hash value or fingerprint 102 for the certificate 101 being revoked. The digital signature 215-4, output from using the input of message to sign 251 with algorithm 115 and private key 206*a*-4, is depicted and described in connection with FIG. 2*a* above for a transaction 210-4.

FIG. 2*b* also depicts a digital signature verification step 256, where digital signature verification step 256 can be conducted by a validator 208 before including a pending transaction 210-3' in a block 201 as depicted in FIG. 2*a* above. Other nodes in a blockchain network 400 as depicted in FIG. 4 below could also conduct the digital signature verification step 256. In summary, a digital verification step 256 verifies a digital signature 215 for a transaction 210 using the public key 206 and the signature verification algorithm 115'. A signature verification algorithm 115' can comprise using the same signature algorithm 115, but for verification of digital signatures 215 instead of generation of digital signatures 215.

A digital signature verification step 256 for a transaction 210-3 can select the same data and format of data as the message to sign 250. In this way, the input into both the signature algorithm 115 to generate a signature 215-3 can be exactly the same as the input into the signature verification algorithm 115' to verify the signature 215-3. The exemplary data for use of a message to sign 250 data was depicted and described above for generation of the signature 215-3. For a digital signature verification step 256, the message to verify 250' data can also be input into a message digest 241, where a message digest 241 was depicted and described above for the digital signature generation step 255. For some embodiments, the use of a message digest 241 could be omitted and the full message to verify 250' can be input into the signature verification algorithm 115' (if the message digest 241 was also omitted in the signature generation step 255).

A digital signature verification step 256 for a transaction 210-3 can input the received digital signature 215-3 that was included in the pending transaction 210-3', where digital signature 215-3 in transaction 210-3 was depicted and described in connection with FIG. 2*a* above. For a signature verification algorithm 115', the public key 206-3 received with the transaction 210-3 is input into the signature verification algorithm 115'. Public key 206-3 corresponds to private key 206*a*-3 used to generate the digital signature 215-3. The same parameters 243 used with signature algorithm 115 in a digital signature generation step 255 can be input into the signature verification algorithm 115', where parameters 243 were depicted and described above for the digital signature generation step 255.

For embodiments with stateless signatures and an OTS index or transaction nonce 206*n*-3 was input and used in the digital signature generation step 255, then OTS index or transaction nonce 206*n*-3 can also be used in the digital signature verification step 256. The optional use is depicted by the dashed lines, where use of stateful signatures such as XMSS require the OTS index for signature generation and verification. For stateless digital signatures such as with Dilithium, the optional use of OTS index for input into the signature verification algorithm 115' could be omitted and the transaction nonce 206*n*-3 can be included in the message to sign 250 and the message to verify 250'.

The output of a digital signature verification algorithm 115' can be a pass/fail value 245. If the signature 215-3 is verified, then the pass/fail value can correspond to "pass" or "OK", and the transaction 210-3 can be trusted as generated by a node or client that operates with the private key 206*a*-3 corresponding to the public key 206-3 in the transaction 210-3. A value of "pass" or "OK" means the transaction 210-3 can be included in a block 201. A value of "fail" or "not OK" for the pass/fail value 245 means the signature 215-3 is not verified and the transaction 210-3 is not trusted and the transaction 210-3 should not be included in a block 201.

FIG. 2*b* also depicts a second exemplary message to verify 252 for a transaction 210-4 for an "Owner Revoke Certificate" transaction. Message to verify 252 can include (i) a "from" value for a sender/originator of the transaction, where the value can comprise a public key 206-4 for the sender/originator, (ii) the destination contract address 238, and (iii) a transaction nonce 206*n*-4, (iv) a transaction amount 214-4, (v) an algorithm 115 of a value identifying the signature algorithm to use for verifying signature 215-4, and contract data comprising input 273. The contract data comprising input 273 for inclusion in a message to verify 252 can include (i) a registration number 239 for the certificate 101 being revoked, (ii) the secure hash value or fingerprint 102 for the certificate 101 being revoked. Although not depicted in FIG. 2*b*, the message to verify 252 could be input into a signature verification algorithm 115' with corresponding data equivalent to the message to verify 250' above in order to verify a digital signature 215-4 for a transaction 210-4. The digital signature 215-4 is depicted and described in connection with FIG. 2*a* above for a transaction 210-4.

FIG. 3

Figure 3:
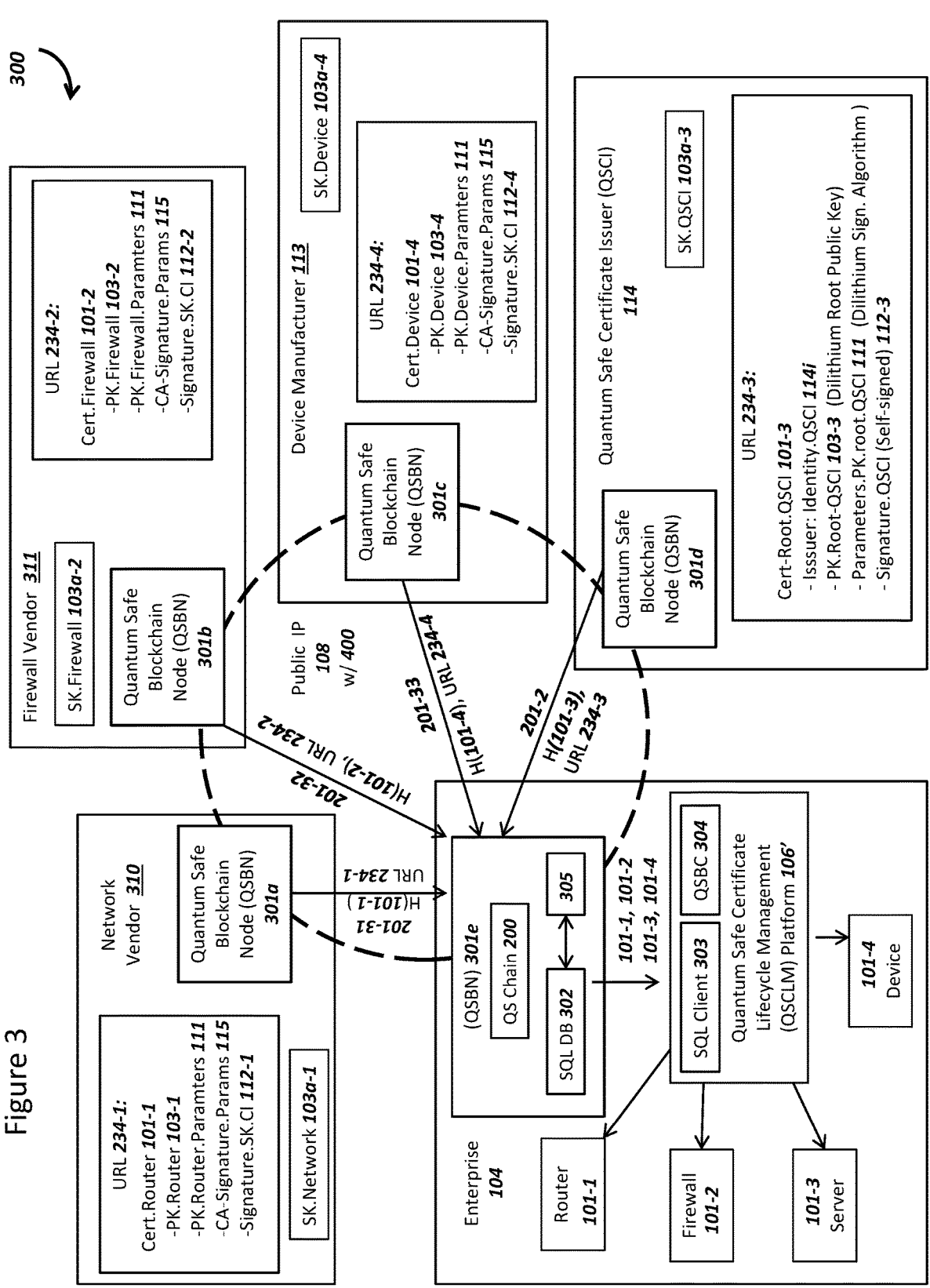
FIG. 3 is a graphical illustration of an exemplary system of nodes using a quantum safe blockchain for the secure distribution of certificate or public key data over an insecure network such as the Public Internet, in accordance with exemplary embodiments.

FIG. 3 is a graphical illustration of an exemplary system of nodes using a quantum safe blockchain for the secure distribution of certificate or public key data over an insecure network such as the Public Internet, in accordance with exemplary embodiments. A system 300 can include a plurality of nodes 301, where each of the nodes 301 can be associated with different communicating entities sharing certificate 101 or public key 103 data. The system 300 depicted in FIG. 3 illustrates nodes 301 securely sharing data for certificates 101, but the nodes could also share public key 103 data as well, such that the use of certificates 101 is not required for some communications.

A system 300 could include an enterprise 104 which prefers to receive data for certificates 101 over the insecure Public IP network 108 from a variety of exemplary entities associated with enterprise 104 that could represent commercial partners or vendors or customers. The entities can include a network vendor 310, a firewall vendor 311, a device manufacturer 113 and a quantum safe certificate issuer (QSCI) 114. Each of the entities associated with enterprise 104 could operate a quantum safe blockchain node (QSBN) 301. Network vendor 310 could operate QSBN 301*a*, firewall vendor 311 could operate QSBN 301*b*, device manufacturer could operate QSBN 301*c*, and QSCI 114 could operate QSBN 301*d*. Enterprise 104 could operate QSBN 301*e*. Each of the depicted entities in FIG. 3 could communicate with additional or other entities, or some entities could also be omitted without departing from the scope of the present disclosure.

A QSBN 301 can represent a node for a blockchain system 200 which both records blocks 201 and generate transactions pending 210' or confirmed transactions 210 when functioning as validators 208. Electrical components for an exemplary QSBN 301 are depicted and described in connection with FIG. 9 below. The QSBN is designated as "quantum safe" because the signature algorithm 115 used with transactions 210 can comprise support or exclusively use post-quantum cryptography for signature algorithms 115 such as XMSS, LMS, Dilithium, Falcon, or Sphincs+. Different versions and uses for a QSBN 301 are depicted with different entities, such as QSBN 301a with network vendor 310, QSBN 301b with firewall vendor 311, etc., and each of the different depicted QSBN can comprise a QSBN 301. As depicted for QSBN 301e for enterprise 104, each QSBN can include the blockchain system 200 comprising the plurality of blocks 201. Although not depicted in FIG. 3, a QSBN 301 could also include the validator 208 functionality depicted and described in connection with FIG. 2a above.

A QSBN 301 such as the exemplary QSBN 301e for enterprise 104. A QSBN 301 such as QSBN 301e can include structured query logic (SQL) database 302. The SQL database 302 can record data associated with transactions 210 and smart contracts such as contracts 222, 231, and 238, such that an SQL client 303 located at other servers or computers can readily query data within blockchain system 200 using SQL queries. In other words, blockchain system 200 can include blocks 201 (in FIG. 2a) with transactions 210 (in FIG. 2a) that are securely recorded and communicated and agreed across a network 400 (in FIG. 4) according to a consensus algorithm. But, the data within blockchain 200 may not be readily queried directly when stored in a blockchain 200. In exemplary embodiments a SQL database 302 parses each block 201 within blockchain 200 and stores the associated data for each block 201 in database tables. Exemplary data stored within tables within SQL database 302 include (i) a first table of data for a series of transactions 210-2 with contract input 271 in FIG. 5 below, and (ii) a second table of data for a series of transaction 210-3 with contract input 272 in FIG. 6 below, and (iii) a third table of data for an exemplary certificate table 805 in FIG. 8 below.

A QSBN 301 can also include a certificate URL download client 305. In exemplary embodiments, certificate data recorded in a blockchain 200 includes a URL 234 as depicted and described with transaction 210-3 in FIG. 2a above. A URL download client 305 can receive the URL 234 from an SQL database 302, which securely received the URL 234 from a blockchain system 200 through a blockchain network 400 (depicted in FIG. 4 below). The URL download client 305 can fetch or download the full certificate 101 based upon a URL 234 received in a confirmed block 201 that has a successfully confirmed transaction 210-3. An example of the steps for a URL download client 305 to take are depicted and describe below in connection with FIG. 8, where a step 305a sends an HTTP/S request to the URL 234 and a step 305b receives an HTTP/S response with the certificate 101. The fingerprint 102 for the certificate 101 downloaded can be compared against the H(cert) 102 received in the transaction 210-3 from a block 201-2.

An enterprise 104 can include a Quantum Safe Certificate Lifecycle Management (QSCLM) Platform 106', which can be equivalent to a certificate lifecycle management platform (CLM) 106 described above, but with the addition of supporting PQC algorithms and certificates. The QSCLM 106' can include an SQL client 303 and a quantum safe blockchain client (QSBC) 304. SQL client 303 can submit queries and communicate with SQL database 302, such that QSCLM 106' can receive and store data relevant to enterprise 104 from the QSBN 301e. The QSBC 304 can represent a blockchain client that can submit transactions for a blockchain system 200 and blockchain network 400 (depicted in FIG. 4 below). Some transactions for enterprise 104, such as a "Register Certificate" transaction 210-3 could be initiated by a QSCLM 106' using a QSBC 304. In other words, a blockchain client, which can also be referred to as a "wallet" for blockchain systems, can generate pending transactions 210' without requiring the blockchain client to operate as a node 301.

As depicted in FIG. 3, a series of certificates 101 for enterprise 104 could be internally transferred from QSBN 301e to QSCLM 106', where the series of certificates 101 could comprise a certificate 101-1 for a router, certificate 101-2 for a firewall, certificate 101-3 for a server, and certificate 101-4 for a device. The depicted computing devices within an enterprise 104 could be configured to receive certificate data from the QSCLM 106'.

Different combinations or arrangements for a QSCLM 106', QSBN 301e, SQL database 302 and URL download client 305 are possible as well without departing from the scope of the present disclosure. For some embodiments, QSCLM 106' could include QSBN 301e. For other embodiments, the QSBN 301e could operate in the cloud and physically separate from offices or facilities owned by enterprise 104. SQL database 302 could also be a separate server or group of servers from QSBN 301e. URL download client 305 could be within QSCLM 106', where the (x) URLs 234 for certificates 101 are passed to the QSCLM 106' from the QSBN 301e or SQL database 302 instead of (y) the certificates 101 are passed to the QSCLM 106'.

Each of the entities in FIG. 3 comprising network vendor 310, a firewall vendor 311, a device manufacturer 113 and a quantum safe certificate issuer (QSCI) 114 could generate or record certificates 101 for use by enterprise 104 and also other nodes or networks as well. A technical challenge being solved by a system 300 is the secure transmission of data for certificates 101 through an insecure Public IP network 108, where a technical challenge or unsolved problem is depicted and described in connection with FIG. 1b above. In summary, after Q-day, for certificates 101 that include PQC public keys 103 and signatures 112, blockchain system 200 and blockchain network 400 (depicted in FIG. 4 below) can ensure that certificates 101 can still be transferred through Public IP network 108 when secure sessions from protocols such as TLS and Wireguard are still using non-PQC algorithms.

Note that although confirmed blocks 201 are depicted as (i) originating from QSBN 301a, 301b, etc. in FIG. 3 and (ii) being received by QSBN 301e for enterprise 104, in preferred embodiments the QSBN 301a, 301b, etc. generate pending transactions 210-3' and send the pending transactions 201-3' to blockchain network 400 depicted and described in connection with FIG. 4 below. A validator 208 for blockchain network 400 (from FIG. 2a above) confirms the pending transaction 210-3' (shown in FIG. 5 below) and generate the confirmed blocks 201 depicted, and these confirmed blocks 201 are received by QSBN 301e. In other words, for normal operation, the confirmed blocks 201 with data for certificates 101 are not transmitted directly from QSBN 301a, 301b, etc. to the QSBN 301e. Instead the blockchain network 400 (in FIG. 4 below) with validators 208 converts a successfully executed pending transactions 210-3' from QSBN 301a, 301b, etc. into a confirmed blocks 201 (also with other transaction 210 data), and the QSBN 301e receives and processes the confirmed blocks 201 to securely receive data for the certificates 101-1, 101-2, etc.

The functions and operations described within this paragraph are also depicted and described in connection with FIG. 4 and FIG. 5 below.

A network vendor 310 can include a QSBN 301a, a URL 234-1 for a certificate 101-1, and a private key 103a-1 for the public key 103-1 in the certificate 101-1. A network vendor 310 could operate a server that hosts URL 234-1 for certificate 101-1. The network vendor 310 could be an Internet Service Provider (ISP) which provides access to public and private wide-area networks. Network vendor 310 may need a router for enterprise 104 to securely record a certificate 101-1 for access to a network operated by network vendor 310. The certificate 101-1 could include data equivalent to the certificate 101 depicted and described in connection with FIG. 1a above, which could be used by a router in enterprise 104 for establishing secure sessions with network vendor 310, including PQC secure sessions when certificate 101-1 includes PQC data for values such as PK.Router 103-1 and PK.Router.Paramters 111.

After generating the certificate 101-1 the network vendor 310 can use the QSBN 301a and blockchain system 200 and blockchain network 400 (depicted in FIG. 4 below) to submit a pending transaction 210-3' for the certificate 101-1. The pending transaction 210-3' can include the exemplary input 272 depicted and described in connection with FIG. 2a above and also FIG. 5 below. A valid or confirmed transaction 210-3 can subsequently be included in a block 201-31, where the block includes the input 272 of at least the certificate fingerprint 102-1 and the URL 234-1 for the certificate 101-1. All QSBN 301 in a blockchain network 400 (depicted in FIG. 4 below) can receive and store the block 201-31, including QSBN 301e for enterprise 104. In this manner the data for certificate 101-1 comprising the fingerprint 102-1 and the URL 234-1 can be securely received by enterprise 104 using QSBN 301e. The URL download client 305 for enterprise 104 can subsequently download certificate 101-1 using the URL 234-1 and enterprise 104 could securely store the certificate 101-1 in a router.

In preferred exemplary embodiments, enterprise 104 also calculates a temporary fingerprint 102' for the downloaded certificate 101-1 and compares the calculated fingerprint 102' (not depicted in FIG. 3) with the received H(101-1) in the block 201-31. If the calculated fingerprint 102' matches or is the same as the received fingerprint value of H(101-1), then the downloaded certificate 101-1 can be considered valid and securely received through the URL download client 305. Note that URL download client 305 could use non-quantum safe sessions to download certificate 101-1, and the successful comparison of calculated fingerprint 102' with H(101-1) as the certificate fingerprint for certificate 101-1 confirms the certificate 101-1 has been securely received in a quantum safe manner, since block 201-31 and blockchain system 200 can be quantum safe through the use of PQC algorithms for public keys 206 and signatures 215 as depicted and described in connection with FIG. 2a and FIG. 2b above.

A firewall vendor 311 can include a QSBN 301b, a URL 234-2 for a certificate 101-2, and a private key 103a-2 for the public key 103-2 in the certificate 101-2. A firewall vendor 311 could operate a server that hosts URL 234-2 for certificate 101-2. The firewall vendor 311 could supply computing firewall equipment for networks operated by enterprise 104. Firewall vendor 311 may need a security firewall for enterprise 104 to securely record a certificate 101-2 for supporting firmware updates for firewall vendor 311. The certificate 101-2 could include data equivalent to the certificate 101 depicted and described in connection with FIG. 1a above, where the key usage could include firmware or software digital signatures. Previous certificates 101 for a firewall could support classical cryptography (such as RSA/ECC), but firewall vendor 311 and enterprise 104 could prefer that a new certificate 101-2 includes PQC data for values such as PK.Firewall 103-2 and PK.Firewall.Paramters 111.

After generating the certificate 101-2 the firewall vendor 311 can use the QSBN 301b and blockchain system 200 and blockchain network 400 (depicted in FIG. 4 below) to submit a pending transaction 210-3' for the certificate 101-3. The pending transaction 210-3' can include the exemplary input 272 depicted and described in connection with FIG. 2a above and also FIG. 6 below. A valid and confirmed transaction 210-3 can subsequently be included in a block 201-32, where the block includes the input 272 of at least the certificate fingerprint 102-2 and the URL 234-2 for the certificate 101-2. All QSBN 301 in a blockchain network 400 (depicted in FIG. 4 below) can receive and store the block 201-32, including QSBN 301e for enterprise 104. In this manner the data for certificate 101-2 comprising the fingerprint 102-2 and the URL 234-2 can be securely received by enterprise 104 using QSBN 301e. The URL download client 305 for enterprise 104 can subsequently download certificate 101-2 using the URL 234-2 and enterprise 104 could securely store the certificate 101-2 in a firewall.

In preferred exemplary embodiments, enterprise 104 also calculates a temporary fingerprint 102' for the downloaded certificate 101-2 and compares the calculated fingerprint 102' (not depicted in FIG. 3) with the received H(101-2) in the block 201-32. If the calculated fingerprint 102' matches or is the same as the received fingerprint value of H(101-2), then the downloaded certificate 101-2 can be considered valid and securely received through the URL download client 305. Note that URL download client 305 could use non-quantum safe sessions to download certificate 101-2, and the successful comparison of calculated fingerprint 102' with H(101-2) as the certificate fingerprint for certificate 101-2 confirms the certificate 101-2 has been securely received in a quantum safe manner, since block 201-32 and blockchain system 200 can be quantum safe through the use of PQC algorithms for public keys 206 and signatures 215 as depicted and described in connection with FIG. 2a and FIG. 2b above.

A device manufacturer 113 can include a QSBN 301c, a URL 234-4 for a certificate 101-3, and a private key 103a-4 for the public key 103-4 in the certificate 101-4. A device manufacturer 113 could operate a server that hosts URL 234-4 for certificate 101-3. The device manufacturer 113 could supply computing devices for enterprise 104 such as printers, intelligent sensors, manufacturing controllers, and other possibilities exist as well. A certificate 101-4 for computing devices could include data equivalent to the certificate 101 depicted and described in connection with FIG. 1a above. Either enterprise 104 or device manufacturer 113 may need to update a certificate 101 for computing devices managed or owned by enterprise 104 during the operating lifetime of the computing devices. As one example, deployed certificates for computing devices may support classical cryptography (such as RSA or ECC), but enterprise 104 or device manufacturer 113 may prefer the devices upgrade to support PQC algorithms and associated PQC certificates 101. Previous certificates 101 for computing devices operated by enterprise 104 could support classical cryptography (such as RSA/ECC). Device manufacturer 113 and enterprise 104 could prefer that a new certificate 101-4 includes PQC data for values such as PK.Device 107-3 and PK.Device.Paramters 111.

After generating the certificate 101-4 the device manufacturer 113 can use the QSBN 301c and blockchain system 200 and blockchain network 400 (depicted in FIG. 4 below) to submit a pending transaction 210-3' for the certificate 101-4. The pending transaction 210-3' can include the exemplary input 272 depicted and described in connection with FIG. 2a above and also FIG. 5 below. A valid and confirmed transaction 210-3 can subsequently be included in a block 201-33, where the block includes the input 272 of at least the certificate fingerprint 102-4 and the URL 234-4 for the certificate 101-4. All QSBN 301 in a blockchain network 400 (depicted in FIG. 4 below) can receive and store the block 201-33, including QSBN 301e for enterprise 104. In this manner the data for certificate 101-4 comprising the fingerprint 102-4 and the URL 234-4 can be securely received by enterprise 104 using QSBN 301e. The URL download client 305 for enterprise 104 can subsequently download certificate 101-4 using the URL 234-4 and enterprise 104 could securely store the certificate 101-4 in a device.

In preferred exemplary embodiments, enterprise 104 also calculates a temporary fingerprint 102' for the downloaded certificate 101-4 and compares the calculated fingerprint 102' (not depicted in FIG. 3) with the received H(101-4) in the block 201-33. If the calculated fingerprint 102' matches or is the same as the received fingerprint value of H(101-4), then the downloaded certificate 101-4 can be considered valid and securely received through the URL download client 305. Note that URL download client 305 could use non-quantum safe sessions to download certificate 101-4, and the successful comparison of calculated fingerprint 102' with H(101-4) as the certificate fingerprint for certificate 101-4 confirms the certificate 101-4 has been securely received in a quantum safe manner, since block 201-33 and blockchain system 200 can be quantum safe through the use of PQC algorithms for public keys 206 and signatures 215 as depicted and described in connection with FIG. 2a and FIG. 2b above.

A Quantum Safe Certificate Issuer (QSCI) 114 can include a QSBN 301d, a URL 234-3 for a certificate 101-3, and a private key 103a-3 for the public key 103-3 in the certificate 101-3. A QSCI 114 could operate a server that hosts URL 234-3 for certificate 101-3. The QSCI 114 could supply certificates for enterprise 104, such as web server certificates for use in TLS. The web server certificates could expire approximately every year according to common, current practice as of 2022, so QSCI 114 may need to periodically transfer a certificate 101-3 for web servers operated by enterprise 104. A certificate 101-3 for web servers could include data equivalent to the certificate 101 depicted and described in connection with FIG. 1a above.

After generating the certificate 101-3 the QSCI 114 can use the QSBN 301d and blockchain system 200 and blockchain network 400 (depicted in FIG. 4 below) to submit a pending transaction 210-3 for the certificate 101-3. The transaction 210-3 can include the exemplary input 272 depicted and described in connection with FIG. 2a above and also FIG. 5 below for the certificate 101-3. A valid and confirmed transaction 210-3 can subsequently be included in a block 201-2, where the block includes the input 272 of at least the certificate fingerprint 102-3 and the URL 234-3 for the certificate 101-3. All QSBN 301 in a blockchain network 400 (depicted in FIG. 4 below) can receive and store the block 201-2, including QSBN 301e for enterprise 104. In this manner the data for certificate 101-3 comprising the fingerprint 102-3 and the URL 234-3 can be securely received by enterprise 104 using QSBN 301e. The URL download client 305 for enterprise 104 can subsequently download certificate 101-3 using the URL 234-3 and enterprise 104 could securely store the certificate 101-3 in web server.

In preferred exemplary embodiments, enterprise 104 also calculates a temporary fingerprint 102' for the downloaded certificate 101-3 and compares the calculated fingerprint 102' (not depicted in FIG. 3) with the received H(101-3) in the block 201-2. If the calculated fingerprint 102' matches or is the same as the received fingerprint value of H(101-3), then the downloaded certificate 101-3 can be considered valid and securely received through the URL download client 305. Note that URL download client 305 could use non-quantum safe sessions to download certificate 101-3, and the successful comparison of calculated fingerprint 102' with H(101-3) as the certificate fingerprint for certificate 101-3 confirms the certificate 101-3 has been securely received in a quantum safe manner, since block 201-2 and blockchain system 200 can be quantum safe through the use of PQC algorithms for public keys 206 and signatures 215 as depicted and described in connection with FIG. 2a and FIG. 2b above.

FIG. 4

FIG. 4 is a graphical illustration of an exemplary system for a blockchain network and an address algorithm. Address algorithm 411 can generate unique addresses 404 associated with entities based on a public key 206. For some embodiments, entities may prefer to designate an addresses 404 as opposed to public keys 206 for either (i) the recipient or "to" or destination field for a transaction 210 or (ii) the owner 232 field to designate the owner of a certificate 101 in a contract 231. In this manner, by designating the address 404 instead of a public key 203, a blockchain system 200 and a blockchain network 400 can maintain an additional level of security such that the public key 206 is not exposed on a blockchain system 200 until the public key 206 is required to verify a signature 215 for a transaction 210. In exemplary embodiments, the unique address 404 can also be shorter than the full public key, such as using a 20 or 32 or 48 byte addresses 404 while public keys 206 may generally be on the order of a few hundred or couple of thousand bytes.

For generating an address 404, an entity or user can first conduct a node/client key pair generation algorithm 402. The key pair generation algorithm 402 will (i) take a random number and parameters 111 and digital signature algorithm 115 for input and (ii) output at least a public key 206. Depending on the underlying cryptographic algorithm for the key pair generation algorithm (such as ECC, lattice-based cryptography, etc.), the corresponding private key 206a can be the random number in some algorithms (such as ECC), and for other cryptographic algorithms the corresponding private key 206a may be a different number than the random number input into the key pair generation algorithm. As depicted in FIG. 4, for an exemplary embodiment where the XMSS algorithm is utilized with parameters 111, a hash algorithm could comprise SHA3-256 and a specified tree height could be 16. Inputting these values with a random number into a key pair generation algorithm can generate at least public key 206 with an associated secret key 206a.

The public key 206 can then be input into an address generation algorithm 403. The address generation algorithm can apply a specified secure hash over the public key 206 and append a header. The header can depend on the selected cryptographic algorithm for the public key 206 and parameters 111. As one example, a first letter or digit in a header could specify the secure hash algorithm used to generate the address, and a second letter or digit in the header could specify the tree height or other parameters 111 associated with the algorithm for the public key 206 input into the address generation algorithm. In exemplary embodiments, a checksum is appended to the end of the address, where the checksum could comprise a few bytes. The checksum can be used to verify that an entered address reasonably does not have missing, transposed, or incorrect digits. The output of the address generation algorithm can be an address 404 for the public key 206.

Any received public key 206 could also be converted into an address 404 using the same address generation step 403 as depicted in FIG. 4. Consequently an entity for a blockchain system 400 can share addresses 404 corresponding to the public key 206 before needing to reveal the public key 206 for submitting a transaction 210 with a signature 215 over data in the transaction. For example, the blockchain network 400 using blockchain system 200 could have payments or tokens or coins for the amount 214 field transferred to addresses 404. The subsequent transfer of the tokens or coins from the receiving address 404 could be transferred by a transaction 210 for the public key 206 which generated the address 404. The public key 206 would not be revealed to other nodes or clients within a blockchain network 400 for the time between the two sentences above.

Blockchain network 400 can comprise a plurality of nodes, where each of the nodes implements at least a portion of the blockchain system 200. In an exemplary embodiment, the plurality of nodes comprises quantum safe blockchain nodes QSBN 301. Specific instances for QSBN 301 depicted in FIG. 4 include (i) the QSBN 301a for the network vendor 310 depicted and described in FIG. 2 above and also (ii) QSBN 301d for the quantum safe certificate issuer 114. A quantum safe blockchain network 400 can also include clients such as quantum safe blockchain client (QSBC) 304 as depicted in FIG. 4. The QSBC 304 can generate pending transactions 210', such as by using a wallet for the blockchain system. In general, the QSBC 304 does not need to record a plurality of blocks for the blockchain system 200 in order to generate pending transactions 210'. The exemplary QSBC 304 can include an address 404-6 and with a public key PK.CS 206 and corresponding private key PK.CS 206a'. The operation of the exemplary QSBC 304 is also depicted and described in connection with FIG. 6 below.

QSBN 301a can include an identity (ID) 117-1 and an address 404-1. Address 404-1 can be for public key PK.A 206. The ID 117-1 of QSBN 301a could be an example "Company A", which could represent the network vendor 310 in FIG. 3 above. QSBN 301a can include the quantum safe blockchain system 200, which can include the exemplary contracts 222, 231, etc. Note that blockchain system 200 can include all blocks 201 and contracts, with just example contracts listed above. QSBN 301a can also include a SQL database 302 for the blockchain system 200, such that other computers within a network for company A (e.g. with ID 117-1) could access the SQL database 302 in order to obtain certificate 101 or public key 103 data that has been processed by a blockchain system 200.

QSBN 301d can include an identity (ID) 117-2 of QSCI and an address 404-2. Address 404-2 can be for public key PK.QSCI 206, where the designation of "QSCI" can be for a quantum safe certificate issuer 114 as depicted in FIG. 1b and FIG. 3 above. Note that PK.QSCI 206 can be a first public key for conducting transactions 210 on a blockchain system 200, while different public keys 103 for QSCI 114 can within certificates 101. The ID 117-2 of QSBN 301d could be an example "Quantum Safe Certificate Issuer", which could represent the quantum safe certificate issuer 114 in FIG. 3 above. QSBN 301d can include the quantum safe blockchain system 200, which can include the exemplary contracts 222, 231, etc. Note that blockchain system 200 can include all blocks 201 and contracts, with just a few example contracts listed and depicted herein. QSBN 301d can also include a SQL database 302 for the blockchain system 200, such that other computers within a network for QSCI 114 (e.g. with ID 117-2) could access the SQL database 302 in order to obtain certificate 101 or public key 103 data that has been processed by a blockchain system 200.

In some exemplary embodiments, a blockchain network 400 can include at least one administrator 401. The administrator 401 can be responsible for a particularly geographical region, such with an exemplary region being North America. Although not depicted, additional geographical regions could also include administrators. An administrator 401 can be responsible for setting gas fees and also scaling or adjusting amounts 214 or fees that are required to successfully complete pending transactions 210' for smart contracts 231 and 238. For example, if a system 400 starts with a transaction fee of 1 token to complete a Register Certificate 210-3 transaction and the price of the token at that time is $0.10 USD, if the price of the token rises to $1 USD then the price or cost of submitting the Register Certificate transaction 210-3 would increase 10 fold, which would discourage adoption and benefits for using a blockchain system 200 and blockchain network 400. Consequently, an administrator 401 could be responsible for adjusting the amount 214 of tokens over time to successfully complete transactions with smart contract, such that the cost of the transactions in fiat currency such as USD remains relatively stable over time.

In exemplary embodiments, the administrator 401 can retain rights to prevent or block entities such as any of the exemplary companies illustrated in FIG. 3 above from participating in the blockchain network 400. An administrator 401 could register either public keys 206 or addresses 404 that are allowed to submit transactions 210 for the blockchain system 200. In this manner, participating entities could have an identity such as ID 117 verified by the administrator 401. Participating entities would also know and trust the identities of other participants on the blockchain network 400. For example, if a participating entity becomes embargoed or added to the US Department of Commerce Entity List, then an administrator 401 could block those embargoed or entities on the "Entity List" from submitting new pending transactions 210' to the blockchain network 400. In this manner, other participants can continue operating on the blockchain network 400 with confidence that their actions or participation can be conducted in a manner that is not barred by government regulations. An administrator 401 could take additional responsibility as well, such as blocking new pending transactions 210' from public keys 206 or addresses 404 which have violated a "terms of service" or "code of conduct" for participating on the blockchain system 400.

Blockchain system 400 also depicts the transmission, processing, and receipt of transactions 210 for blocks 201 across a plurality of nodes that are connected to the Public IP network 108. FIG. 3 above depicted and described an example transaction 210-3 for a QSCI 114 using a QSBN 301d to securely transfer information for a certificate 101-3 to an enterprise 104 (as well as other nodes within blockchain system 400). FIG. 4 herein depicts additional steps related to the propagation of the data across blockchain network 400. Once the QSCI 114 has generated the certificate 101-3 for use by enterprise 104, QSCI 114 would want to have the certificate 101-3 registered in the blockchain system 200, by propagating the information across the blockchain network 400. Note that the propagation of information for a certificate 101 in a transaction 210-3 also supports the goal of "certificate transparency", which has been implemented in IETF RFC 6962, such that certificates 101 that are issued by certificate issuers can be recorded by all blockchain nodes 301 within a blockchain network 400.

QSCI 114 can use the QSBN 301$d$ to submit a pending transaction 210-3' equivalent to confirmed transaction 210-3 depicted and described in connection with FIG. 2$a$ above. QSBN 301$d$ can perform a digital signature generation step 255 in order to create the digital signature 215-3 for inclusion in the pending transaction 210-3'. As contemplated herein, a pending transaction 210-3' can comprise an unconfirmed or pending transaction that has been submitted to blockchain network 400 for the purposes of verification and inclusion of the confirmed transaction 210-3 in a block 201 for blockchain system 200. As depicted in FIG. 4, the pending transaction 210-3' for the certificate 101-3 can be transferred between nodes according to a peer-to-peer communications algorithm implemented by each of the blockchain nodes 301. The transfer of pending transaction 210-3' to substantially all quantum safe blockchain nodes 301 could be completed in just a few seconds. Only the initial transfer to a few peers of the pending transaction 210-3' is depicted in FIG. 4.

After the pending transaction 210-3' has been received by a substantial majority of all blockchain nodes 301 for a blockchain system 400, a proof-of-stake (PoS) Selection Algorithm 444 could select a validator 208 to select and process a plurality of pending transactions 210' which can include the pending transaction 210-3' generated by QSBN 301$d$ and propagated through the blockchain network 400. Validator 208 could be selected randomly for each block 201 to be generated for blockchain system 200, such that different validators 208 could be selected over time. For some embodiments, PoS Selection Algorithm 444 could select the validator 208 a short time such as several seconds before pending transaction 210-3' has arrived at validator 208. As depicted in FIG. 4, the selected validator 208 could belong to an entity that also operates QSBN 301$z$.

The validator 208 can verify the signature 215-3 for the received pending transaction 210-3 according to the steps depicted and described for a digital signature verification step 256 as depicted and described in connection with FIG. 2$b$ above. After successful verification of the digital signature 215, plus several additional checks and verifications in a step 510 from FIG. 5 below then the validator 208 can propose the new block 201-2 that includes the corresponding confirmed transaction 210-3. The additional checks and verifications in a step 510 can include verifying (i) a coin or token balance for public key 206 has at least the amount 214-3 specified by a controlling contract with amounts 214 set by an administrator 401, (ii) the smart contract 231 (in FIG. 2$a$) successfully executes to completion, and (iii) the public key 206 has not been blocked or disallowed by an administrator 401. The blockchain system 200 can include a reward 445 of several tokens or coins for successfully proposing a new block 201 with transactions 210 that are voted on and accepted by a majority of other validators 208 within a blockchain network 400. The amount of the reward can be either set by administrators 401 or specified by the commonly shared block generation algorithm 290 as depicted and described in connection with FIG. 2$a$ above. The tokens or coins can be used by QSBN 301$z$ to fund future transactions 210 that require an amount 214 to complete. Or, QSBN 301$z$ and the associated entity could simply transfer the reward 445 to another address 404.

After the new block 201-2 has been proposed by validator 208 in blockchain system 400, validator 208 can transmit the proposed block to other nodes as depicted in FIG. 4. The proposed block 201-2 can be received by a majority of the nodes within a few seconds. Nodes that participate as validators 208 could independently verify the data within proposed new block 201-2 and issue a vote and transmit the vote to the blockchain network 400. Once a majority of the validators have voted or verified that the proposed new block 201-2 is correct or accepted, then the block 201-2 can be considered confirmed. After confirmation, the block 201-2 can be used for the next block 201 generated by a blockchain network 400. The transmission of votes for block confirmation and the evaluation of votes by validators 208 or nodes are not depicted in FIG. 4, but would represent a subsequent step after the transmission of the proposed new block 201 by selected validator 208 in FIG. 4. Other possibilities exist as well for a mechanism for a blockchain network 400 to transmit transactions 210 and blocks 201 and reach a consensus for the transactions 210 and blocks 201 without departing from the scope of the present disclosure. The specific process described above for validator 208 to propose a new block 201-2 and be confirmed by the blockchain network 400 also applies to other blocks proposed by validators for the blockchain system 400.

The new, confirmed block 201-2 which has also received a majority of acceptance votes could then be received by QSBN 301$e$ for enterprise 104, which is depicted and described in connection with FIG. 3 above. Note that QSBN 301$e$ does not need to receive the transaction data 210-3 and block 210 directly from QSCI 114 with QSBN 301$d$, but rather can receive the data over the Public IP network 108 and the blockchain network 400 of the plurality of QSBN 301. QSBN 301$e$ can then also verify that block 201-2 received with confirmed transaction 210-3 for certificate 101-3 from QSCI 114. The enterprise 104 operating the QSBN 301$e$ can then conduct the steps depicted and described in FIG. 3 for downloading the certificate 101-3 using the URL 234-3 in the confirmed transaction 210-3 for received block 201-2.

After downloading the certificate 101-3, enterprise 104 operating QSBN 301$e$ can compare the received fingerprint 102 of H(101-3) received in block 201-2 and confirmed transaction 210-3 with a calculated fingerprint over the downloaded certificate 101-3. If the values for the received fingerprint 102 of H(101-3) and the calculated fingerprint over the downloaded certificate 101-3 are the same, then enterprise 104 can trust the downloaded certificate 101-3. If the values for the received fingerprint H(101-3) and the calculated fingerprint over the downloaded certificate 101-3 are not the same, then enterprise 104 can discard the downloaded certificate 101-3 and conduct different steps or another method for attempting to receive certificate 101-3 from QSCI 114.

FIG. 5

Figure 5:
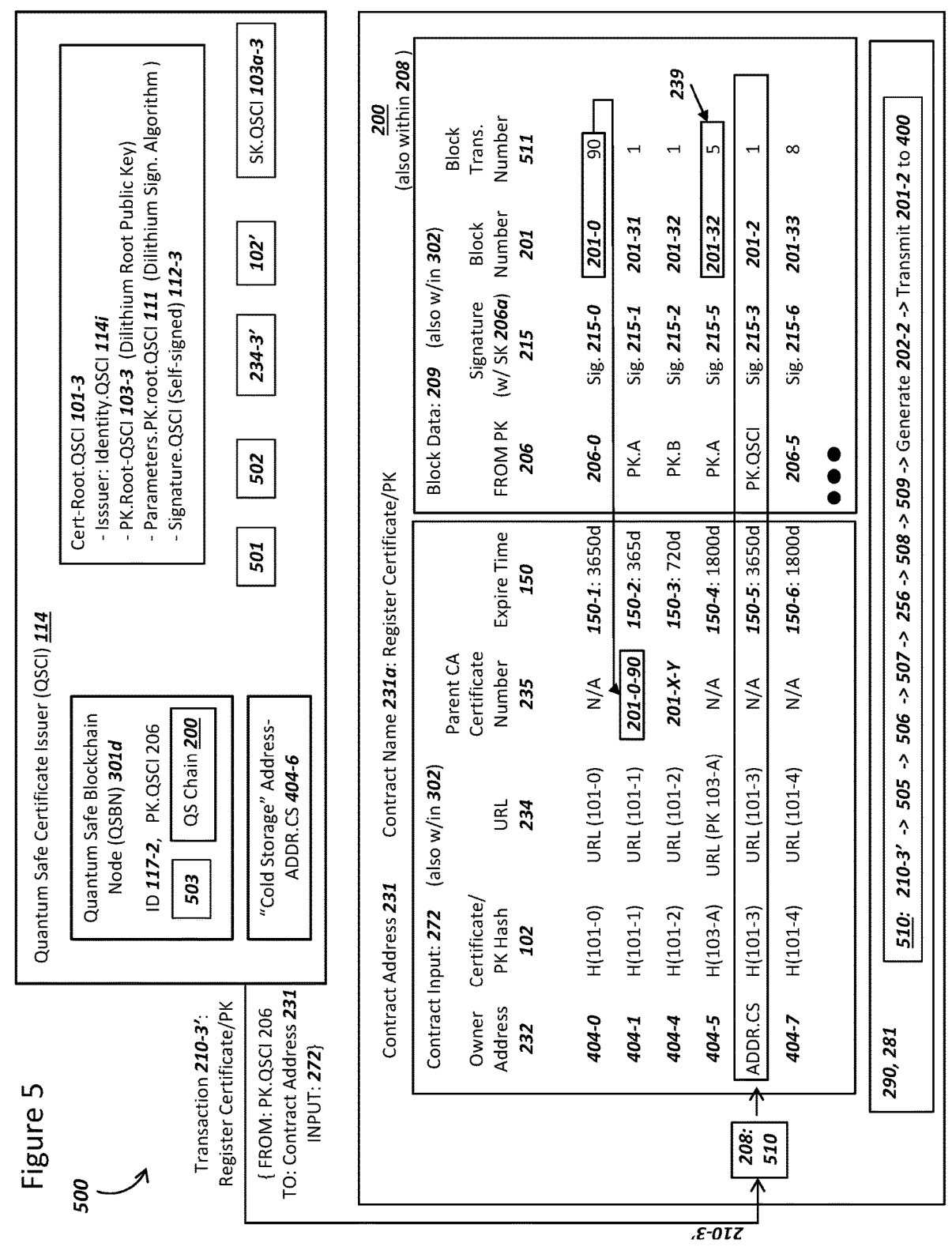
FIG. 5 is a graphical illustration of an exemplary system for (i) a certificate issuer with a blockchain node to generate a Register Certificate/PK transaction and (ii) a validator to use the blockchain system to process and record the transaction, in accordance with exemplary embodiments.

FIG. 5 is a graphical illustration of an exemplary system for (i) a certificate issuer with a blockchain node to generate a Register Certificate/PK transaction and (ii) a validator to use the blockchain system to process and record the transaction, in accordance with exemplary embodiments. System 500 can include Quantum Safe Certificate Issuer (QSCI) 114 and blockchain system 200 operated by a plurality of nodes and at least one validator 208. QSCI 114 can operate the Quantum Safe Blockchain Node (QSBN) 301d, which is also depicted and described in connection with FIG. 3 and FIG. 4 above. Blockchain system 200 can be stored by both QSBN 301d and validator 208, where (i) the storage and operation of blockchain 200 by validator 208 is depicted and described in connection with FIG. 2a above and (ii) the storage and operation of blockchain system 200 also by a QSBN 301 is depicted and described in connection with FIG. 4 above. FIG. 5 depicts the exemplary Register Certificate/PK transaction 210-3 from FIG. 2a with input 272 for a smart contract 231 being processed by a validator 208. FIG. 5 also depicts a plurality of Register Certificate/PK transactions 210-3 from previous blocks 201-31 and 201-32 from FIG. 3 being stored in blockchain system 200 and also SQL database 302 in the form of transaction input 272. The description below will first focus on the generation and processing of a pending Register Certificate/PK transaction 210-3' by QSBN 301d and validator 208, and then describe the other Register Certificate/PK transactions stored within blockchain system 200.

QSCI 114 can perform a series of steps before submitting a pending Register Certificate/PK transaction 210-3' to blockchain system 200. At step 501, QSCI 114 can begin operating a node for the blockchain system 200 comprising the Quantum Safe Blockchain Node (QSBN) 301d. Exemplary hardware and software components for a QSBN 301d are depicted and described in connection with FIG. 9 below. Step 501 can include QSCI 114 generating a first public key PK.QSCI 206 and a corresponding first private key SK.QSCI 206a for signing transactions 210 submitted to blockchain system 200. The first PK.QSCI 206 and corresponding first SK.QSCI 206a can comprise a first PKI key pair using a first PQC signature algorithm, such as XMSS or Dilithium. In other words, the first PQC algorithm can be for generating signatures 215 for blockchain system 200. Blockchain system 200 could specify a few supported PQC signature algorithms for use in an algorithm identifier field 115i depicted and described in connection with FIG. 2b above. The PKI key pair generated in a step 501 can support one of the supported PQC signature algorithms.

A second PQC algorithm could be used for certificates 101 registered and revoked on blockchain 200. Public keys 103 and private keys 103a for certificates 101 could use different PQC or classical algorithms that are different than supported PQC digital signature algorithms for a blockchain system 200. Step 501 can include the generation of a first address 404 for the PK.QSCI 206 using the address generation algorithm 403 from FIG. 4. The use of the first address 404 is not depicted in FIG. 5, and instead the pending transaction 210-3' is generated and processed with the first public key PK.QSCI 206.

In exemplary embodiments, QSCI 114 can also generate a cold-storage address 404-6 for assigning ownership of certificates 101 when generating a Register Certificate/PK transaction 210-3. A second PKI key pair for the first PQC algorithm could comprise a second public key PK.QSCI 206 and a second private key SK.QSCI 206a. For cold-storage applications, the second private key SK.QSCI 206a is stored on a server or computer that is offline and not connected to a LAN with access to public IP network 108. The server storing the second private key SK.QSCI 206a could have security through an "air gap" with any outside networks. The second public key PK.QSCI 206 could be input into an address generation algorithm 403 (depicted and described in connection with FIG. 4) in order to generate a cold storage address Addr.CS 404-6. Cold storage address Addr.CS 404-6 can be used as the owner 232 address in a pending transaction 210-3', where the owner 232 value can subsequently be the address 404-6 for the corresponding second PKI key pair for offline or "air gapped" storage of the second private key SK.QSCI 206a.

Other transactions besides a Register Certificate/PK transaction 210-3 such as Owner Revoke Certificate transaction 210-4 can require the owner address 232. By using an offline second private key SK.QSCI 206a that corresponds to the owner address 232 in the form of cold storage address Addr.CS 404-6, the system 500 can have increased security. In other words, the first private key SK.QSCI 206a can be "online" in order to generate a signature 215-3 for pending transaction 210-3', but the second private key SK.QSCI 206a can be "offline" and within cold-storage for generating the signature 215-4 for a transaction 210-4 to revoke certificate 101-3, which is also depicted and described in connection with FIG. 6 below.

QSCI 114 can perform step 502 for generating a root certificate 101-3, where root certificate 101-3 was also depicted and described in connection with FIG. 1b and FIG. 3 above. In step 502, QSCI 114 can first select a set of cryptographic parameters 111 for a PKI key pair associated with the certificate 101-3. Step 502 includes QSCI 114 generating a private key SK.QSCI 103a-3 and a corresponding public key PK.Root-QSCI 103-3 for certificate 103-3 using the selected cryptographic parameters 111. In step 502, QSCI 114 can then generate certificate 101-3, which can also represent a self-signed root certificate in some exemplary embodiments. For other embodiments, certificate 101-3 could be a non-root certificate such as an intermediate certificate, and for these embodiments the certificate 101-3 could be signed using a different secret key than the depicted SK.QSCI 103a-3.

After the generation of a certificate 101-3 in a step 502, QSCI could conduct a step 234-3' of (i) loading the certificate 101-3 generated in step 502 into a web server and (ii) assigning a URL 234-3 for the certificate 101-3. Web clients or HTTP/HTTPS clients can download the certificate 101-3 using the URL 234-3. An exemplary URL 234-3 for certificate 101-3 is depicted and described in connection with FIG. 3 above. At step 102', QSCI can generate a fingerprint 102 or "thumbprint" for the certificate 101-3 using a secure hash algorithm such as SHA256 or SHA3-256 and inputting the certificate 101-3 into the secure hash algorithm in order to generate a secure hash value for the certificate 101-3. The use of a fingerprint 102 for a certificate 101 is depicted and described in connection with FIG. 1a above. The secure hash value of fingerprint 102 for the certificate 103-3 is depicted in FIG. 5 and also FIG. 3 above as "H(101-3)".

Quantum Safe Blockchain Node (QSBN) 301d can include an identity 117-2 for QSCI 114, and in exemplary embodiments the identity can be the same as or associated with a certificate issuer identity 114i within certificate 103-3. Identity 117-2 can be useful for nodes within a blockchain network 400 to identify the owner or operator of QSBN 301d. In exemplary embodiments, a QSCI 114 may use multiple different certificate issuer identities 114i, where the identity includes an algorithm for the QSCI 114, and in this case the identity 117-2 can be a superset for a collection of different certificate issuer identities 114i.

At step 503, QSCI 114 using QSBN 301d can generate a pending transaction 210-3' for submission to blockchain network 400 (depicted in FIG. 4) for the purposes of verification and inclusion of a corresponding confirmed transaction 210-3 in a block 201 for blockchain system 200. The data for the pending transaction 210-3' can be the same as confirmed transaction 210-3 depicted and described in connection with FIG. 2a above. The pending transaction 210-3' can be a Register Certificate (or Register Public Key) transaction. In summary, QSCI 114 may prefer information such as the fingerprint 102 of H(103-3) and the URL 234-3 for the certificate 101-3 generated in a step 501 to be published or registered in blockchain system 200. From the inclusion of the confirmed transaction 210-3 in a block 201 by a validator 208, then information regarding certificate 103-3 can be distributed and recorded by all nodes in a blockchain network 400.

As described for confirmed transaction 210-3 in FIG. 2a, pending transaction 210-3' can include (i) a "from" value for a sender/originator of the transaction, where the value can comprise the public key PK.QSCI 206 for the sender/originator, (ii) the destination contract address 231, (iii) a transaction nonce 206*n*-3, (iv) a transaction amount 214-3, and (v) a digital signature 215-3 for the private key and also the transaction nonce 206*n*-3. Pending transaction 210-3' can include input 272 for the contract 231. Input 272 can include (i) owner 232, which can represent an address 404 or public key 206 for the owner of the certificate 101-3 being registered, (ii) a fingerprint 102 of the certificate 101-3, which is depicted as secure hash value H(101-3) and generated in step 102', (iii) the uniform resource locator (URL) 234-3 for the certificate 101-3, which was generated in step 234-3', (iv) a parent certificate 235 value, if applicable, and (v) an expiration time 150-5 for the certificate 101-3 being registered. The example certificate 101-3 being registered by the pending transaction 210-3' comprises a root certificate for QSCI 114, and consequently the parent certificate 235 value can be blank or "N/A" or an equivalent designation. Also, the transaction amount 214-3 is not depicted in the table within FIG. 5, although a transaction amount 214-3 for transaction 210-3 is depicted and described in connection with FIG. 2a above.

All of the above information for pending transaction 210-3' can be selected in a step 503. Step 503 can also comprise QSBN 301*d* transmitting the pending transaction 210-3' to blockchain network 400 as depicted and described in connection with FIG. 4. QSBN 301*d* could maintain a list of peer nodes and transmit the pending transaction 210-3' to the peer nodes, which also subsequently forward the pending transaction 210-3' to additional nodes and that process can repeat many times over a few seconds such that substantially all of a blockchain network 400 receives the pending transaction 210-3' within a few seconds.

As depicted in FIG. 5, a validator 208 can receive the pending Register Certificate/PK transaction 210-3'. A validator 208 for a blockchain system 200 is also depicted and described in connection with FIG. 2a and FIG. 4 above. Many nodes or a plurality of nodes within a blockchain network 400 depicted in FIG. 4 above could operate as validators 208. The specific validator 208 for including the pending transaction 210-3' in a block 201 can be selected according to the PoS Selection Algorithm 444 also depicted and described in connection with FIG. 4 above.

The selected validator 208 for pending transaction 210-3' can conduct a step 510 to both (i) verify the pending transaction 210-3' and (ii) include a corresponding confirmed transaction 210-3 in a block 210. A summary of the operation for a validator 208 is provided in FIG. 2a above, including the use of a block generation algorithm 290 and quantum safe virtual machine (QSVM) 280 for operating or executing smart contracts such as contract 231. Step 510 as described in this FIG. 5 includes the specific steps for processing a pending transaction 210-3' for a Register Certificate/PK transaction, or also Register Public Key transaction. The subsequent description for this FIG. 5 will first discuss the processing of the pending transaction 210-3' by validator 208 and then review the series of Register Certificate/PK transactions 210-3 and corresponding blocks depicted within the table shown in FIG. 5.

The bottom box for "290, 281" depicts the resources and steps taken by validator 208 in order to include the pending transaction 210-3' as a confirmed transaction 210-3 in the exemplary block 201-2 depicted in FIG. 2a and also shown as propagated by the validator 208 to the blockchain network 400 in FIG. 4 above. A validator 208 can use the block generation algorithm 290 and the contract code 281 within the QSVM 280 to process the pending transaction 210-3'. At step 505, contract 231 can verify both (i) the transaction amount 214-3 from the pending transaction 210-3' is equal to or greater than a specified transaction amount required to register the certificate 101-3 in blockchain system 200 and (ii) the public key PK.QSCI 206 has a balance in coins or tokens equal to or greater than the amount 214-3. A controlling contract could be maintained by an admin depicted in FIG. 4, where the controlling contract is periodically updated by an administrator 401 (in FIG. 4) to specify the minimum tokens or coins required to conduct a Register Certificate/PK transaction represented by the pending transaction 210-3'. For some embodiments, the transaction amount 214-3 could be the same as a gas required to process the pending transaction 210-3'. If the transaction amount 214-3 is less than (i) the specified transaction amount or (ii) the balance in coins or tokens for the public key PK.QSCI 206, then the contract code 281 for contract 231 can specify the validator 208 denies or rejects including the pending transaction 210-3' in a block 201. Although not depicted in FIG. 5, a blockchain system 200 can record a coin or token balance for all public keys 206 or addresses 404 that have transactions 210 with amounts 214 to receive the coins or tokens. Successful completion or execution of the pending transaction 210-3' will transfer the amount 214-3 from the public key 206 to a coin or token balance for the contract 231.

At step 506, validator 208 can verify that the fingerprint 102 comprising the secure hash value H(101-3) is unique and does not previously exist for contract 231 within blockchain system 200. Note that this step 506 can be important for ensuring the owner 232 is properly identified, and owner 232 can be required for related contracts such as an Owner Revoke Certificate contract 238 depicted and described in connection with FIG. 2a and FIG. 6 below. Without verification that the fingerprint 102 is unique and does not previously exist, then a subsequent or different Register Certificate/PK transaction 210-3" (not shown) could attempt to register the certificate 101-3 to a different owner 232 by simply repeating the pending transaction 210-3', but with a different owner 232 (and different public key 206 and different signature 215). If the secure hash value H(101-3) is not unique or previously exists within previous transactions 210-3 for contract 231, then the contract code 281 for contract 231 can specify the validator 208 denies or rejects including the pending transaction 210-3' in a block 201 as a successfully completed transaction. Or, the validator could include the confirmed transaction 210-3 but with a field designating the pending transaction 210-3' failed with a failure code that the fingerprint 102 in the pending transaction 210-3' already exists.

For some embodiments the subsequent Register Certificate/PK transaction 210-3" with a second use of H(101-3) could be included in block 201, but all nodes within a system

400 that include validator 208 functionality with QSVM 280 could also calculate or determine that the subsequent Register Certificate/PK transaction 210-3" with a second use of H(101-3) is invalid or rejected or denied based upon the repeated inclusion of secure hash value H(101-3). Other nodes within a blockchain system 400 could also read the field within the confirmed failed transaction 210-3" regarding the failure by the selected validator generating a block 210-2. Although a block 201-2 could be generated with the subsequent Register Certificate/PK transaction 210-3" with the second use of H(101-3), SQL database 302 could exclude data for the Register Certificate/PK transaction 210-3" from tables for query of successfully registered certificates 101, based upon the field in the confirmed transaction 210-3" of failure to complete. In general, in exemplary embodiments, the SQL database 302 only includes data for transactions 210 that successfully execute and complete within the QSVM 280 depicted and described in connection with FIG. 2a above.

At step 507, validator 208 can verify that the values for input 272 are properly formatted and within bounds or restricted lengths. At step 507, validator 208 can also verify the values for input 272 include only valid entries, such as numeric fields only include numeric values and not alphanumeric values, that alphanumeric values exclude invalid or non-supported characters, etc. Note that some fields for input 272 can be omitted or include null values or a string representing a null value, such as "N/A" or "omitted", and these values for input 272 can be considered properly formatted in a step 507. In another example, a step 507 can verify the value for expire time 150 is a non-negative integer with a value in the future, compared to the a current UNIX timestamp for a validator 208 processing pending transaction 210-3'. For some exemplary embodiments, the value for expire time 150 can be a UNIX timestamp value for the integer number of seconds since 00:00 on Jan. 1, 1970.

At step 256, validator 208 can conduct the digital signature verification step 256 as depicted and described in connection with FIG. 2b above. A validator 208 can use the QSVM 280 and block generation algorithm 290 depicted and described in connection with FIG. 2a in order to perform the step 256 and related steps depicted for the step 510, where the step 510 is depicted in FIG. 5. In summary, step 256 verifies that the digital signature 215-3 over the data within pending transaction 210-3' using the public key 206 (which is PK.QSCI for transaction 210-3') and algorithm 115 is valid. If the digital signature 215-3 is valid, then validator 208 can proceed to subsequent steps for including pending transaction 210-3' in a block 201-2 that includes verified and completed transaction 210-3. If the digital signature 215-3 is invalid or fails to pass, then validator 208 can reject including pending transaction 210-3' in a block 201-2 that includes verified and completed transaction 210-3. For some embodiments, an invalid pending transaction 210-3' could be included in a block 201-2, but with a field added to the recorded transaction 210-3 to signal or specify that the execution of the pending transaction 210-3' failed to successfully complete with a failure code specifying the digital signature 215-3 could not be verified.

At step 508, validator 208 can conduct additional verification steps for pending transaction 210-3'. Although not depicted for a pending transaction 210-3', the pending transaction 210-3' can include a gas value in tokens or coins similar to an amount value 214-3 in order to pay for the computation steps by QSVM 280 in order to process the pending transaction 210-3'. Individual opcodes or bytecodes for the contract code for contract 231 could require a certain level of gas in order to execute each opcode or bytecode. A step 508 can confirm that sufficient gas was included with the pending transaction 210-3' with input 272 for contract 231 in order for the QSVM 280 to successfully complete execution of all the opcodes or bytecodes. A step 508 can then also include successfully verified pending transaction 210-3' as a completed transaction 210-3 for inclusion in block data 209, where exemplary block data 209 is depicted and described in connection with FIG. 2a above. Although not depicted in FIG. 5 and FIG. 2a, a pending transaction 210-3' can include a timestamp value for the time of generation of the pending transaction 210-3' by the QSBN 301d, and a step 508 could include only pending transactions 210-3' that are within a reasonable time range, such as generated within the past several hours or past few days.

Note that validator 208 can include a plurality of transactions 210 in block data 209 for a block 201-2, where only the processing of a single pending transaction 210-3' is depicted in FIG. 5. In other words, validator 208 could process the other pending transactions 210' in a step 509 and include all of the successfully processed pending transactions 210' in block data 209 as completed transactions 210. The additional or other pending transactions 210' are not depicted in FIG. 5, but additional pending transactions 210' could represent the other transactions 210 depicted and described in connection with FIG. 2a above.

The step 509 can assign a block transaction number 511 or sequence number for each of the included successfully completed transactions 210, which is also depicted and described in connection with FIG. 2a. This block transaction number 511 can be an increasing integer number starting at 1. In this manner the block transaction number 511 within block data 209-2 for a block 201-2 can be specified and subsequently referenced, as depicted in FIG. 5. The depicted completed transaction 210-3 for the exemplary embodiment in FIG. 5 has a block transaction number 511 equal to "1", representing the first transaction within block data 209-2 for the block 201-2. Block data 209-2 for a block 201-2 can include a plurality of completed transactions 210, and a completed transaction 210-3 could have other integer values as well for the block transaction number 511. For example, if block data includes 50 individual transactions 210, then the block transaction number 511 for completed transaction 210-3 could be any value from 1 to 50, depending on where validator 208 includes the transaction 210-3 in the sequence of completed transactions 210 within block data 209.

After all of the processed transactions 210 including completed transaction 210-3 are included in block data 209, then validator 280 can generate a block header 202, where the block header 202 is depicted and described in connection with FIG. 2a above. In an exemplary embodiment, the specific block header 202-2 in FIG. 2a can be generated for the completed transaction 210-3 plus other transactions within block data 209-2. The block header 202-2 can be over all the completed transactions 210 within block data 209, including the exemplary completed transaction 210-3. Note that block header 202 includes a secure hash value over at least all of the block data 209 and a secure hash value over the previous block header. Additional data will be included in a block header 202-2, which is depicted and described in connection with FIG. 2a. The combination of block header 202 with block data 209 can represent the block 201. The exemplary block 201-2 that includes transaction 210-3 is depicted and described in connection with FIG. 2a above. Block 201-2 can have an integer number increased by one from the previous block number. Validator 208 can then transmit block 201-2 with data for the certificate 101-3 to nodes within a system 400, where the transmission of block 210-2 is depicted and described in connection with FIG. 4 above. In this manner, the successfully completed transaction 210-3 can be verified or recorded by other nodes in a system 400.

A blockchain system 200 can operate a Register Certificate/PK contract 231 for generating a series of Register Certificate/PK transactions 210-3. The exemplary pending transaction 210-3' described above can be included in the series of transactions 210-3. Both blockchain system 200 and SQL database 302 can subsequently securely record data for a plurality of data for certificates 101, where an exemplary set of the plurality of data is also depicted in FIG. 5. In other words, blockchain system 200 and SQL database 302 can include data for all transactions 210 that are included in blocks 201 that successfully were processed without a failure code for the transactions 210-3, and an exemplary subset of transactions 210-3 that include data for the Register Certificate/PK contract 231 are depicted in FIG. 5. In general, the series of transactions 210-3 for the Register Certificate/PK contract 231 can include data that can be identified as block data 209 and contract input 272. The subset of block data 209 depicted in FIG. 5 includes data for a block 201 that would be present from any transaction 210. The subset of contract input 272 data depicted includes data for a block 201 that would be processed for the Register Certificate/PK contract 231.

The depicted data for the series of transactions 210-3 in FIG. 5 could be generated by a plurality of different validators 208 over time, and not limited to the specific validator 208 selected to propose the specific block 201-2 that includes confirmed transaction 201-3 for the pending transaction 210-3' generated by QSBN 301*d*. A validator or node would acquire all of the blocks 201 from all other validators or nodes within a system 400 in FIG. 4, and consequently validators or nodes could retain copies of all blocks 201 (with information about certificates 101) up to the current or next block 201 from the last selected validator 208 for a system 400.

The first depicted row for Register Certificate/PK contract 231 can represent the first transaction 210-3 received and processed for the contract 231. Data for each certificate 101 that is processed by contract 231 can be identified by a block number 201 and a block transaction number 511. The first transaction 210-3 for contract 231 can be included in a block number 201-0 with an exemplary block transaction number of "1". For a production system where the Register Certificate/PK contract 231 is generated many blocks after genesis, then a block number 201-0 could have an exemplary integer value with five, six, or seven digits (depending on when contract 231 is launched), and the block transaction number could be an exemplary integer value from 1 to 300 (depending on the sequence within the block 201-0 the a transaction 210-3 for the contract 231 is located among the plurality of transactions 210 for the block 201-0).

The combination of the specific block number 201 and block transaction number 511 can uniquely identify data for a certificate 101 in a system 200 in a manner that is "human readable". Owners or operators of computers that include certificate 101 can refer to the data in blockchain system 200 for the certificate 101 using the combination of the block number 201 and the block transaction number 511. As one example, the data for the first certificate 101-0 processed in the first listed transaction 210-3 in FIG. 5 could have a block number 201-0 equal to 2,345,678 and a block transaction number equal to 90. Other possibilities exist as well, but users for a system 200 and system 400 can refer to the data for certificate 101-0 with the user-friendly numbers of "2,345,678-90". In other words, the combination of the integer for the block number plus the integer for the block transaction number within the block can uniquely identify information for a certificate 101-0, such as the fingerprint 102 of H(101-0) and the URL 234 of URL(101-0). The user friendly number is useful for communicating data for the certificate 101 "out of band" such as via voice communications or via SMS or text messaging.

Input data 272 for the first certificate 101-0 listed for contract 231 in FIG. 5 can include an owner 232, a certificate/PK hash value 102, a URL 234, a parent certificate number 235, and an expire time 150. The owner 232 could be an address value of 404-0, where the generation of an address 404 from a public key 206 is depicted and described in connection with FIG. 4 above. Although the owner address 232 is depicted as using an address 404-0, some transactions 210-3 could substitute a public key 206 for an address 404, and in this case the owner address 232 recorded could be public key 206-0. The exemplary data for the first certificate 101-0 listed for contract 231 in FIG. 5 includes a parent certificate number 235 of "N/A", which means that no data is included for a parent certificate number 235.

As discussed above, the parent certificate number 235 can be for a certificate 101 used to verify a digital signature 112 for the certificate 101. Input data 272 for the first certificate 101-0 listed for contract 231 in FIG. 5 can comprise a root certificate 101. The owner 232 or generator of a transaction 210-3 for Register Certificate/PK could omit the parent certificate number 235 if the certificate 101 was a root certificate, such as the exemplary certificate 101-3 for the pending transaction 210-3'. Other reasons could exist as well for omitting a parent certificate number 235 without departing from the scope of the present disclosure.

The parent certificate number 235 can be a series of integer numbers represent the combination of the block number 201 and the block transaction number 511. By specifying a parent certificate number 235, users of a system 200 can also easily acquire or lookup parent certificate information related to a certificate 101 that completes a Register Certificate/PK transaction with contract 231. As one example, the parent certificate number 235 can be used with the SQL database 302 to query for the fingerprint 102 and the URL 234 for the parent certificate 101 that matches the parent certificate number 235. For an alternative embodiment, the parent certificate number 235 could be either (i) the fingerprint 102 for the parent certificate containing the public key 103 to verify the digital signature 112 within certificate 101-3, or (ii) a subset of the bytes or bits for the fingerprint 102, such as the leading 20 bytes, the trailing 20 bytes, the leading 24 bytes, etc. Other possibilities for the subset of a fingerprint 102 for the parent certificate are possible to use as the parent certificate number 235 without departing from the scope of the present disclosure.

The subset of block data 209 depicted in FIG. 5 includes data for a block 201 that would be present from confirmed transactions 210, which can have data or input 272 for the contract 231. Other block data 209 for a transaction 210 could include amount 214, a timestamp, a transaction hash value, gas value for the transaction 210, and other data as well. The depicted data includes (i) the public key 206 for the sender/originator of the transactions 210-3, (ii) the signature 215 for the transactions 210-3, which can be verified using the public key 206 for the transaction using a digital signature algorithm 115, (iii) the block number 201 generated by the validator 208 that proposed the block 201, and (iv) the block transaction number 511 for the specific Register Certificate/PK transaction 210-3 included within the block data 209. In exemplary embodiments, the pending transaction 210-3' includes all of the information for a row for the contract address 231 in FIG. 5, except the block number 201 and the block transaction number 511. A validator 208 would create or insert the numbers for the block number 201 and the block transaction number 511 as part of a step 510 to confirm the pending transaction 210-3' and transmit the proposed block 201-2 with the confirmed transaction 201-3 to the blockchain network 400 depicted and described in connection with FIG. 4 above.

Input data 272 for the second certificate 101 listed for contract 231 in FIG. 5 can include an owner 232 value of address 404-1, a certificate/PK fingerprint 102 of H(101-1), a URL 234 of URL(101-1), a parent certificate number 235 of 201-0-90, an expiration time of 150-2. As described above for the transaction for the parent certificate, an exemplary integer number for the parent certificate number 235 could be "2,345,678-90". Block data 209 for the second certificate 101 listed for contract 231 in FIG. 5 can include a public key of PK.A 206, digital signature 215-1 for the Register Certificate/PK transaction 210-3 of the second certificate 101, a block number 201-31, and a block transaction number 511 with an exemplary value of "1". Note that the exemplary data for the second certificate 101 listed for contract 231 in FIG. 5 can be the data for certificate 101-1 that is transmitted in block 201-31 from a blockchain network 400 for a pending transaction 210-3' by Quantum Safe Blockchain Node (QSBN) 301a for the certificate 101-1 in FIG. 3 above. The certificate 101-1 is also depicted and described in connection with FIG. 3 above, and the full certificate 101-1 does not need to be included within a pending or confirmed transaction 210-3 for the certificate 101-1 (or equivalent transactions 210-3 for other rows depicted in FIG. 1). Note that QSBN 301a is also depicted and described in connection with FIG. 4, where QSBN 301a can also use address 404-1.

The use of an address 404-1 instead of PK.A 206 as the owner 232 supports the feature when an owner address 232 can be different than an address of the public key PK.A 206, such as assigning an owner address 232 which uses a different PKI key pair and secret key than the corresponding SK.A 206a which was used to generate digital signature 215-1. One example for a purpose of benefit of an address 404-1 or generally an address 404 that is different than the address 404 for a public key 206 in a transaction 210-3 is that an owner address 232 could be a "cold storage" address or a subsidiary or simply a different server both (i) within network vendor 310 (in FIG. 3 above) and (ii) a server that operates with public key 206 and corresponding secret key 206a different than PK.A 206 and SK.A 206a. In this manner, a blockchain system 200 can be more secure, such that a public key for the address 404-1 as the owner address 232 does not need to be exposed or publicly revealed when the pending or confirmed transaction 210-3 with PK.A 206 and signature 215-1 is submitted in a Register Certificate/PK transaction 210-3 with blockchain system 200 and blockchain network 400. For other embodiments, the value for the owner 232 can be either (i) the public key PK.A 206 or (ii) the address 404-1 for the public key PK.A-206 and in this embodiment the use of a separate PKI key pair for subsequent transactions such as a revoke certificate transaction 201-4 can use the public key PK.A 206 since data for that public key PK.A 206 is recorded as the owner 232 for the certificate 101.

The Register Certificate/PK transaction 210-3 with input data for the certificate 101-1, representing the second certificate 101 listed for contract 231 in FIG. 5 can include a parent certificate number 235, where the parent certificate number 235 represents a block number 201 and a block transaction number 511 for the parent certificate. In other words, the digital signature 112-1 for certificate 101-1 (depicted for certificate 101-1 in FIG. 3) can be verified using the public key in the parent certificate. For the example depicted in FIG. 5, the parent certificate for certificate 101-1 can be the first certificate 101 listed for contract 231 in FIG. 5. Note that the parent certificate number 235 comprises the depicted value of 201-0-1. The depicted numeral of "201-0" can represent the block number 201 for the parent certificate of certificate 101-1. The depicted numeral of "–1" can represent the block transaction number 511 for the parent certificate of certificate 101-1.

As described seven paragraphs above, the data for the parent certificate (with data for the first row) processed in the first listed transaction 210-3 in FIG. 5 could have a block number 201-0 equal to 2,345,678 and a block transaction number equal to 90. Consequently the integer numbers for the depicted value of "201-0-90" can be "2,345,678-90". Users of a blockchain system 200 or blockchain network 400 could refer to and locate the parent certificate of the certificate 101-1 using the exemplary integer values of "2,345,678-90" for the depicted value of "201-0-90" for the block number 201 and block transaction number 511. Other integer values for the block number 201 and block transaction number 511 are possible as well for a parent certificate number 235 without departing from the scope of the present disclosure. Although the parent certificate for certificate 101-1 is depicted in FIG. 5 as the next row after the parent certificate, the parent certificate could be additional rows above the data for certificate 101-1.

In an equivalent manner, data for a certificate 101 within blockchain system 200 can be identified by the combination of the block number 201 and the block transaction number 511 for the certificate. For example, the combination of the integer values for the block number 201-31 and block transaction number of "1" can be used to identify data for the certificate 101-1. Users or computers for a blockchain system 200 could refer to the certificate 101-1 and locate secure data for the certificate 101-1 with a registration number 239 of the certificate 101-1, where the registration number 239 comprises the integer values for the block number 201 and block transaction number 511 of a confirmed register certificate transaction 210-3. The use of a registration number 239 for a blockchain system 200 to identify a certificate 101 is also depicted and described in connection with FIG. 6, FIG. 7, and FIG. 8 below, including data for a certificate 101 in a certificate table 805 within an SQL database 302.

Input data 272 for the third certificate 101 listed for contract 231 in FIG. 5 can include an owner 232 value of address 404-4, a certificate/PK fingerprint 102 of H(101-2), a URL 234 of URL(101-2), a parent certificate 235 of 201-X-Y, an expiration time of 150-2. Block data 209 for the third certificate 101 listed for contract 231 in FIG. 5 can include a public key of PK.B 206, digital signature 215-2 for the Register Certificate/PK transaction 210-3 of the third certificate 101, a block number 201-32, and a block transaction number 511 with an exemplary value of "1". Note that the exemplary data for the third certificate 101 listed for contract 231 in FIG. 5 can be the data for certificate 101-2 that is transmitted in block 201-32 for a pending transaction 210-3' from Quantum Safe Blockchain Node (QSBN) 301b in FIG. 3 above. The certificate 101-2 is also depicted and described in connection with FIG. 3 above. Address 404-4 can be an address for the QSBN 301b, such as the address corresponding to the public key PK.B 206. Or, address 404-4 can be an address for a different public key 206 than PK.B 206 which is included in the Register Certificate/PK transaction 210-3 that generated the depicted data in FIG. 5 for Register Certificate/PK contract 231.

The depicted value of "201-X-Y" with data for the third certificate 101-2 in FIG. 5 can represent the integer value for block number 201 and block transaction number 511 that included a Register Certificate/PK transaction 210-3 for the parent certificate of certificate 101-2. As one example, the block number 201 for the depicted value of "201-X" could be a block 201 that was recorded in a blockchain system 200 before the block 201-0 for the first certificate 101 and first row of contract data for Register Certificate/PK contract 231 depicted in FIG. 5. Block transaction number 511 with the depicted value of "–Y" could be the transaction number with an integer value of "Y" within the block number 201 with integer value "201-X".

Input data 272 for the fourth row listed for contract 231 in FIG. 5 includes data for a public key 103-A instead of data for a certificate 101. Note that the Register Certificate/PK contract 231 can support either the registration of a certificate 101 or a public key 103 within blockchain system 200. The first three rows for exemplary data of a Register Certificate/PK contract 231 in FIG. 5 described data associated with certificates 101. The fourth row listed for contract 231 illustrates that the same contract 231 also with a transaction 210-3 can record equivalent data for a public key 103 instead of a certificate 101. Some users of a blockchain system 200 may prefer to implement static public keys 103 instead of certificates 101, and the benefits for a blockchain system 200 also apply for the secure recording of a public key 103 instead of a certificate 101 for those users. Examples for protocols that implement static public keys 103 for encryption and authentication instead of certificates 101 include Wireguard, SSH, and IPSec, and other examples exist as well. Users of those protocols could record and securely distribute information for the static public keys 103 using the Register Certificate/PK contract 231.

Input data 272 for the fourth row listed for contract 231 in FIG. 5 can include an owner 232 value of address 404-5, a fingerprint 102 of H(103-A), a URL 234 of URL(PK 103-A), an expiration time of 150-4. Block data 209 for the fourth row and public key PK 103-A listed for contract 231 in FIG. 5 can include a public key of PK.A 206, digital signature 215-5 for the Register Certificate/PK transaction 210-3 of the public key PK 103-A, a block number 201-32, and a block transaction number 511 with an exemplary value of "2". Note that contract code 281 does not need separate data or separate fields to specify if the data being processed in the Register Certificate/PK contract 231 is a public key 103 or a certificate 101, since the fingerprint 102 and the URL 234 support both a public key 103 and a certificate 101 for the data being recorded. For a static public key PK 103-A, no parent certificate may exist or be used, so the parent certificate number 235 can be null or "N/A", or equivalent. An expiration time 150 is depicted for the public key PK 103-A, although an expiration time 150 could also be omitted such as if the public key PK 103-A has no planned expiration date.

Block data 209 for the fourth row shows that data for multiple register certificate/PK transactions 210-3 can be included within the same block 201. As discussed above, the third row could be for a block number 201-32 with a block transaction number 511 of 1, meaning the first transaction in the block 201-32. The fourth row for the same block number 201-32 can have a different exemplary block transaction number 511 of "5", meaning the fifth transaction in the block number 210-32. The combination of the block number 201 and the block transaction number 511 can comprise a registration number 239 for the PK 103-A. The registration number 239 could be used for the parent certificate number 235 for certificates 101, such as with the second row where the parent certificate is in the first row. For users of static public keys 103, the registration number 239 can be a simple, integer reference for the location of the registration data for a static public key 103 within blockchain system 200. For users of certificates 101, the registration number 239 can be a simple, integer reference for the location of the registration data for a certificate 101 within blockchain system 200.

The registration number can simplify the secure distribution of static public keys 103 for users of a blockchain system 200. As one example, a first user that registers public key 103-A could establish voice communications, secure email, or text messaging with a second user who wants to securely download public key 103-A. The first user could send the registration number 239 for the static public key 103-A to the second user. The second user can query an local, secure SQL database 302 to obtain both the URL 234 for the public key 103-A and the fingerprint 102 for the public key PK 103-A. The second user can then download the public key PK 103-A using the URL 234 and confirm the fingerprint 102 for the downloaded public key PK 103-A matches the fingerprint 102 received from the query to the SQL database 302 using the registration number 239. Additional details regarding the embodiment within this paragraph are depicted and described in connection with FIG. 7 below.

The fifth row listed for contract 231 in FIG. 5 can comprise the data for a pending register certificate/PK transaction 210-3' and data for a certificate 101-3, which was described above in this FIG. 5.

Input data 272 for the sixth row listed for contract 231 in FIG. 5 can be for a fifth certificate 101-4. Input data 272 for the fifth certificate can include an owner 232 value of address 404-7, a certificate/PK fingerprint 102 of H(101-4), a URL 234 of URL(101-4), and an expiration time of 150-6. Block data 209 for the sixth row listed for contract 231 in FIG. 5 can include a public key 206-5, digital signature 215-6 for the Register Certificate/PK transaction 210-3 of the fifth certificate 101, a block number 201-33, and a block transaction number 511 with an exemplary value of "8". Note that the exemplary data for the sixth row listed for contract 231 in FIG. 5 can be the data for certificate 101-4 that is transmitted in block 201-33 by blockchain network 400 based on a confirmed pending transaction 210-3' for the certificate 101-4 from Quantum Safe Blockchain Node (QSBN) 301c in FIG. 3 above. The certificate 101-4 is also depicted and described in connection with FIG. 3 above. Address 404-7 can be an address for the QSBN 301c, such as the address corresponding to the public key 206-5. Or, address 404-7 can be an address for a different public key 206 than 206-5 which is included in the Register Certificate/PK transaction 210-3 that generated the depicted data in the sixth row of FIG. 5 for Register Certificate/PK contract 231. For the exemplary embodiment of an Owner Revoke certificate transaction 210-4 in FIG. 4 below with the certificate 101-4, the address 404-7 can be for a second cold storage private key SK.CS1 206a and corresponding second cold storage address public key SK.CS1 206 for enterprise 104, which are depicted and described in connection with FIG. 6 below.

FIG. 6

Figure 6:
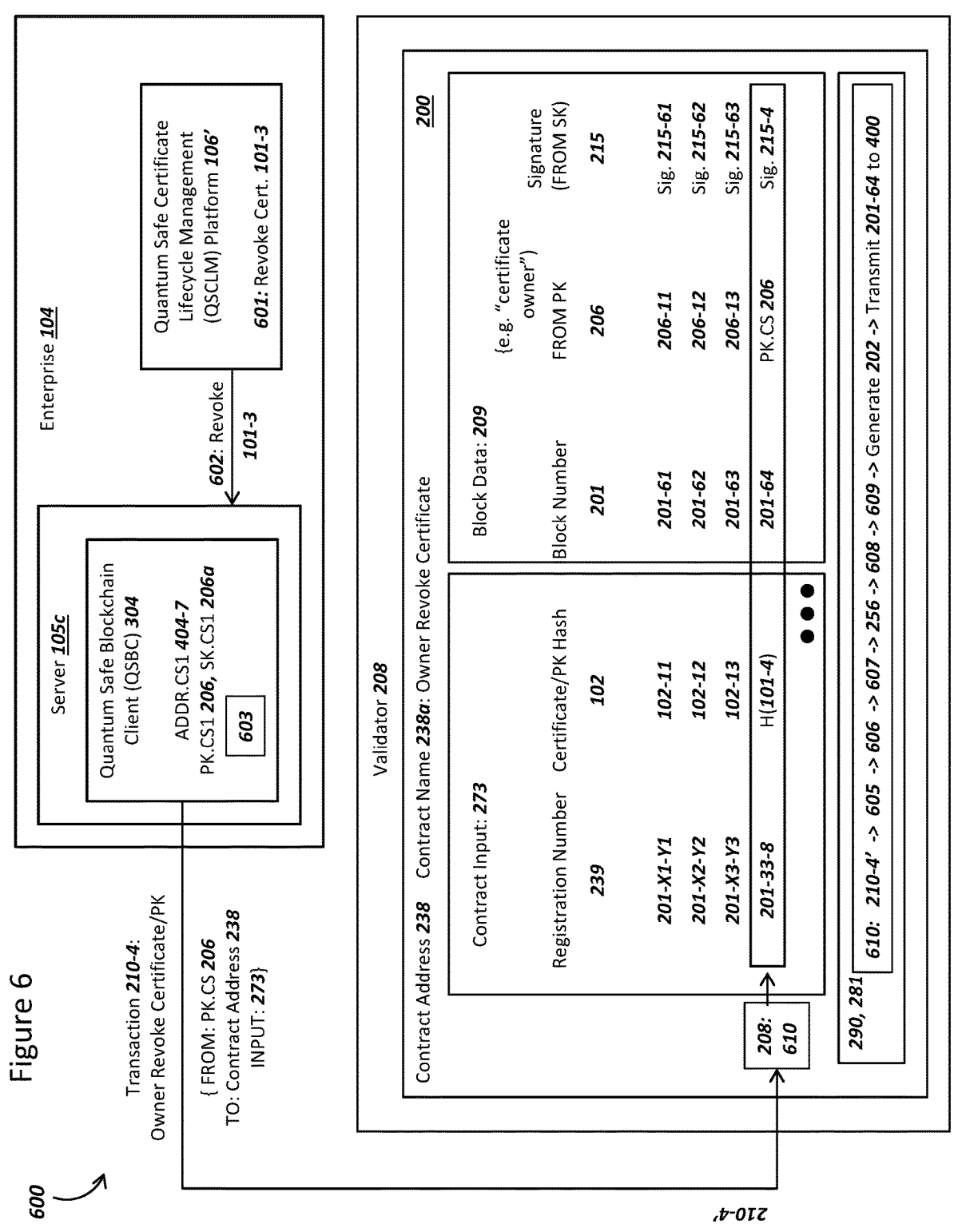
FIG. 6 is a graphical illustration of an exemplary system for (i) a certificate owner with a blockchain client to generate an Owner Revoke Certificate transaction and (ii) a validator to use the blockchain system to process and record the transaction, in accordance with exemplary embodiments.

FIG. 6 is a graphical illustration of an exemplary system for (i) a certificate owner with a blockchain client to generate an Owner Revoke Certificate transaction and (ii) a validator to use the blockchain system to process and record the transaction, in accordance with exemplary embodiments. System 600 can include an enterprise 104 and blockchain system 200 operated by a plurality of nodes and at least one validator 208. An enterprise 104 can operate a Quantum Safe Blockchain Client (QSBC) 304, which is also depicted and described in connection with FIG. 4 above. A blockchain system 200 can be operated by a plurality of validators 208, where a single validator selected by a PoS Selection Algorithm 444 (in FIG. 4) can be the validator 208 to process a pending Owner Revoke Certificate transaction 210-4' along with other transactions to propose a new block 201.

FIG. 6 depicts the generation and processing of the exemplary Owner Revoke Certificate transaction 210-4 from FIG. 2a with input 273 for a smart contract 238 being processed by a validator 208. FIG. 6 also depicts a plurality of Owner Revoke Certificate transactions in exemplary previous blocks 201-61, 201-62, and 201-63. The description below will first discuss the generation and processing of a pending Owner Revoke Certificate transaction 210-4' by QSBC 304 and validator 208. The subsequent description will discuss the other exemplary Owner Revoke transactions depicted in FIG. 6.

Enterprise 104 can include a server 105c that operates a Quantum Safe Blockchain Client (QSBC) 304. Exemplary computing hardware for a server 105c can be equivalent to the server computing hardware 105n for a Quantum Safe Blockchain Node 301 as depicted and described in connection with FIG. 9 below. Note that enterprise 104 could operate the Quantum Safe Blockchain Client (QSBC) 304 instead of the QSBN 301e depicted for enterprise 104 in FIG. 3. In general, operation of a QSBN 301e requires the node to be online and communicate with a blockchain network 400 depicted in FIG. 4 through public IP network 108. A QSBC 304 represents a client, where the client can operate offline for generating digital signatures 215 for blockchain system 200, while also not being connected to the public IP network 108.

QSBC can have a secret key SK.CS1 206a that is in "cold storage" or with QSBC not electrically connected to any other computer system. The corresponding public key can be PK.CS1 206 with an address of 404-7, where the address 404-7 for ADDR.CS1 was assigned as the owner 232 for the certificate 101-4 in the confirmed transaction 210-3 for the sixth row in the table of data in FIG. 5 above.

A pending transaction 210-4' can be generated offline by QSBC and transferred via physical media to a node or client that (i) communicates with the blockchain network 400 over the Public IP network 108 and (ii) transmits the pending transaction 210-4' to the blockchain network 400. QSBC 304 can store and operate with an address ADDR.CS1 404-7 for the public key PK.CS1 206. QSBC 304 can also store and operate with the private key SK.CS1 206a for generating digital signatures that can be verified with the public key PK.CS1 206.

Enterprise 104 can include and operate a Quantum Safe Certificate Lifecycle Management (QSCLM) Platform 106', where the QSCLM Platform 106' was also depicted and described in connection with FIG. 3 above. In general, QSCLM Platform 106' can use quantum safe digital signature algorithms for the management of certificates 101 for an enterprise 104, including the reception and distribution of certificates 101 within enterprise 104 as depicted and described in connection with FIG. 3 above.

Enterprise 104 can perform a series of steps before submitting pending Owner Revoke Certificate transaction 210-4' to blockchain system 200. Note that the certificate 101-4 for enterprise 104 as depicted in FIG. 3 could have previously been generated by a device manufacturer 113 in FIG. 3 and also registered in blockchain system 200 with a confirmed Register Certificate/PK transaction 210-3 as depicted for a block 201-33 in FIG. 2a and also in FIG. 5. The subsequent description herein focuses on the steps an owner 232 recorded in blockchain system 200 with address ADDR.CS1 404-7 can take to securely record the revocation of certificate 101-4. The exemplary steps depicted herein also show a benefit and solution to problems with conventional technology for the revocation of certificate 101. With conventional technology, only a certificate issuer can revoke a certificate 101 in a manner that can be easily checked by web clients such as browsers. With the technology depicted and described herein by using a blockchain system 200, an owner 232 of the certificate 101 can revoke the certificate 101. The owner 232 could be different than the certificate issuer and for the embodiment depicted in FIG. 6 the owner 232 can be for the enterprise 104 which operates and controls a device for the certificate 101-4. In this manner, the enterprise 104 or owner 232 of the certificate 101-4 can revoke the certificate without depending on the certificate issuer that generated the certificate 101-4.

For the exemplary embodiment depicted in FIG. 6, the owner 232 is associated with the enterprise 104. For the embodiment depicted in FIG. 5, the owner 232 of the pending transaction 210-3' is associated with the QSCI 114 that generated the certificate 101-3. Consequently, an owner 232 of a certificate 101 can be either the certificate issuer, or an entity that the certificate 101 is assigned to (with a name in the certificate common name field 117), such as enterprise 104. Other possibilities exist as well for different users or networks of a blockchain system 200 to become owners 232 of a certificate 101 without departing from the scope of the present disclosure.

At step 601, (QSCLM) Platform 106' can determine that certificate 101-4 should be revoked before the expire time 150-6 for the certificate 101-4 (where expire time 150-6 for certificate 101-4 is depicted in FIG. 5 above). Reasons for the revocation include (i) the private key 103a for the corresponding public key 103 in the certificate 101-4 has been compromised, (ii) the cryptographic algorithm 111 for the certificate 101-4 has been compromised or incurs a significant break, (iii) other business reasons such as wanting to stop or prevent services supported by the certificate 101-4. Other possibilities exist as well for reasons to revoke a certificate 101 without departing from the scope of the present disclosure.

(QSCLM) Platform 106' can send QSBC 304 a message 602 for revoking the certificate 101-4. Note that QSBC 304 may be offline in order to support cold storage, but the data for a message 602 could be stored in physical media such as a USB stick, a hard drive, an SD card, etc., and the message 602 can be transferred to the QSBC 304 by connecting the physical media to the server 105c. For some embodiments, QSBC 304 could also be online or connected to an internal LAN for enterprise 104, but not connected to or accessible to public IP network 108. QSBC 304 can receive the message 602.

At step 603, enterprise 104 using QSBC 304 can generate a pending transaction 210-4' for submission to blockchain network 400 (depicted in FIG. 4) for the purposes of verification and inclusion of a corresponding confirmed Owner Revoke certificate transaction 210-4 in a block 201 for blockchain system 200. The data for the pending transaction 210-4' can be the same as confirmed transaction 210-4 depicted and described in connection with FIG. 2a above, except the confirmed transaction 210-4 will include a block number 201 and a block transaction number 511. The pending transaction 210-4' can be an Owner Revoke Certificate (or Owner Revoke Public Key) transaction.

In summary, enterprise 104 can identify the certificate 101-4 to revoke in a pending transaction 210-4' using any combination of (i) fingerprint 102 of H(101-4) and the certificate registration number 239 for the certificate 101-4. The digital signature 215-4 can be verified using only the public key PK.CS1 206, where the PK.CS1 206 uniquely generates the address ADDR.CS1 404-7. The address ADDR.CS1 404-7 was assigned the owner 232 value for the corresponding register certificate 210-3 transaction in FIG. 5 for certificate 101-4. In this manner, a validator 208 and any user of a blockchain system 200 can securely rely upon an Owner Revoke Certificate transaction 210-4 to revoke the certificate 101-3. Additional details regarding the generation and processing of a pending Owner Revoke Certificate transaction 210-4' will be described below.

As described for confirmed transaction 210-4 in FIG. 2a, pending transaction 210-4' can include (i) a "from" value for a sender/originator of the transaction, where the value can comprise the public key PK.CS1 206 for the sender/originator, (ii) the destination contract address 238, and (iii) a transaction nonce 206n-4, (iv) a transaction amount 214-4, and (v) a digital signature 215-4 for the private key SK.CS1 206a and also the transaction nonce 206n-4. Pending transaction 210-4' can include input 273 for the contract 238. Input 273 can include (i) a fingerprint 102 of the certificate 101-4, which is depicted as H(101-4) and also previously submitted in register transaction 210-3, (ii) the certificate registration number 239 for the transaction 210-3 which registered certificate 101-4 in blockchain system 200. Also, the transaction amount 214-4 for a pending owner revoke transaction 210-4' is not depicted in the table within FIG. 6, although a transaction amount 214-4 for transaction 210-4 is depicted and described in connection with FIG. 2a above.

All of the above information for pending transaction 210-4' can be selected in a step 603. Step 603 can also comprise QSBC 304 generating a message with the pending transaction 210-4' and the transfer of the message via physical media to a server for enterprise 104 that communicates with blockchain network 400 (shown in FIG. 4). Or, for some embodiments QSBC 304 could be online and connected to Public IP network 108 can QSBC 304 could transmit the message with the pending transaction 210-4'. QSBC 304 or the server receiving the message with pending transaction 210-4' could maintain a list of peer nodes and transmit the pending transaction 210-4' to the peer nodes, which also subsequently forward the pending transaction 210-4' to additional nodes and that process can repeat many times over a few seconds such that substantially all of a blockchain network 400 in FIG. 4 receives the pending transaction 210-4' within a few seconds.

As depicted in FIG. 6, a validator 208 can receive the pending transaction 210-4'. A validator 208 for a blockchain system 200 is also depicted and described in connection with FIG. 2a and FIG. 4 above. Many nodes or a plurality of nodes within a blockchain network 400 depicted in FIG. 4 above could operate as validators 208. The specific validator 208 for including the pending transaction 210-4' in a block 201 can be selected according to the PoS Selection Algorithm 444 also depicted and described in connection with FIG. 4 above. The selected validator 208 for pending transaction 210-4' can conduct a step 610 to both (i) verify the pending transaction 210-4', (ii) execute the smart contract 238 using the input 273, and (iii) include a corresponding confirmed transaction 210-4 in a block 210. A summary of the operation for a validator 208 is provided in FIG. 2a above, including the use of a block generation algorithm 290 and quantum safe virtual machine (QSVM) 280 for operating or executing smart contracts such as contract 238. Step 610 as described in this FIG. 6 includes the specific steps for processing a pending transaction 210-4' for an Owner Revoke Certificate transaction, or also Owner Revoke Public Key transaction. Step 610 can include the series of steps depicted in FIG. 6 and described below.

The bottom box for "290, 281" depicts the resources and steps taken by validator 208 in order to include the pending transaction 210-4' as a confirmed transaction 210-4 in the exemplary block 201-2 depicted in FIG. 2a, including the step 610. A validator 208 can use the block generation algorithm 290 and the contract code 281 within the QSVM 280 to process the pending transaction 210-4'. At step 605, contract 238 can verify the transaction amount 214-4 is equal to or greater than a specified transaction amount required to revoke the certificate 101-3 in blockchain system 200. A controlling contract could be maintained by an admin 401 depicted in FIG. 4, where the controlling contract is periodically updated to specify the minimum tokens or coins required to conduct a revoke certificate transaction represented by the transaction 210-4. For some embodiments, the transaction amount 214-4 could be the same as a gas required to process the pending transaction 210-4'. If the transaction amount 214-4 is less than the specified transaction amount, then the contract code 281 for contract 238 can specify the validator 208 denies or rejects including the pending transaction 210-4' in a block 201. Although not depicted in FIG. 6, a blockchain system 200 can record a coin or token balance for all public keys 206 or addresses 404 that have transactions 210 with amounts 214 to receive the coins or tokens. Successful completion or execution of the pending transaction 210-4' will transfer the amount 214-4 from the public key PK.CS1 206 to a coin or token balance for the contract 238.

At step 606, validator 208 can verify that the fingerprint 102 comprising the secure hash value H(101-4) corresponds to the registration number 234 (depicted as "201-33-8") for the register certificate transaction 210-3 that recorded data for the certificate 101-4. Although the single value of H(101-4) can be sufficient to identify a certificate 101-4 for revocation, also identifying with the unique registration number 234 (comprising the block 201 number and the block transaction number 511 for the confirmed transaction 210-3 which registered the certificate 101-4) can reduce errors by requiring a check the two values correspond to the same data. In other words, at step 606 validator 208 can confirm that the secure hash value H(101-4) was first recorded in a block 201 number (e.g. block 201-33) with block transaction number 511 (e.g. "8") that matches the registration number 234 received in a pending revoke certificate transaction 210-4'. If the pending transaction 210-4' includes (i) a fingerprint 102 of secure hash value H(101-4) and (ii) a registration number 234 that do not both match data for a confirmed register certificate transaction 210-3 with the exact same values, then the contract code 281 for contract 238 can specify the validator 208 denies or rejects including the pending transaction 210-4' in a block 201 as a successfully completed transaction. Or, a confirmed 210-4 transaction could be included in a block 201, but with an error code or failure code designating the pending transaction 210-4 failed to successfully execute from lack of a proper match to a fingerprint 102 with registration number 234 in blockchain system 200.

At step 607, validator 208 can verify that the address ADDR.CS1 404-7 recorded with the H(101-4) in the previous register transaction 210-3 for certificate 101-4 is generated using the public key PK.CS1 206 in the pending transaction 210-4'. In this step 607, validator 208 can conduct the address generation step 403 with the public key PK.CS1 206 to generate the address 404-7. Validator can verify the generated address equals address ADDR.CS1 404-7. If the two addresses are not equal, then a node or client different than an owner 232 may have generated the revoke certificate pending transaction 210-4' and the pending transaction 210-4' should be rejected or denied or omitted from inclusion in a block 201. At step 607, validator 208 can also verify that the values for input 273 are properly formatted and within bounds or restricted lengths. At step 607, validator 208 can also verify the values for input 273 include only valid entries, such as numeric fields only include numeric values and not alphanumeric values, that alphanumeric values exclude invalid or non-supported characters, etc.

At step 256, validator 208 can conduct the digital signature verification step 256 as depicted and described in connection with FIG. 2b above for transaction 210-4. A validator 208 can use the QSVM 280 and block generation algorithm 290 depicted and described in connection with FIG. 2a in order to perform the step 256 and related steps depicted for the step 610. In summary, step 256 verifies that the digital signature 215-4 over the data within pending transaction 210-4' using the public key PK.CS1 206 and algorithm 115 is valid. If the digital signature 215-4 is valid, then validator 208 can proceed to subsequent steps for including pending transaction 210-4' in a block 201 that includes verified and completed transaction 210-4. If the digital signature 215-4 is invalid or fails to pass, then validator 208 can reject including pending transaction 210-4' in a block 201 that includes verified and completed transaction 210-4. For some embodiments, an invalid pending transaction 210-4' could be included in a block 201, but with a field added to the recorded transaction 210-4 to signal or specify that the execution of the pending transaction 210-4' failed to successfully complete.

At step 608, validator 208 can conduct additional verification steps for pending transaction 210-4'. Although not depicted for a pending transaction 210-4', the pending transaction 210-4' can include a gas value in tokens or coins similar to an amount value 214-4 in order to pay for the computation steps by QSVM 280 in order to process the pending transaction 210-4'. Individual opcodes or bytecodes for the contract code for contract 238 could require a certain level of gas in order to execute each opcode or bytecode. A step 608 can confirm that sufficient gas was included with the pending transaction 210-4' with input 273 for contract 238 in order for the QSVM 280 to successfully complete execution of all the opcodes or bytecodes. A step 608 can then also include successfully verified pending transaction 210-4' as a completed transaction 210-4 for inclusion in block data 209, where exemplary block data 209 is depicted and described in connection with FIG. 2a above. Although not depicted in FIG. 6 and FIG. 2a, a pending transaction 210-4' can include a timestamp value for the time of generation of the pending transaction 210-4' by the QSBC 304, and a step 608 could include only pending transactions 210-4' that are within a reasonable time range, such as generated within the past several hours or past few days.

Note that validator 208 can include a plurality of transactions 210 in block data 209, where only the processing of a single pending transaction 210-4' is depicted in FIG. 6. In other words, validator 208 could process the other pending transactions 210' in a step 609 and include all of the successfully processed pending transactions 210' in block data 209 as completed transactions 210. The additional or other pending transactions 210' are not depicted in FIG. 6, but additional pending transactions 210' could represent the other transactions 210 depicted and described in connection with FIG. 2a above. Some transactions 210 may not involve transactions with smart contracts 231 or 238, and some transactions 210 could be payment or token transfers between addresses 404 within a blockchain network 400 in FIG. 4.

The step 609 can assign a block transaction number 511 or sequence number for each of the included successfully completed transactions 210, which is also depicted and described in connection with FIG. 2a. This block transaction number 511 can be an increasing integer number starting at 1. In this manner the block transaction number 511 within block data 209 for a block 201 can be specified and subsequently referenced, as depicted in FIG. 5 above.

After all of the processed transactions 210 including completed transaction 210-4 are included in block data 209, then validator 280 can generate a block header 202, where the block header 202 is depicted and described in connection with FIG. 2a above. In an exemplary embodiment, the specific block header 202 in FIG. 2a can be generated for the completed transaction 210-4 plus other included transactions in block data 209. The block header 202 can be over all the completed transactions 210 within block data 209, including the exemplary completed transaction 210-4. Note that block header 202 includes a secure hash value over at least all of the block data 209 and a secure hash value over the previous block header. Additional data will be included in a block header 202, which is depicted and described in connection with FIG. 2a. The combination of block header 202 with block data 209 can represent the block 201. Block 201-64 for confirmed transaction 210-4 can have an integer number increased by one from the previous block number. Validator 208 can then transmit block 201-64 with data for the revocation of certificate 101-4 to nodes within a system 400, where the transmission of a block 210 is depicted and described in connection with FIG. 4 above. In this manner, the successfully completed owner certificate revoke transaction 210-4 can be verified or recorded by other nodes in a system 400.

FIG. 6 also depicts data for additional Owner Revoke Certificate transactions 210-4 completed with an Owner Revoke Certificate contract 238. The rows can represent data for additional Owner Revoke Certificate transaction 210-4. Recorded data includes input 273 and block data 209. Input 273 can comprise the same values for the exemplary Owner Revoke Certificate transactions 210-4 processed from the pending Owner Revoke Certificate transactions 210-4' described above. The rows include data for a registration number 239 (comprising the combination of the block 201 number and the block transaction 511 number), and the fingerprint 102 for the certificates 101 to be revoked. Block data 209 processed by validators 208 for the listed rows include the block number 201, the public key 206, and the signature 215. Other or additional data for both input 273 and block data 209 can be included for transactions 210-4 and contract 238 without departing from the scope of the present disclosure. The depicted values of "X1", "X2", etc. represent integers for different block numbers 201. The depicted values of "Y1", "Y2", etc. represent integers for different block transactions numbers 511.

FIG. 7

Figure 7:
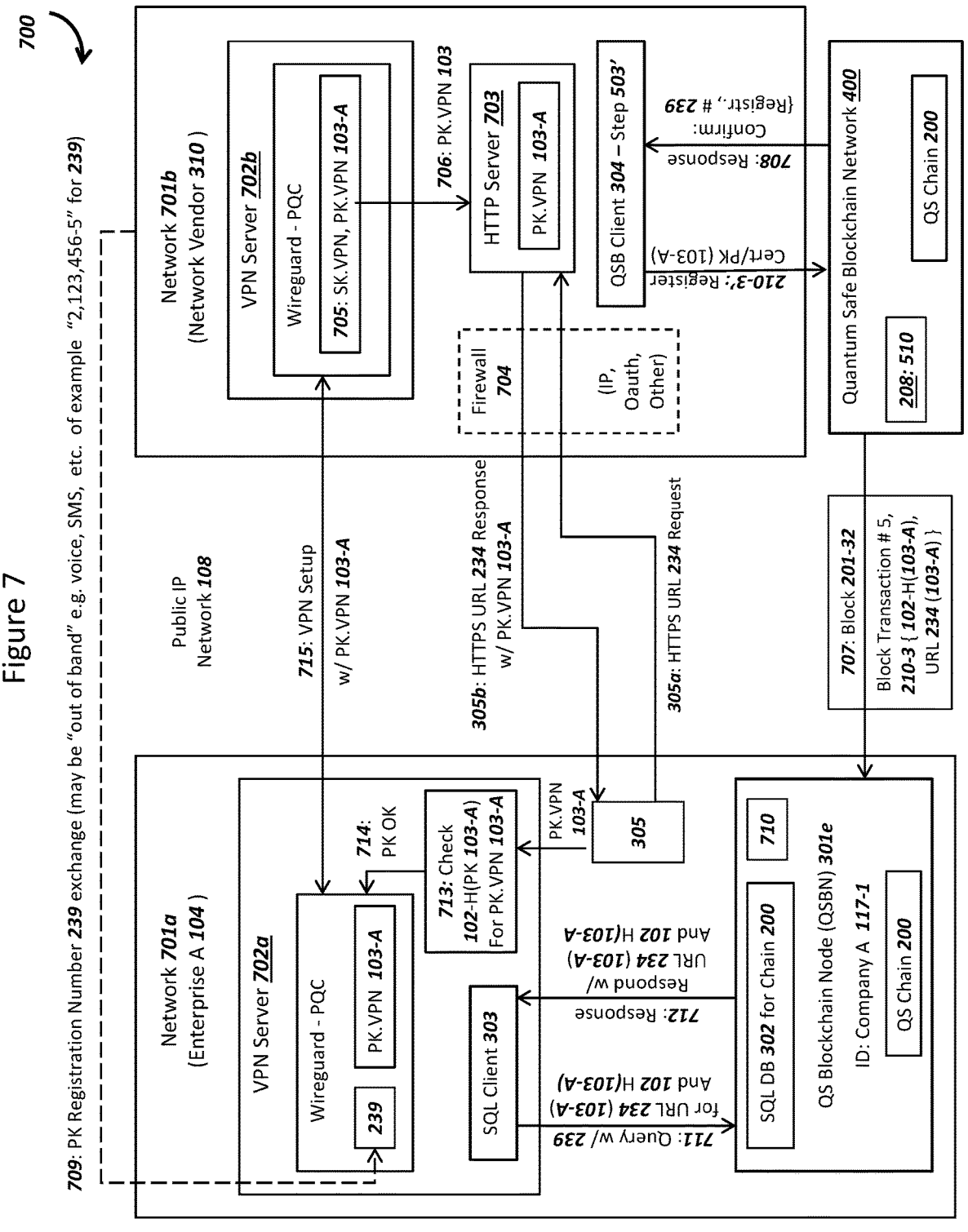
FIG. 7 is a graphical illustration of an exemplary system for two networks to securely communicate data for a public key using a quantum safe blockchain network, in accordance with exemplary embodiments.

FIG. 7 is a graphical illustration of an exemplary system for two networks to securely communicate data for a public key using a quantum safe blockchain network, in accordance with exemplary embodiments. A system 700 can include a first network 701*a*, a second network 701*b*, and a quantum safe blockchain network 400. In an exemplary embodiment, the first network 701*a* can be for the enterprise 104, where enterprise 104 is also depicted and described in connection with FIG. 3 above. In this exemplary embodiment, the second network 701*b* can be for a network vendor 310, where the network vendor 310 is also depicted and described in connection with FIG. 3 above. Quantum safe blockchain network 400 can be the network 400 for a plurality of nodes and validators depicted and described in connection with FIG. 4 above. The networks 400, 701*a*, and 701*b* can communicate using the Public IP network 108, which could also comprise the public Internet.

The first network 701*a* can operate a first VPN server 702*a* and the second network 701*b* can operate a second VPN server 702*b*. The two networks 701*a* and 701*b* may prefer to establish a secure VPN session using the VPN servers and at least one public key PK.VPN 103-A for the second VPN server 702*b*. The VPN servers 702*a* and 702*b* are depicted as implementing a quantum safe version of the Wireguard protocol, which would require that the public key PK.VPN 103-A support PQC key encapsulation algorithms (KEM) such as Kyber, NRTU, BIKE, or Classic McEliece. For an initial/preliminary case where the first network 701*a* and the second network 701*b* have not previously established a secure PQC secure session for the transfer of data in a quantum safe manner after Q-day when classical cryptography can be broken, the transfer of PK.VPN 103-A through the public IP network 108 can be insecure for the same reasons as depicted and described in connection with FIG. 1*b* above. FIG. 7 depicts an efficient and secure solution to this problem by using quantum safe blockchain network 400 to support the transfer of PK.VPN 103-A in a quantum safe manner through insecure public IP network 108. Note that FIG. 7 includes some steps previously depicted and described for the registration of a public key 103-A in a blockchain system 200 and blockchain network 400, such as the fourth row in the table of FIG. 5 above.

In addition to the first VPN server 702*a*, the first network 701*a* can include and operate (i) a quantum safe blockchain node 301*e* for enterprise 104, and (ii) an HTTP/S client 305. In addition to the second VPN server 702*b*, the second network 701*a* can include and operate a HTTP/S server 703, a firewall 704, and a quantum safe blockchain client 304. At step 705, the second VPN server 702*b* can use a PQC KEM algorithm's "KeyGen" function to generate a private key SK.VPN and the corresponding public key PK.VPN 103-A. The private key SK.VPN can be securely stored within protected memory for the VPN server 702*b*. At step 706, the second VPN server 702*b* can transfer a copy of the PK.VPN 103-A to the HTTP/S server 703. The HTTP/S server 703 can create a URL 234 for the PK.VPN 103-A, such that a client 305 sending an HTTP request 305*a* to the HTTP/S server 703 could download the public key PK.VPN 103-A.

The second network 701*b* could use a quantum safe blockchain client (QSBC) 304 to generate a pending Register Certificate/PK transaction 210-3' with data for the PK.VPN 103-A. A QSBC 304 was previously depicted and described in connection with FIG. 3 and FIG. 6 above. The QSBC 304 could conduct a step 503' for the generation of the pending Register Certificate/PK transaction 210-3'. A step 503 for a QSBN 301 was depicted and described in connection with FIG. 5 above, and a QSBC 304 could conduct the equivalent step 503'. Data for the step 503' would be for the PK.VPN 103-A instead of the certificate 101-3 for a step 503. A private key 206*a* and public key 206 for the QSBC 304 would be used, such as generating a signature 215 over the pending transaction 210-3'.

Upon completion of the step 503', the QSBC 304 could transmit the pending transaction 210-3' to the quantum safe blockchain network 400. The pending transaction 210-3' can include at least the fingerprint 102 of the PK.VPN 103-A, shown as H(103-A), and the URL 234 generated for the PK.VPN 103-A by the HTTP/S server 703. Additional details for a pending Register Certificate transaction 210-3' were depicted and described in connection with FIG. 5 above. Quantum safe blockchain network 400 can include a validator 208 selected to process the next or a subsequent block 201 after QSBC transmits the pending transaction 210-3'. Validator 208 can conduct the step 510 to process the pending transaction 210-3' and generate a block 201-32 with the confirmed transaction 210-3 for the public key PK.VPN 103-A. The steps 510 for the validator to process the pending transaction 210-3' were depicted and described in connection with FIG. 5 above.

The validator 208 can transmit the block 201-32 with the confirmed transaction 210-32 to the blockchain network 400, and the QSBN 301*e* for the first network could receive the block 201-32 in a message 707. Note that the block 201 includes a block number 201-32 and a block transaction number 511 comprising the exemplary value of "5". In other words, the confirmed transaction 210-3 with data for the PK.VPN 103-A could be the fifth transaction in the block number 201-32. In an exemplary embodiment, the block number 201-32 could be an integer number of 2,123,456. A server or node within blockchain network 400 could also send QSBC 304 a response message 708 upon confirmation of pending transaction 210-3', where the response message 708 can include at least a registration number 239 for the confirmed transaction 210-3. For some embodiments, the block 201-32 can comprise the message 708, since the block 201-32 would include data for the registration number 239 for public key PK.VPN 103-A.

In exemplary embodiments the registration number 239 comprises a combination of the integer number for the block number 201-32 with the confirmed transaction 210-3 and the block transaction number 511. For the values described above, the exemplary registration number 239 for the PK.VPN 103-A would be "2,123,456-5". This registration number 239 provides a unique identifier for information of PK.VPN 103-A in blockchain system 200 that is also straightforward for users to write down or verbally communicate, especially compared to alternative numbers such as a portion of bytes from a hash such as fingerprint 102. The registration number 239 could be stored in a protected and non-volatile memory within a server or other computing device for the second network 701*b*. Although the combination of the block number 201 and the block transaction number 511 is described above for representing the block registration number 239, other unique, increasing integer values for the block registration number could be utilized for a blockchain system 200 without departing from the scope of the present disclosure.

At step 709, a first user for the first network 701*a* could query a second user or and administrator, or a system of the second network 701*b* for the registration number 239. In preferred exemplary embodiments, the query by the first user could be via "out of band" means that excludes transfer of information regarding the PK.VPN 103-A through the traditional client/server communications via the public IP network 108. As one example, the first user for the first network 701*a* could call the second user for the second network 701*b* on the telephone and use voice communications to ask for the registration number 239 for the PK.VPN 103-A. As a second example, the first user for the first network 701*a* could send an SMS or secure text message to the second user for the second network 701*b* and ask for the registration number via text. Other possibilities exist as well for an "out of band" transmission of the registration number 239, and another possibility includes secure email or the transfer of a symmetric ciphertext of registration number 239 from the second user to the first user, where a symmetric key communicated "out of band" is required to decrypt the ciphertext in order to read the plaintext registration number 239.

At step 710, the quantum safe blockchain node 301*e* for the first network 701*a* could receive and store the block 201-32 with the confirmed transaction 210-3, where the confirmed transaction 210-3 includes at least the fingerprint 102 for the PK.VPN 103-A and the URL 234 for the PK.VPN 103-A. The SQL database 302 operating in the first network 701*a* could periodically update database tables with received, confirmed transactions, such as the received transaction 210-3 in block 201-32. In this manner, the tabular data presented for a series of Register Certificate/PK transactions 210-3 for contract 231 in FIG. 5 could be stored within SQL database 302.

After (i) the secure receipt of the registration number 239 in the step 709 and (ii) the step 710 for loading updated block 201 data into the SQL database 302, the first network 701*a* could conduct a query 711 of the SQL database 302 for data pertaining to public key PK.VPN 103-A for the second network 701*b*. The first network 701*a* could operate a SQL client 303, and the SQL client 303 could be included with or within the first VPN server 702*a*. The SQL client 303 could conduct the query 711 of the SQL database 302, and the SQL database 302 could return a response message 712. The response message can include at least (i) the URL 234 for the public key PK.VPN 103-A of the second network, and (ii) the fingerprint 102 for the public key PK.VPN 103-A of the second network. The first VPN 702*a* could store both (i) the URL 234 for the public key PK.VPN 103-A of the second VPN 702*b* for the second network 701*b*, and (ii) the fingerprint 102 for the public key PK.VPN 103-A of the second VPN 702*b* for the second network 701*b*.

The first network 701*a* could then use a HTTP/S client 305 with the URL 234 to download the public key PK.VPN 103-A of the second network. Note that the HTTP/S session could use classical cryptography which could be at risk of being broken by quantum computers and consequently the classical encryption and authentication methods may not be entirely secure. However, from the independent use and checking of the fingerprint 102 for a PK.VPN 103-A received by the HTTP/S client 305, the first network 701*a* could verify the integrity and authenticate the received PK.VPN 103-A matches the PK.VPN 103-A that was registered with the confirmed register certificate transaction 210-3 received in block 201-32. The HTTP/S client 305 is depicted as separate from the first VPN server 702*a*, but the HTTP/S client 305 could be included in the first VPN server 702*a*. Or, in another embodiment, the HTTP/S client could be included with the SQL database 302 and the HTTP/S client 305 could download the data for the URL 234 when the block 201-32 with the confirmed transaction 210-3 is received by either (i) the QSBN 301*e* or (ii) the SQL database 302.

As depicted in FIG. 7, the second network 701*b* could operate a firewall 704. The firewall 704 could restrict access to the HTTP/S server 703 and the URL 234 within the second network 701*b* to only the first network 701*a*. In this manner, the download of the public key PK.VPN 103-A would only be available to the first network 701*a*. Firewall rules for firewall 704 could restrict access to the URL 234 based on IP addresses for the first network 701*a*. Or, as depicted in FIG. 7, the firewall 704 could restrict access through other means such as requiring Oauth 2 or higher authentication tokens, or passwords, or other means in order to restrict access to the URL 234 to the first network 701*a*. In addition, the firewall 704 could also restrict access to the second VPN 702*b* to only receive packets from the first VPN 702*a*. Other possibilities exist as well for the operation of a firewall 704 within the second network 701*b* in order to limit access of HTTP/S URLs 234 and VPN messages to only the first network 701*a* for the functionality depicted in FIG. 7, without departing from the scope of the present disclosure. For some embodiments, the firewall 704 functionality could be omitted, and any HTTP/S client 305 connected to the public IP network 108 could download a public key or certificate stored at URL 234 within an HTTP/S server 703.

The HTTP/S client 305 could transmit a HTTP/S request in a message 305*a* to the HTTP/S server 703 over public IP network 108. The HTTP/S request message 305*a* can include the URL 234 which was included in the confirmed register certificate transaction 210-3 within block 201-32 for the PK.VPN 103-A. The firewall 704 for the second network 701*b* can allow the request message 305*a* to pass and the HTTP/S server 703 can receive and process the request. The HTTP/S server 703 can transmit a response message 305*b* to the HTTP/S client 305 with the PK.VPN 103-A. One benefit of including a URL 234 for the public key PK.VPN 103-A in a blockchain transaction 210-3 is that post-quantum cryptography for secure digital signatures currently have larger key sized typically of 1,000-4,000 bytes or more, compared to 256 bytes for RSA-2048. By including only the URL 234 for a public key instead of the full public key, then the blockchain size supporting recording and revocation of certificates grows much more slowly. In addition, by including a URL 234 for a public key instead of the full public key or certificate, then control of the distribution of the certificate or public key can remain with an entity operating a HTTP/S server for the URL 234 through the use of a firewall 704 and related means.

After receipt of the HTTP/S message 305*b* with the public key PK.VPN 103-A based on the URL 234, the first network 701*a* can conduct a step 713 to verify the fingerprint 102 of the received public key PK.VPN 103-A. A step 713 is depicted in FIG. 7 as being conducted by the first VPN server 702*a*, but a different server or computer within the first network 701*a* could also conduct the step 713. The first network 701*a* could calculate a secure hash value over the PK.VPN 103-A, which is depicted as H(PK 103-A) in FIG. 7. In a step 713, the first network 701*a* could compare (i) the calculated H(PK 103-A) from the received PK.VPN 103-A with (ii) the fingerprint 102 received from the response message 712 to the SQL query 711. Note the fingerprint 102 received in response message 712 can be the same as the fingerprint 102 in the confirmed register certificate/PK transaction 210-3 in block 201-32. If the two values for fingerprint 102 are the same, then a step 713 can determine the received PK.VPN 103-A from a message 305*b* is valid.

If the two values for the fingerprint 102 are the not the same, then a step 713 can determine the received PK.VPN 103-A from a message 305*b* is invalid and return an error to a user or administrator of the first network 701*a*.

The fingerprint 102 in the confirmed register certificate/ PK transaction 210-3 in block 201-32 can be considered "quantum safe" because the blockchain system 200 can operate with quantum safe cryptography such as using PQC algorithms for digital signatures 215 and also using hash algorithms which are also quantum safe. The specific secure hash algorithm used in a step 713 to calculate a depicted H(PK 103-A) value can be the same secure hash algorithm used for the fingerprint 102 in the confirmed register certificate/PK transaction 210-3.

At step 714, the first VPN server 702*a* could store the validated PK.VPN 103-A in memory, including nonvolatile memory. A step 714 could include loading the public key PK.VPN 103-A into a configuration file for the first VPN server 702*a*, where the configuration file also includes other parameters such as the IP address or domain name for the second VPN server 702*b* of the second network 701*b*. At step 715, the first VPN server 702*a* could establish a VPN session with the second VPN server 702*b* using the public key PK.VPN 103-A and also using post-quantum cryptography algorithms supporting the first public key PK.VPN 103-A. In this manner, a VPN session or a secure session through the public IP network 108 could be established in a quantum safe manner, such that if attackers operating within the public IP network 108 and with quantum computing capabilities that could break classical cryptography, the VPN session or secure session established in a step 715 would be resistant to attacks from the attackers.

The steps depicted for the distribution of the PQC supporting PK.VPN 103-A in FIG. 7 from the second network 701*b* to the first network 701*a* solves a "startup" problem for the first deployment of PQC algorithms and public keys. This functionality is especially important if quantum computers could plausibly break classical cryptographic algorithms based on RSA or ECC at the time when the first network 701*a* and the second network 701*b* first use PQC algorithms and keys, since there is no existing "quantum safe", efficient, and secure method for the distribution of the public key PK.VPN 103-A from the second network 701*b* to the first network 701*a*. The use of classical cryptography for existing systems supporting electronic communication between the two networks risks an attacker interfering with the transfer of the public key PK.VPN 103-A, such as the interference by an attacker depicted and described in connection with FIG. 1*b* above.

The primary alternative "quantum safe" method for the "startup" problem for the use of PQC algorithms and public keys would be the transfer of the PK.VPN 103-A within physical media from the second network 701*b* to the first network 701*a*. The two networks could be located in different continents with long times and high expense for the transfer of physical media. The use of physical media is also not scalable and has its own security and reliability issues. The use of physical media for the distribution of the PK.VPN 103-A can be especially problematic and costly if the second network 701*b* needs to distribute the public key PK.VPN 103-A, or a plurality of the public keys, to dozens or more networks equivalent to the first network 701*a*. In summary, the quantum safe blockchain system 200 supports a secure, scalable, and efficient system to solve the "startup" problem described above which has the equivalent issues depicted and described in connection with FIG. 1*b* above.

Note that VPNs based on protocols such as Wireguard and SSH that can authenticate and encrypt communications based on static public keys from the other party entirely depend on the security of the method for distributing the static public keys. In other words, the security of those VPNs and secure sessions is only as secure as the security of the system to distribute the static public keys. By networks such as the first network 701*a* and the second network 701*b* relying upon the quantum safe blockchain system 200 for the secure distribution of the static public keys, then those VPNs and secure sessions remain secure, and as secure as at least the security of a quantum safe blockchain system 200. If the static public keys are distributed through channels which rely upon classical cryptography such as RSA and ECC when quantum computers can plausibly break the classical cryptography, then the distribution of the necessary static public keys could be considered insecure. The subsequent VPN and secure sessions which use the public keys distributed through systems using classical cryptography would also consequently considered insecure.

Although FIG. 7 depicts the use of a blockchain system 200 with the secure transfer of information for a public key PK.VPN 103-A from a second network 701*b* to a first network 701*a*, corresponding steps could also be taken in the other direction, in order for the first network 701*a* to securely send a public key PK.VPN 103-B (not shown) to the second network 701*b*. In other words, the first network 701*a* could perform the steps with servers shown for the second network 701*b* in FIG. 7, and the second network 701*b* could perform the steps with servers shown for the first network 701*a*. The "out of band" communications channel depicted for a step 709 could include both parties sharing the registration numbers 239 for each of their static public keys PK.VPN 103-A (for the second network 701*b*) and PK.VPN 103-B (for the first network 701*a*). Again, the use of a registration number 239 to identify public keys provides a user-friendly method for securely identifying information related to the public keys within a blockchain system 200.

For the embodiment described within the above paragraph, the VPN session established in a step 715 could be setup with a public key PK.VPN 103-B in addition to the depicted PK.VPN 103-A. The quantum safe protocol implemented by the VPN could provide both mutual authentication and encryption based upon the two static public keys PK.VPN 103-A and 103-B. Note that the step 715 does not require the static public keys are transmitted through public IP network 108, although they may be transferred in steps 305*b* by different computers than the VPNs 702. Although the use of a public key PK.VPN 103-A is depicted in FIG. 7, the quantum safe blockchain system 200 could alternatively use the exact same steps depicted for the secure transfer of a certificate 101 between the second network 701*b* to the first network 701*a*.

FIG. 8

Figure 8:
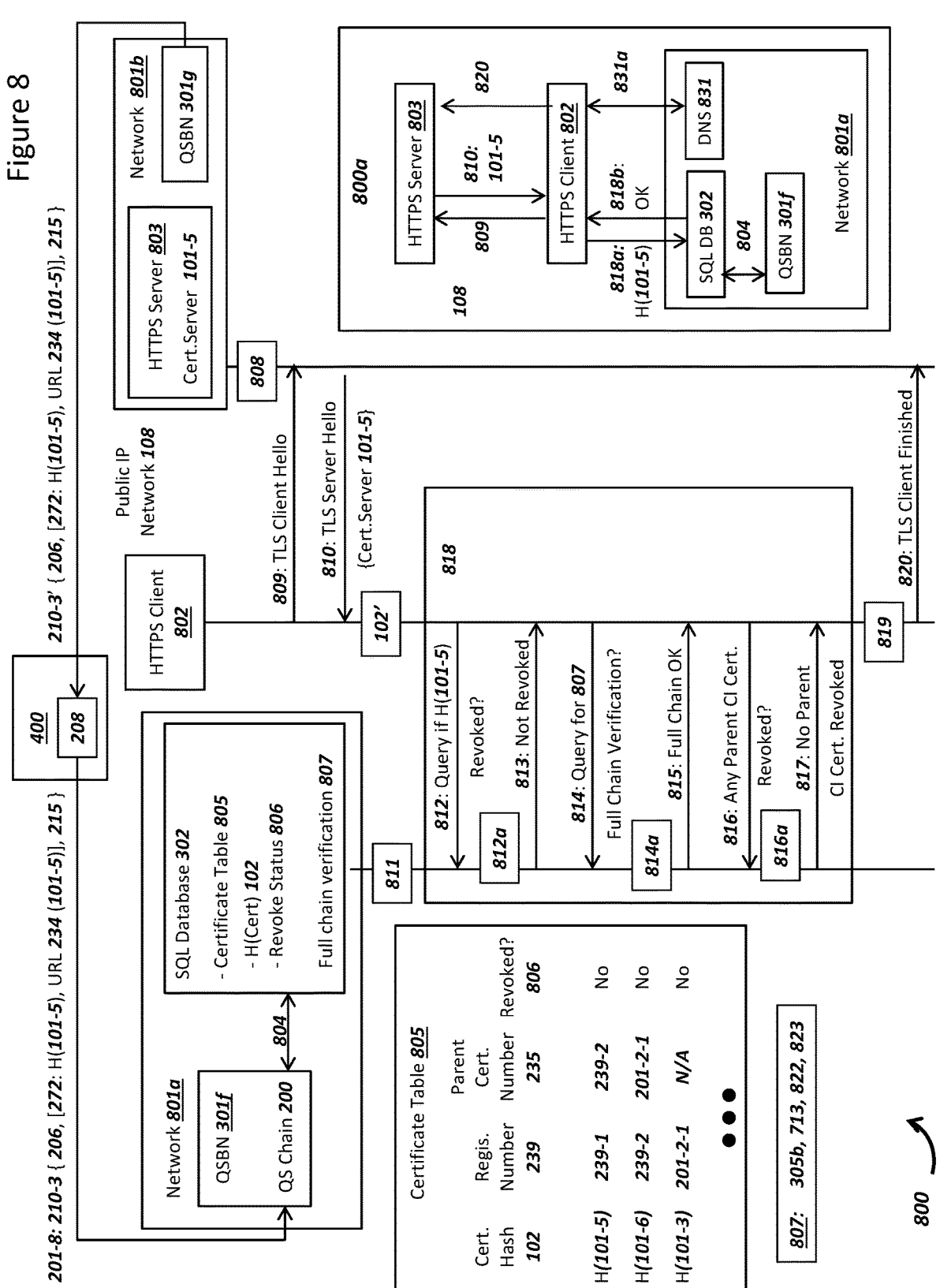
FIG. 8 is a graphical illustration of an exemplary system for a HTTP/S client to communicate with a first network and a second network with an HTTP/S server, in accordance with exemplary embodiments.

FIG. 8 is a graphical illustration of an exemplary system for a HTTP/S client to communicate with a first network and a second network with an HTTP/S server, in accordance with exemplary embodiments. A first network 801*a* can operate first a quantum safe blockchain node (QSBN) 301*f* and an SQL database 302. The second network 801*b* can operate a second QSBN 301*g* and at least one web server depicted as the HTTP/S server 803. HTTP/S server 803 could comprise an Apache server, a Microsoft web server, NGIX, and other possibilities exist as well. The HTTP/S client 802 could comprise a web browser such as Chrome, Edge, Safari, Firefox, and other possibilities exist as well for HTTP/S client 802. The HTTP/S client could also be a process or library within other programs for retrieving data via transport layer security (TLS). The HTTPS/S server 803 and HTTP/S client 802 could communicate using TLS and the HTTP/S server 803 could send web pages to the HTTP/S client 802 over TLS sessions. The first QSBN 301$f$ for the first network 801$a$ could receive data from the second QSBN 301$g$ via a quantum safe blockchain network 400, where an exemplary operation of the quantum safe blockchain network 400 is depicted and described in connection with FIG. 4 above. The blockchain network 400 can include at least one validator 208, where the operation of a validator 208 was depicted and described in connection with FIG. 2$a$, FIG. 5, and other figures above.

HTTP/S server 803 can include a server certificate cert-.server 101-5 for authentication and verification of identity for the HTTP/S server 803 and/or the second network 801$b$. The second network 801$b$ could use the second QSBN 301$g$ to generate a pending Register Certificate transaction 210-3' for the blockchain network 400 and the server certificate 101-5. The pending Register Certificate transaction 210-3' can include at least a (i) public key 206 for the second QSBN 301$g$, (ii) input 272 for contract 231 of the fingerprint 102 for the server certificate 101-5 depicted as H(101-5), and a URL 234 for the server certificate 101-5, and (iii) a digital signature 215 for the pending transaction 210-3'. The validator 208 within the blockchain network 400 can process the pending Register Certificate transaction 210-3' using a step 510 which is depicted and described in connection with FIG. 5. The validator 208 could include a confirmed Register Certificate transaction 210-3 with input 272 in a block 201-8 and transmit the block 201-8 to the blockchain network 400. Note that the first QSBN 301$f$ for the first network 801$b$ can be part of the blockchain network 400, and consequently the QSBN 301$f$ can receive the block 201-8 with the confirmed register certificate transaction 210-3 as depicted in FIG. 8. QSBN 301$f$ can include the confirmed Register Certificate transaction 210-3 within its local copy of the quantum safe blockchain 200.

The SQL database 302 can include tables and data for certificates 101 that are received in transactions 210 via the first QSBN 301$f$ and the blockchain network 400. One exemplary table can be for the input 272 and block data 209 for the confirmed transaction 210-3 with exemplary rows of the table for each transaction 210-3 depicted and described in connection with FIG. 5 above. SQL database 302 can use a step 804 to continuously update tables as confirmed blocks 201 with transactions 210 are received by the first QSBN 301$f$. In exemplary embodiments, the step 804 can include the use of a trigger for SQL database 302, such that when any block 201 is received with transactions 210, the transactions 210 are also written to the SQL database 302. Note that although a register certificate transaction 210-3 is depicted as received by the first QSBN 301$f$, other transactions such as a revoke certificate transaction 210-4 could be received by the first QSBN 301$f$ from the blockchain network 400. In general the first QSBN 301$f$ can receive and store all blocks 201 transmitted by a blockchain network 400, and a step 804 can be used by a SQL database 302 in order to update tables with current and complete data related to certificates 101 in a system 800.

The SQL database 302 can also include a certificate table 805, where an exemplary certificate table 805 is depicted in FIG. 8. The certificate table 805 can include a list of all fingerprints 102 of certificates 101 or public keys 103 received in transactions 210-3 for blockchain network 400 by the first QSBN 301$f$. The certificate table 805 could also store the registration number 239 for the certificate 101 as well as the parent certificate number 235. In exemplary embodiments, the registration number 239 comprises the block number 201 and the block transaction number 511, which represents a unique integer number for each fingerprint 102. Also, the parent certificate number 235 can be a registration number 239 for the parent certificate. As described above, the parent certificate comprises the certificate used to verify the digital signature 112 in a certificate 101, where the parent certificate includes the public key 103 for verification of the digital signature 112 in the child certificate 101.

Storing the parent certificate number 235 with the fingerprint 102 allows quick query and access for lookups of the parent certificate based upon the registration number 239 of the parent certificate stored as the parent certificate number 235. An exemplary chain of the parent certificates for the server certificate cert.server 101-5 is depicted in FIG. 8 for a subset of the certificate table 805. The fingerprint 102 for the cert.server 101-5 can specify a parent certificate number 235 with a registration number 239-2. The parent certificate for the server certificate 101-5 could be a certificate 101-6 with a fingerprint 102 equal to H(101-6). The parent certificate for the cert.server 101-5 can represent an intermediate certificate between the server certificate 101-5 and a root certificate. This intermediate certificate can be a certificate 101-6. The fingerprint 102 of the parent certificate 101-6 can be stored with certificate table 805 along with registration number of the parent certificate 101-6 equal to registration number 239-2.

For the exemplary data in FIG. 8, the parent of the parent certificate 101-6 can be a root certificate 101-3, where an exemplary root certificate 101-3 was depicted and described in connection with FIG. 1$b$, FIG. 3, and FIG. 5. Consequently, the depicted parent registration number 239 for the parent certificate of certificate 101-6 can be the depicted registration number "201-2-1", where this registration number corresponds to the block number 201-2 and the block transaction number 511 of "1" for data of the root certificate 101-3 recorded in a previous confirmed transaction 210-3 as depicted and described in connection with FIG. 5 above. For example, the data recorded in certificate table 805 could be received by QSBN 301$f$ from blockchain network 400 using the confirmed transaction 210-3 with data for the root certificate 101-3 depicted and described in connection with FIG. 5 and also FIG. 4 above. The root certificate 101-3 can have a registration number 239 but no parent certificate number since the certificate 101-3 can be a root certificate.

The certificate table 805 can also include a field for the revocation status 806 for the certificate identified by the fingerprint 102. For the exemplary data in the exemplary certificate table 805, the revocation status for all listed certificate fingerprints 102 is "No", or an equivalent designation. Some listed fingerprints 102 for certificates 101 could alternatively have a revocation status of "Yes", or an equivalent designation, if a revoke certificate 210-4 transaction with the fingerprint 102 is received from blockchain network 400 by the first QSBN 301$f$.

Using the structure of the certificate table 805 depicted within FIG. 8 for data of certificates 101 received from blockchain network 400 by the first QSBN 301$f$, the SQL database could perform a full chain verification step 807 using the received fingerprint 102 and URL 234 for the server certificate 101-5. Although not depicted in a certificate table 805 in FIG. 8 the certificate table 805 could also include a field or column for the URL 234 of the certificate 101-5 and the certificate 101-5. The series of steps for a full chain verification 807 is depicted in FIG. 8 and described here.

At step 305b for the full chain verification 807, the SQL database 302 could download the server certificate 101-5 using a HTTP/S client 305 by receiving the full certificate 101-5 in a message 305b for the URL 234 as depicted in FIG. 7 above. At a step 713, the SQL database 302 could compare the fingerprint 102 stored with the H(101-5) in the certificate table 805 with a calculated H(101-5) for the downloaded full certificate 101-5 from the step 305b. In this manner, the downloaded certificate 101-5 can be confirmed to match data for the certificate 101-5 received in the confirmed register certificate transaction 210-3 by the first QSBN 301f. If the calculated H(101-5) for the downloaded certificate 101-5 does not match the finger print 102 from the confirmed transaction 210-3, then data for the downloaded certificate 101-5 in a certificate table 805 could be omitted. In this case, SQL database 302 could not conduct a full chain verification 807 and respond to queries about a "full chain verification" from HTTP/S client 802 with a "not available" response. Note that steps 305 and 713 repeat for all certificates from the server certificate 101-5 through parent certificates up to a root certificate 101-3. Consequently, using the steps 305b and 713, the certificate table 805 can have filled or completed columns of data for the certificates 101 corresponding to each recorded certificate fingerprint 102. In this manner, the SQL database 302 can store the certificates 101, while the blockchain system 200 does not need to record or store the certificates 101.

At step 822, the SQL database 302 could verify the signature 112 for the downloaded certificate 101-5 from a certificate table 805 using the public key 103 from the parent certificate 101-6, where the parent certificate 101-6 was also downloaded in a step 305b and stored within certificate table 805. At step 823, the SQL database could verify the signature 112 for the parent certificate 101-6, using the public key 103 from root certificate 101-3. Although only a single intermediate certificate is shown for the server certificate 101-5 in the exemplary certificate table 805, the step 823 could repeat through all intermediate certificates between the server certificate 101-5 and a root certificate 101-3, if more than one intermediate certificate 101-6 is used by the second network 801b for the certificate chain of the server certificate 101-5. The certificate table 805 could include a column for "full chain verified 807" with a value of "yes", or similar designation upon successful completion of this step 807. Note that intermediate certificate 101-6 could also have a value of "yes" for the "full chain verified" column 807 since the steps for 807 also verified the intermediate certificate 101-6 though a root certificate 101-3. A value for the "full chain verified 807" column within certificate table 805 could be "N/A" for the root certificate 101-3.

At step 808, the HTTP/S server 803 can be configured to operate with the server certificate 101-5 and support TLS sessions with web clients. Note that the server certificate 101-5 could support PQC algorithms, such as Dilithium for the public key 103 in the server certificate 101-5, and the TLS sessions can use PQC cryptography as well for encryption, such as Kyber for a KEM. At step 811, the SQL database 302 can begin operating to receive and respond to queries from HTTP/S clients such as HTTP/S client 802.

In exemplary embodiments, the SQL database 302 can be within the same network as the HTTP/S client 802, such as the SQL database 302 operating within the same internet service provider (ISP) as the HTTP/S client 802. In other words, the HTTP/S client 802 can also operate within the first network 801a, and messages between the HTTP/S client 802 and the SQL database 302 do not need to traverse the public IP network 108. Or, for an enterprise setting, both the SQL database 302 and the HTTP/S client 802 could be within a LAN with shared private IP addressing for an enterprise network operating as the first network 801a. In this manner, the messages between the HTTP/S client 802 and SQL database 302 can be secure, and any attackers operating within the public IP network 108 could not intercept or interfere with messages between the HTTP/S client 802 and SQL database 302. In another embodiment, the first network 801a with the SQL database 302 could be accessible to the HTTP/S client 802 over the public IP network 108, but for this embodiment, then a secure session or other method using PQC algorithms for authentication and encryption of data between the HTTP/S client 802 and the SQL database 302 could be utilized.

The HTTP/S client can send a TLS "client hello" message 809 over the public IP network 108. Even though PQC algorithms may be implemented in the TLS protocol used within system 800, the blockchain network 400 and QSBN can be useful for the HTTP/S client 802 to check the revocation status and also the current status (on the order of less than a minute) of the full certificate chain for the server certificate 101-5 up to a root certificate such as certificate 101-3, as described below.

The HTTP/S server 803 can process the TLS "client hello" message and generate a TLS "server hello" response 810. As depicted in FIG. 8, the TLS "server hello" response 810 can include the server certificate 101-5. Note that additional data such as data for a key exchange or KEM for encryption of data could also be shared in the TLS "client hello" message 809 and the TLS "server hello" response 810. The server certificate 101-5 can be encrypted and included as ciphertext within the TLS "server hello" response 810, where the HTTP/S client 803 can use data from the key exchange or KEM to decrypt the ciphertext and read a plaintext value for the server certificate 101-5.

For the exemplary embodiment depicted in FIG. 8, the TLS "server hello" response 810 does not need to include any of (i) the parent certificate 101-6 for the server certificate 101-5 and (ii) messages or data related to the Online Certificate Status Protocol (OSCP) or OSCP stapling, or equivalent protocol regarding certificate revocation status such as certificate transparency. Data for checking the revocation status of the server certificate 101-5, as well as the revocation status of a parent certificate 101-6 can be acquired subsequently using the step within a step 818 below. In this manner, the system 800 becomes both significantly more efficient and more secure, since very current certificate revocation status for the server certificate 101-5 and all intermediate or parent certificates 101 up to a root certificate within a timeframe of less than a minute can be acquired in the step 818 below. In other words, the TLS "server hello" response 810 is much smaller in size by excluding data and digital signatures related to the parent certificate chain, since those certificates and digital signatures can be relatively quite large for the use of PQC algorithms and certificates, compared to the reduced size of certificates and digital signatures with classical algorithms such as ECDSA and RSA.

A 2021 study by Cloudflare reported that the use of Dilithium2 would increase the size of certificate information including information and digital signatures for the certificate chain increases data within the TLS "server hello" to approximately 17 kilobytes. Note, the revocation status for intermediate certificates using conventional methods such as OSCP means the revocation status is only current within a timeframe such as a week or two, which is the general frequency for updating OSCP information for parent certificates. The system 800 depicted in FIG. 8 with a blockchain network 400 and QSBN 301 would reduce the size of certificate information for Dilithium2 to approximately 5 kilobytes just for the server certificate 101-5 (since parent certificate information and digital signatures are not required when using system 800), and the revocation status for all certificates in the certificate chain for the server certificate 101-5 can be checked to within approximately one minute or less.

After receiving the TLS "server hello" response 810 with the only certificate information in the response 810 being the server certificate cert.server 101-5, the HTTP/S client 802 can perform the step 102' to calculate a fingerprint 102 comprising a secure hash value H(101-5) over the received server certificate cert.server 101-5 within the response 810. A system 800 could agree or specify the secure hash algorithm to use for fingerprints 102, such as SHA2-256, SHA3-512, and other possibilities exist as well. As contemplated herein, a fingerprint 102 can include both the secure hash value over a certificate 101 and metadata or a header value specifying the secure hash algorithm used to generate the fingerprint 102. In this manner, when a stored fingerprint 102 is compared with a fingerprint 102 over a received certificate 101, the calculation of a fingerprint 102 for the received certificate 101 can use the same secure hash algorithm specified in the header data for the stored fingerprint 102.

After the step 102', the HTTP/S client can send or transmit a first query message 812 to the SQL database 302 with the calculated fingerprint 102 of the server certificate 101-5 comprising the value H(101-5). The first query message 812 can check if the server certificate 101-5 has been revoked. The SQL database 302 can receive the first query message 812 and perform a step 812a to query the SQL database 302 for the revocation status 806 within the certificate table 805 using the value H(101-5). The SQL database 302 can send a response message 813 with the revocation status 806 determined in the step 812a. The exemplary data depicted for a response message 813 in FIG. 8 includes a status that the server certificate 101-5 is not revoked. For other cases, such as if QSBN 301f had received a confirmed transaction 210-4 for revocation of the server certificate 101-5, then a response message 813 could include status that the server certificate 101-5 has been revoked. For that case, then the HTTP/S client 802 could either end the TLS session with the HTTP/S server 803 or send an error message and/or prompt a user for the HTTP/S client 802 that the server certificate 101-5 for the web site has been revoked.

After the response message 813 with a revocation status of "not revoked" or "OK" or equivalent, the HTTP/S client 802 could send a message 814 with a query regarding the full chain verification 807 of the server certificate cert.server 101-5. Although not depicted for the message 814, the query can include the calculated fingerprint 102 from the step 102'. Note that the SQL database can "pre-compute" all the steps for the full certificate chain verification in the step 807 using the certificate table 805. This "pre-compute" or verification in the full certificate chain verification in the step 807 both saves processing time for the HTTP/S client 802 and bandwidth between the HTTP/S client 802 and the HTTP/S server 803. Steps for the SQL server 302 to conduct the full certificate chain verification step 807 were described above and also depicted in FIG. 8.

At step 814a, the SQL database 302 could query a certificate table 805 or related table for the results of the full certificate chain verification step 807 for the server certificate cert.server 101-5 identified by the fingerprint 102 of H(101-5) from the message 813. If any verification step in the full chain verification 807 of the server certificate 101-5 failed, such as a digital signature 112 in a parent certificate 101-6 failed to be verified, or a digital signature 112 in a grandparent certificate failed to be verified, then the status for the full chain verification 807 in a step 814a could be "failed. If all the verification steps in the full chain verification 807 were successfully completed, such as verifying all digital signatures 112 in each certificate in the parent certificate chain for the server certificate 101-5, then the status in a step 814a could be "OK". The SQL database 302 could then send a response message 815 to the HTTP/S client 802 for the results of the step 814a, with the depicted status in FIG. 8 for message 815 being "OK" and the full chain verification 807 for the server certificate 101-5 was OK. If the step 814a returns a value of "N/A" or equivalent due to a parent or grandparent, etc. certificate 101 not being within a certificate table 805, the message 815 could be "N/A" as opposed to "failed".

Note that the full chain verification 807 step could be conducted by the SQL database 302 before HTTP/S client sends the TLS "client hello" message 809, and in this case the full chain verification 807 step could be "pre-computed". The full chain verification step 807 could also include verifying the expiration time 150 for a parent or grandparent, etc. certificate 101 for the server certificate 101-5 had not expired. A separate step for the verification that no parent, grandparent, etc. certificates 101 has expired at the time of communication between SQL database 302 and the HTTP/S client 802 for the server certificate 101-5 is described in this FIG. 8 five paragraphs below.

After the response message 815 with a result for checking the full certificate chain for the server certificate 101-5, the HTTP/S client 802 could send a message 816 with a query regarding the parent certificate chain revocation status for the server certificate cert.server 101-5. Although not depicted for the message 816, the query can include the calculated fingerprint 102 of H(101-5) from the step 102'. After receiving the message 815, the SQL database 302 could use a step 815a to determine the revoked status 806 for all certificates in the parent certificate chain for the server certificate 101-5. Note that the step 815a can return results that are current to less than a minute at the time the step 815a is performed. If any parent certificate in the parent certificate chain for the server certificate 101-5, which is depicted for the certificate table 805 in FIG. 8, has been revoked by a confirmed revoke certificate 210-4 transaction through blockchain network 400, then the first QSBN 301f could receive the message and the SQL database 302 could update the revoked status 806 for a parent certificate 101 specified by the confirmed revoke certificate 210-4 transaction received.

At step 816a, the SQL database 302 can used the certificate table 805 to query in sequence the revoked status 806 for each of the parent certificate 101-6 (using the parent certificate registration number 239 for the H(101-5), and then looking up the revoked status 806 for the parent certificate registration number 239). Then, the SQL database 302 could use the parent certificate registration number 239 for the parent certificate 101-5 depicted as 201-2-1 to lookup the revoked status 806 for the grandparent certificate number 101-3. The process described in the previous two sentences could be repeated until the revoke status 806 for all certificates in the parent certificate chain of the server certificate 101-5 has been read. If none of the parent certificates in the parent certificate chain for the server certificate 101-5 have been revoked, the output of a step 815a can be "OK" or an equivalent designation. If one or more of the parent certificates in the parent certificate chain of the server certificate 101-5 has a status of revoked 806 equal to "yes" or equivalent, then the output of a step 816a can be "Not OK" or "failed", or equivalent.

After a step 816a, the SQL database 302 could send the HTTP/S client 802 a message 817 with the results from a step 816a to check or confirm that any parent certificate in the parent certificate chain for the server certificate 101-5 had been revoked. The message 817 depicted in FIG. 8 illustrates a message 817 for the case that no parent certificate has been revoked at the time of the step 816a. Alternatively, if a parent certificate has been revoked, then the message 817 could return the status of "Not OK", or equivalent. If any of the response messages 813, 815, or 817 return data that the check or verification of queried data for the corresponding query messages 812, 814, or 816 failed or has a status of "Not OK", then the HTTP/S client 802 can send an error response to the HTTP/S server 803 and also display an error to a user of the HTTP/S client 802.

The collection of query messages 812, 814, or 816 and corresponding response messages 813, 815, or 817 can also comprise a single query 818 for current verification of the status for the server certificate cert.server 101-5 and its parent certificate chain. In other words, a single query 818 could be sent from the HTTP/S client 802 to the SQL database 302. For this embodiment, then the depicted steps 812a, 814a, and 816a could be combined into a single step to return a single message with confirmation that all of the depicted information regarding the server certificate 101-5 is either "OK" no "Not OK". In this manner, the messages and communications bandwidth between the HTTP/S client 802 and the SQL database 302 could be reduced. Note that a single query 818 step could also query or check for additional information or status regarding the server certificate 101-5 and its parent certificate chain depicted in the certificate table 805 as described within the next paragraph. For some embodiments, any of the query messages 812, 814, or 816 and corresponding response messages 813, 815, or 817 can be omitted, if the HTTP/S client 802 has other means to acquire or check the corresponding status of the server certificate 101-5 and the parent certificate chain.

Although not depicted in FIG. 8, within the depicted step 818, the HTTP/S client 802 could also send the SQL database 302 a message to query that no certificate within the parent certificate chain for the server certificate 101-5 has expired. Note that the full chain verification step 807 above can check for digital signature 112 verification for all digital signatures within certificates 101 for the parent certificate chain. But, that "pre-compute" process may only need to be completed once at the time when data for all certificates for the parent certificate chain have been received from the blockchain network 400 by the QSBN 301f. That time may be weeks or months prior to the first message 812 from the HTTP/S client 802. Consequently, a separate step for verifying that no parent certificate has expired may be needed by the HTTP/S client 802 at the time the client receives the server certificate 101-5. Consequently, the HTTP/S client 802 could also send the SQL database 302 a message to query if any parent certificate for the server certificate 101-5, identified by the fingerprint 102 of H(101-5) has expired. The SQL database could use the certificate table 805 to query if the current time is greater than the expiration time for any certificate in the parent certificate chain. If no parent certificates have expired, then the SQL database 302 could return a status regarding expirations of "OK". If any parent certificate expired, then the SQL database 302 could return a status regarding expirations of "Not OK".

Although not depicted in FIG. 8, an alternative embodiment supported by the present disclosure is the server certificate cert.server 101-5 can be omitted from the TLS "server hello" response 810, and instead the TLS "server hello" response 810 can simply include either (i) the registration number 239 for the server certificate cert.server 101-5, or (ii) the fingerprint 102 for the server certificate comprising the secure hash value H(101-5). For this embodiment, the message 812 from the HTTP/S client 802 to the SQL database can send either the received registration number 239 or the fingerprint 102. The response 813 can include the full server certificate 101-5. For this embodiment, the step 812a for the SQL database 302 can include both (i) checking the revocation status 806 in a certificate table 805 using either the registration number 239 or the fingerprint 102 (received by the HTTP/S client 802 in the TLS "server hello" response 810, and also (ii) querying the certificate table 805 using either the registration number 239 or the fingerprint 102 to select the server certificate cert-.server 101-5. Note that for the description of the certificate table 805 above, the SQL database 302 can store the server certificate cert.server 101-5 based on (i) storing the URL 234 for the server certificate cert.server 101-5 and (ii) receiving the server certificate cert.server 101-5 using the URL 234. The above step can be completed in the update process 804, which could be completed after the confirmed register certificate 210-3 transaction for certificate 101-5 was received by the first QSBN 301f and before the HTTP/S client 802 transmitted the TLS "client hello" message 809.

After a step 818 to query the status of the server certificate 101-5 and the parent certificate chain, the HTTP/S client 802 could conduct a step 819 in order to complete processing of the TLS "server hello" message 810. The step 819 can include verifying a digital signature verification step 256 depicted and described in connection with FIG. 2a above of a digital signature 215 over data within the TLS "server hello" message 810. Step 819 can also include the processing and generation of data for a TLS "client finished" message. The HTTP/S client 802 can then transmit or send the TLS "client finished" message 820 to the HTTP/S server 803, which can successfully conclude the TLS handshake between the HTTP/S client 802 and the HTTP/S server 803. Upon transmission of the TLS "client finished" message 820 and a corresponding TLS "server finished" message (not shown), the HTTP/S client 802 and the HTTP/S server 803 can agree on shared secret encryption keys for the transfer of authenticated and encrypted application data between the two nodes for a TLS session.

FIG. 8 also includes an exemplary system 800a corresponding to the system 800, where the first network 801a also operates a domain name system (DNS) server 831 for the HTTP/S client 802. DNS can be an essential service for an HTTP/S client 802 in order for the HTTP/S client 802 to resolve names such as within URLs for web pages into IP addresses within the public IP network 108. The HTTP/S client 802 can send DNS queries and receive DNS responses with IP addresses in the messages 831a. A first network 801a can provide the DNS server 831, where a DNS server 831 is a standard service provided by ISPs and large enterprises for computers, servers, and IoT devices connected within the first network 801a. Some cloud services such as Google, Microsoft Azure, and Amazon Web services also provide at least one DNS server 831 to computers and devices connected to their cloud networks.

System 800a illustrates that the ISP or enterprise or cloud service operating as a first network 801a could provide the SQL database 302 and QSBN 301f along with the DNS server 831. The HTTP/S client 802 is depicted as external to the first network 801a, but for some embodiments the HTTP/S client 802 can also be internal to the first network 801a. For a system 800a, the HTTP/S client 802 can determine that a web page or web services from the HTTP/S server 803 are requested based upon a URL. The HTTP/S client 802 can first obtain the IP addresses for the HTTP/S server 803 using the URL via the DNS messages 831a. The HTTP/S client 802 and HTTP/S server 803 can then exchange the TLS "client hello" message 809 and TLS "server hello" message 810 over the public IP network 108, where the TLS "server hello" message 810 includes either (i) the server certificate cert.server 101-5 or (ii) a fingerprint 102 of the server certificate cert.server 101-5.

For the system 800a and embodiments where message 810 includes the cert.server 101-5, the HTTP/S client 802 can then calculate the fingerprint 102 for the server certificate 101-5 comprising the value H(101-5) and send a message 818a with the value H(101-5) to the SQL database 302 within the first network 801a. For a system 800a, the SQL database 302 could then conduct all the steps 812a, 814a, and 816a depicted for a system 800. If the queries or checks for the status of the server certificate 101-5 and the parent certificate chain (with exemplary data depicted for a certificate table 805 in system 800) in steps 812a, 814a, and 816a return with "OK" or an equivalent designation, then the SQL database 302 can send a response message 818b to the HTTP/S client 802 of "OK" and an equivalent designation.

For the system 800a and embodiments where message 810 does not include the cert.server 101-5 but rather includes the fingerprint 102 for the cert.server 101-5, the HTTP/S client 802 can query the SQL database 302 for the server certificate 101-5 using the fingerprint 102. The SQL database 302 can respond with the server certificate 101-5, after also completing all the steps 812a, 814a, and 816a depicted for a system 800. If the queries or checks for the status of the server certificate 101-5 and the parent certificate chain (with exemplary data depicted for a certificate table 805 in system 800) in steps 812a, 814a, and 816a return with "OK" or an equivalent designation, then the SQL database 302 can send a response message 818b to the HTTP/S client 802 of "OK" and an equivalent designation.

The HTTP/S client 802 can then send the TLS "client finished" message 820. Note that the communications between the HTTP/S client 802 and the SQL database 302 can use a same local LAN or private WAN connection as used with the DNS server 831, and the communications between the HTTP/S client 802 and the SQL database 302 can have the equivalent or same level of security as the messages 831a regarding DNS queries. In this manner, communications between the HTTP/S client 802 and the SQL database 302 can be both (i) efficient (by the use of query 818a with H(101-5) and response 818b, and (ii) secure by using the same private network supporting DNS services with a DNS server 831.

FIG. 9

FIG. 9 is a graphical illustration of hardware, firmware, and software components for a quantum safe blockchain node and a quantum safe blockchain validator, in accordance with exemplary embodiments. FIG. 9 is illustrated to include several components that can be common within a quantum safe blockchain node (QSBN) 301 and a quantum safe blockchain validator, or validator 208. QSBN 301 can include or operate with server hardware 105h and the validator 208 can include or operate with device hardware 101u. QSBN 301 may consist of multiple electrical components in order to communicate with a plurality of devices 101 over time. In exemplary embodiments and as depicted in FIG. 9, QSBN 301 can include a processor 901a (depicted as "CPU 901a"), random access memory (RAM) 902a, storage memory 903a (depicted as "nonvolatile memory 903a"), a network interface 904a, a system bus 905a, and a user interface (UI) 906a.

The CPU 901a can comprise a general purpose processor appropriate for higher processing power requirements for a QSBN 301, and may operate with multiple different processor cores. CPU 901a can comprise a processor for QSBN 301 such as an ARM® based processor or an Intel® based processor such as belonging to the XEON® family of processors, and other possibilities exist as well. For some exemplary embodiments, the CPU 901a can be based on a processor using the RISC-V architecture. CPU 901a can utilize bus 905a to fetch instructions from RAM 902a and operate on the instruction. CPU 901a can include components such as registers, accumulators, and logic elements to add, subtract, multiply, and divide numerical values and record the results in RAM 902a or storage memory 903a, and also write the values to an external interface such as network interface 904a. In exemplary embodiments, CPU 901a can perform the mathematical calculations for calculating a secure hash value such as in a step 102', generating a digital signature in a digital signature generation step 255, verifying a digital signature in a digital signature verification step 256, etc. as depicted and described in connection with in FIG. 1, FIG. 2b, etc., above. A CPU 901a could also comprise a "system on a chip" (SOC) with a plurality of cores, including examples of the Amazon Graviton family of processors such as the Graviton 2 or the Apple "M" family of processors such as the M1 MAX, M2, etc.

For a QSBN 301 operating as a virtual machine or a container such as, but not limited to, within Docker or Kubernetes, the QSBN 301 could be allocated a portion of a physical processor CPU 901a from a host operating system in order for the QSBN 301 to conduct processing and computational steps as contemplated herein. The portion of a physical processor CPU 901a for the QSBN 301 could comprise different embodiments without departing from the scope of the present disclosure. A CPU 901a for a QSBN 301 could comprise a "time slice" of a physical SOC within a physical host server (such as repeated brief periods of time on the order of milliseconds or less for CPU 901a) that is shared with other processes or virtual machines running on the host. The CPU 901a for a QSBN 301 could comprise a dedicated (for a period of time) processing core of a physical SOC within a physical host server. Or, the CPU 901a for a server could comprise a combination of the allocation of resources from a physical SOC within a physical host server as described in the previous two sentences.

CPU 901a can also include a secure processing environment 901u in order to conduct post-quantum cryptography (PQC) key digital signature operations and algorithms, such as, but not limited to, (i) conducting digital signature generation and verification functions 255 and 256 depicted and described in connection with FIG. 2a above. A secure processing environment 901u can comprise a dedicated area of silicon or transistors within CPU 901a in order to isolate the digital signature operations from other programs or software operated by CPU 901*a*, including many processes or programs running operating system 902*s*. SPE 901*u* could contain RAM memory equivalent to RAM 902*a* and non-volatile memory equivalent to storage memory 903*a*, as well as a separately functioning processor on a smaller scale than CPU 901*a*, such as possibly a dedicated processor core within CPU 901*a*. SPE 901*u* can comprise a "secure enclave" or a "secure environment", based on the manufacturer of CPU 901*a*. In some exemplary embodiments, an SPE 901*u* can be omitted and the CPU 901*a* can conduct PQC digital signature and general cryptographic calculations without an SPE 901*u*.

A processor 901*a* for QSBN 301 could include a hardware random number generator 901*r*. The hardware random number generator 901*r* can use a sensor such as a sensor in QSBN 301 to collect environmental noise measurements such as silicon thermal noise, noise values within RAM or nonvolatile memory cells, and other possibilities exist as well for a hardware random number generator 901*r* to collect noise or environmental data for the processor to calculate a random number. The random number or a secure hash value over the random number can also be used to generate the private key SK.QSBN 206*a* for the QSBN 301 in step 402 of FIG. 4 above. Other random numbers used by a QSBN 301 herein can be generated with hardware random number generator 901*r*.

RAM 902*a* may comprise a random access memory for QSBN 301. RAM 902*a* can be a volatile memory providing rapid read/write memory access to CPU 901*a*. RAM 902*a* could be located on a separate integrated circuit in QSBN 301 or located within CPU 901*a*. The RAM 902*a* can include data recorded in QSBN 301 for the operation when communicating with a blockchain network 400 in FIG. 3 or an SQL database 302 (if SQL database 302 operates externally to QSBN 301). RAM 902*a* may be connected to CPU 901*a* using a system bus 905*a* which could comprise a memory bus, such as supporting DDR5 RAM memory and other possibilities exist as well. As depicted and described in connection with FIG. 9, RAM 902*a* could also include an operating system 902*s*, or components of an operating system 902*s* such as a kernel, and other components of operating system 902*s*, such as some supporting libraries could be stored within storage memory 903*a*. In other words, although operating system (OS) 902*s* is depicted in FIG. 9 as being stored within RAM 902*a*, some portions of OS 902*s* could be stored within nonvolatile memory 903*a* when QSBN 301 sleeps or is powered down.

The system bus 905*a* may be any of several types of bus structures including a memory bus or memory controller, a peripheral bus, and a local bus using any of a variety of bus architectures including a data bus. System bus 905*a* connects components within QSBN 301 as illustrated in FIG. 9, such as transferring electrical signals between the components illustrated. QSBN 301 can include multiple different versions of bus 905*a* to connect different components, including a first system bus 905*a* between CPU 901*a* and RAM 902*a* (which could be a memory bus), and a second system bus 905*a* between CPU 901*a* and network interface 904*a*, which could be a PCIe bus, or similar data busses.

In exemplary embodiments, RAM 902*a* operating with QSBN 301 can record values and algorithmic steps or computer instructions for securely conducting steps supporting communications with a blockchain network 400. RAM 902*a* may store the computer executable instructions for conducting the steps and associated variables and values or constants for storing and processing transactions 210 in FIG. 2*a*, input 272 in FIG. 5, input 273 in FIG. 6, digital signature generation 255 and digital signature verification 256 in FIG. 2*a*, step 503 to generate a pending transaction 210-3' in FIG. 5, step 603 to generate a pending transaction 210-4' in FIG. 6, step 710 for receiving and processing blocks 210, and parameters 243 for processing digital signatures with PQC. The exemplary steps or data for steps depicted in RAM 902*a* listed in the above sentence can comprise computer executable instructions for the processor CPU 901*a* as well as memory cells for storing constants and variables associated with conducting the computer executable instructions. The computer executable instructions for the different steps can be stored in storage memory 903*a* when the QSBN 301 is powered off or in an extended sleep state (such as greater than 10 seconds). The computer executable instructions can be moved by an OS 902*s* from the storage memory 903*a* to the RAM 902*a* during a boot process or a process for the QSBN 301 to begin supporting communications with at least one validator 208.

Note that the associated data or values for the steps can also be stored within RAM 902*a* for a period of time to both conduct the step and use the resulting data in subsequent steps. As one example, in a step 255 to generate a digital signature 215 (depicted and described in connection with FIG. 2*a* above), the output from a step 255 comprising a digital signature 215 can be stored in RAM 902*a* and be input into a step 503 to generate a pending transaction 210-3'. In other words and as one example, the depiction of a step 255 in RAM 902*a* can include both (i) the computer executable instructions to conduct the step and (ii) the data or values associated with the step such as the digital signature 215 generated or processed by the step. Consequently, a step depicted in RAM 902*a* can include all of the associated data and instructions or logic to conduct the step, where details for the steps are depicted in the Figures above.

As another example for RAM 902*a* within QSBN 301 or allocated to QSBN 301, RAM 902*a* could store both computer executable instructions and associated values for a step 603 as depicted in FIG. 6 above. The step 603 within RAM could include the data from message 602 and an identifier for a certificate 101 to revoke. For some data within RAM 902*a* for step 603, the data for a step 603 could comprise a pointer within RAM 902*a* for a step 603, such that the data could be recorded or stored within RAM 902*a* in a different location within RAM 902*a* than the memory allocated to data for step 603 within RAM 902*a*. For embodiments where CPU 901*a* includes an SPE 901*u*, then the data for step 603 (such as the private key SK.QSBN 206 for generating a digital signature 215 of the revoke certificate transaction) could be stored within RAM memory within the SPE 901*u* instead of general RAM 902*a* for the QSBN 301.

Nonvolatile memory 903*a* or "storage memory" 903*a* (which can also be referred to herein as "memory 903*a*") within QSBN 301 can comprise a non-volatile memory for long-term storage of data, including times when QSBN 301 may be powered off or within an extended sleep state such as a sleep state longer than a few seconds. Memory 903*a* may be a NAND flash memory or a NOR flash memory and record firmware for QSBN 301, such as a bootloader program and OS 902*s*. Memory 903*a* can record long-term and non-volatile storage of data or files for QSBN 301. In an exemplary embodiment, OS 902*s* is recorded in memory 903*a* when QSBN 301 is powered off, and portions of memory 903*a* are moved by CPU 901*a* into RAM 902*a* using a boot loader when QSBN 301 powers on.

Memory 903*a* (i) can be integrated with CPU 901*a* into a single integrated circuit (potentially as a "system on a chip"), or (ii) operate as a separate integrated circuit or a removable card or "disk", such as a solid state drive (SSD). Storage memory 903a can also comprise a plurality of spinning hard disk drives in a redundant array of independent disks (RAID) configuration. Memory 903a may also be referred to as "server storage" and can include exemplary file systems of FAT16, FAT 32, NTFS, ext3, ext4, UDF, or similar file systems. As contemplated herein, the terms "memory 903a", "storage memory 903a", and "nonvolatile memory 903a" can be considered equivalent. As depicted in FIG. 9, non-volatile memory 903a can record an identity 117 for the QSBN 301, and address 404 for the QSBN 301, a public key PK.QSBN 206, and a nonce 206n. In exemplary embodiments where the blockchain system 200 operates with the XMSS or LMS hash-based digital signature algorithms 115, the secure storage of the last nonce 206n in the form of a one-time signature index can be important for the secure operation of a QSBN 301. Consequently the last used nonce 206n can be stored in nonvolatile memory 903a. For some embodiments, the nonce 206n as the one-time signature index can be stored within nonvolatile memory within the SPE 901u within CPU 901a.

Additional data stored within nonvolatile memory 903a can be the supported PQC parameters 111 related to processing digital signatures, and the digital signature algorithms 115 for processing digital signatures, such as XMSS, LMS, Dilithium, Falcon, and SPHINCS+. The computer executable code for the step 804 to periodically and continuously synchronize the data within the blockchain 200 stored within QSBN 301 and the SQL database 302 could be stored within nonvolatile memory 903a. Memory 903a could also store the SQL database 302 for some embodiments where the QSBN 301 also operates the SQL database 302. The entire blockchain 200 and address algorithm 411 from FIG. 4 could be stored within nonvolatile memory 903a for the QSBN 301. Memory 903a could store a balance 907a in coins or tokens that belong to the address 404 or public key PK.QSBN 206. The amounts 214 to transfer or "pay" for transactions 210 and gas can be deducted from the balance 907a. Payment transactions to QSBN 301 and address 404 can increase the balance 907a. For embodiments where the QSBN 301 also operates as a validator 208, then QSBN 301 can increase the balance 907a according to the block generation algorithm 290 based on processing and generating a block 201. For some embodiments, the private key SK.QSBN 206s corresponding to the public key PK.QSBN 206 can be stored within the nonvolatile memory 903a.

When QSBN 301 is powered off, nonvolatile memory 903a can store an operating system (OS) 902s. When QSBN 301 is powered on, RAM memory 902a could store portions of the OS 902s'. The operating system (OS) 902s can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 903a, etc. The operating system 902s may include timers and schedulers for managing the access of software to hardware resources within QSBN 301, where the hardware resources managed by OS 902s can include CPU 901a, RAM 902a, nonvolatile memory 903a, and system bus 905a, and well as connections to the IP network 107 via network interface 904a. The operating system shown of 902s can be appropriate for a higher power computing device with more memory and CPU resources. Example operating systems 902s for a QSBN 301 includes Linux or Windows® Server, and other possibilities exist as well.

The OS 902s in FIG. 9 can contain algorithms, programs, or computer executable instructions (by processor 901a or SPE 901u) for communicating with a blockchain network 400. Example steps depicted include the steps to process the transmission of a pending transaction 210-3 and receiving a confirmed transaction 210-4. An OS 902s can also include the executable instructions for processor 901a to send messages, such as but not limited to, a pending transaction 210-3' as depicted and described above in connection with FIG. 5. In other words, OS 902s can include libraries and drivers such that IP packets containing the pending transaction 210-3' could be assembled based on the output and data from the 503 depicted and described in connection with FIG. 5, and then the OS 902s could write the data for IP packets via the system bus 905a to the network interface 904a, where the network interface 904a can subsequently transmit the IP packets with the pending transaction 210-3' to the IP network 108 and blockchain network 400. Equivalent steps by OS 902s could be taken to receive IP packets with a confirmed transaction 210-4 or a different confirmed transaction 210-3.

An OS 902s can also include the executable instructions for processor 901a to receive messages such as, but not limited to, a message with confirmed transactions 210 including confirmed transactions 210-3 and 210-4 as depicted and described above in connection with FIG. 5 and FIG. 6. In other words, OS 902s can include libraries and drivers such that the data for the transactions could be received from the public TP network 108 using the network interface 904a and system bus 905a. The OS 902s could parse the data received in a series of packets for the message contain transactions 210 and store contents from the transactions in RAM 902a such that the QSBN 301 could conduct the subsequent steps using the data from the transactions 210. The OS 902s could write data from the transactions 210 to RAM 902a, and then the computer executable steps in RAM 902a or nonvolatile memory 903a such as associated with step 804 to update the SQL database 302 could process the data from a transaction 210.

QSBN 301 can include a network interface 904a to communicate with public IP network 108 and a blockchain network 400 or other QSBN 301, as depicted in FIG. 3 and FIG. 4 above. Network interface 904a can comprise either a wired connection such as Ethernet or a wireless connection. For wireless configurations of QSBN 301, then network interface 904a can comprise a radio, which could connect with an antenna in order to transmit and receive radio frequency signals. For a wireless configuration of QSBN 301, network interface 904a within QSBN 301 can provide connectivity to a public IP network 108 through Wi-Fi or 3GPP standards such as 4G LTE, and 5G networks, or subsequent and similar standards.

Although not depicted in FIG. 9, QSBN 301 may also operate a LAN interface, where LAN interface can be used to connect and communicate with other servers in a network such as networks 701a and 701b in FIG. 7 and network 801a and 801b in FIG. 8. For some exemplary embodiments such as depicted for system 800a, the SQL database 302 could be external to QSBN 301, and the two entities can communication through a LAN interface comprising a physical interface connected to system bus 905a for QSBN 301. In exemplary embodiments, a LAN interface for QSBN 301 can comprise an Ethernet or fiber optic physical connection. In other words, (i) a LAN interface can connect QSBN 301 to private network (which could comprise an IP network with private IP addresses that are not globally routable), and (ii) network interface 904a can comprise an interface for communicating with a blockchain network 400 through potentially insecure networks such as the globally routable public Internet. The use of a separate network interface 904*a* and a separate LAN interface can increase the security of operation for QSBN 301. However, the use of separate physical interfaces for a LAN interface and a network interface 904*a* can be omitted, and a single physical interface such as Ethernet or fiber-optic could be used by QSBN 301 to communicate with (i) computers within a network such as networks 701*a* and 701*b* in FIG. 7 and network 801*a* and 801*b* in FIG. 8, and (ii) a blockchain network 400 as depicted and described in connection with FIG. 4.

QSBN 301 may also optionally include user interface 906*a* which may include one or electrical components for receiving inputs and/or one or more electrical components for conveying outputs. User interfaces are known in the art and thus user interfaces are not described in detail here. User interface 906*a* could comprise a touch screen or screen display with keyboard and mouse, if QSBN 301 has sophisticated interaction with a user, such as a network administrator. QSBN 301 can optionally omit a user interface 906*a*, if no user input or display is required for establishing communications within a network such as networks 701*a* and 701*b* in FIG. 7 and network 801*a* and 801*b* in FIG. 8 or public IP network 108.

Although not depicted in FIG. 9, QSBN 301 can include other components to support operation, such as a clock, power source or power connection, antennas, etc. Other possibilities exist as well for hardware and electrical components operating in a QSBN 301 without departing from the scope of the present disclosure. Using the electrical components depicted in FIG. 9, a QSBN 301 could send transactions 210 and receive blocks 201 in order to conduct communications with a blockchain network 400 comprising a plurality of other QSBN 301 and quantum safe blockchain clients (QSBC) 304. Note that a QSBC 304 could also include the exemplary hardware, firmware, and software components depicted for the QSBN 301 in FIG. 9, with equivalent functionality as described above for the QSBN 301.

Validator 208 may consist of multiple electrical components in order to communicate with a plurality QSBN 301 or QSBC 304 for a blockchain network 400 over time. In exemplary embodiments and as depicted in FIG. 9, validator 208 with server hardware 105*v* can include a processor 901*b* (depicted as "CPU 901*b*"), random access memory (RAM) 902*b*, storage memory 903*b* (depicted as "nonvolatile memory 903*b*", a network interface 904*b*, a system bus 905*b*, and a user interface (UI) 906*b*. For some embodiments, a validator 208 also operate within a QSBN 301, and for these embodiments then the physical hardware depicted for the validator 208 in FIG. 9 can be the same as the physical hardware for the QSBN 301.

The CPU 901*b* can comprise a general purpose processor appropriate for processing power requirements for a validator 208, and may operate with multiple different processor cores. CPU 901*b* can comprise a processor for validator 208 such as an ARM® based processor or an Intel® based processor, and other possibilities exist as well. For some exemplary embodiments, the CPU 901*b* can be based on a processor using the RISC-V architecture. CPU 901*b* can utilize bus 905*a* to fetch instructions from RAM 902*b* and operate on the instruction. CPU 901*b* can include components such as registers, accumulators, and logic elements to add, subtract, multiply, and divide numerical values and record the results in RAM 902*b* or storage memory 903*b*, and also write the values to an external interface such as network interface 904*b*. In exemplary embodiments, CPU 901*b* can perform the mathematical calculations for the quantum resistant virtual machine 280 to process smart contract input such as input 272 for contract 231 and input 273 for contract 238, as depicted and described in connection with in FIG. 5 and FIG. 6 above. A CPU 901*b* could also comprise a "system on a chip" (SOC) with a plurality of cores, including examples of the Apple "M" family of processors such as the M1 MAX, M2, etc.

For validator 208 operating as a server, then the validator 208 could also operate as a virtual machine or a container such as, but not limited to, within Docker or Kubernetes. The validator 208 could be allocated a portion of a physical processor CPU 901*b* from a host operating system in order for the validator 208 to conduct processing and computational steps as contemplated herein. The portion of a physical processor CPU 901*b* for the validator 208 could comprise different embodiments without departing from the scope of the present disclosure. A CPU 901*b* for a validator 208 could comprise a "time slice" of a physical SOC within a physical host computing device (such as repeated brief periods of time on the order of milliseconds or less for CPU 901*b*) that is shared with other processes or virtual machines running on the host. The CPU 901*b* for a validator 208 could comprise a dedicated (for a period of time) processing core of a physical SOC within a physical host server. Or, the CPU 901*b* for a validator 208 could comprise a combination of the allocation of resources from a physical SOC within a physical host computing device as described in the previous two sentences.

CPU 901*b* can also include a secure processing environment (SPE) 901*v* equivalent to the SPE 901*u* for the QSBN 301 described above in FIG. 9 The SPE 901*v* can conduct post-quantum cryptography (PQC) digital signature operations and algorithms, such as, but not limited to the digital signature verification step 256 depicted and described in connection with FIG. 2*b* above. SPE 901*v* can comprise a dedicated area of silicon or transistors within CPU 901*b* in order to isolate the PQC digital signature operations from other programs or software operated by CPU 901*b*, including many processes or programs running operating system 902*s*'. SPE 901*u* could contain RAM 902*b*' memory equivalent to RAM 902*b* and nonvolatile memory equivalent to storage memory 903*b*, as well as a separately functioning processor on a smaller scale than CPU 901*b*, such as possibly a dedicated processor core within CPU 901*b*. SPE 901*v* can comprise a "secure enclave" or a "secure environment", based on the manufacturer of CPU 901*b*. In some exemplary embodiments, an SPE 901*v* can be omitted and the CPU 901*b* can conduct digital signature operations and general cryptographic calculations without an SPE 901*v*.

A processor 901*b* for validator 208 could include a hardware random number generator 901*r*. The hardware random number generator 901*r* can use a sensor in validator 208 to collect environmental noise measurements such as silicon thermal noise, noise values within RAM or nonvolatile memory cells, and other possibilities exist as well for a hardware random number generator 901*r* to collect noise or environmental data for the processor to calculate a random number. The random number or a secure hash value over the random number can also be used to generate the private key SK.V 206 for the validator.

RAM 902*b* may comprise a random access memory for validator 208. RAM 902*b* can be a volatile memory providing rapid read/write memory access to CPU 901*b*. RAM 902*b* could be located on a separate integrated circuit in validator 208 or located within CPU 901*b*. The RAM 902*b* can include data recorded in validator 208 for supporting communications with a QSBN 301 or blockchain network 400 as depicted and described in connection with FIGS. 4, 5, and 6. RAM 902*b* may be connected to CPU 901*b* using a system bus 101*t* which could comprise a memory bus, such as supporting DDR5 RAM memory and other possibilities exist as well. RAM 902*b* could also include an operating system 902*s'*, or components of an operating system 902*s'* such as a kernel, and other components of operating system 902*s'*, and some supporting libraries could be stored within nonvolatile memory. In other words, although operating system (OS) 902*s'* is depicted in FIG. 9 as being stored within RAM 902*b*, some portions of OS 902*s'* could be stored within nonvolatile memory 903*b*.

The system bus 905*b* may be any of several types of bus structures including a memory bus or memory controller, a peripheral bus, and a local bus using any of a variety of bus architectures including a data bus. System bus 905*b* connects electrical components within validator 208 as illustrated in FIG. 9, such as transferring electrical signals between the components illustrated. Validator 208 can include multiple different versions of bus 905*b* to connect different components, including a first system bus 905*b* between CPU 901*b* and RAM 902*b* (which could be a memory bus), and a second system bus 905*b* between CPU 901*b* and network interface 904*b*, which could be a PCIe bus or similar data busses.

In exemplary embodiments, RAM 902*b* operating with validator 208 can record values and algorithmic steps or computer instructions for securely converting received pending transactions 210' into confirmed transactions 210. RAM 902*b* may store the computer executable instructions for conducting the steps and associated variables and values or constants for generating confirmed transactions 210, processing input 272 for contract 231 and input 273 for contract 238, a digital signature verification step 256, block generation algorithm 290, step 510 for processing pending transactions 210-3', step 610 for processing pending transactions 210-4', address creation step 411, and QRVM 280. The depicted components for QRVM 280 were also depicted and described for a validator 280 in FIG. 2*a* above.

The exemplary data depicted in RAM 902*b* listed above can comprise computer executable instructions for the processor CPU 901*b* as well as memory cells for storing constants and variables associated with conducting the computer executable instructions. The computer executable instructions for the different steps can be stored in storage memory 903*b* when the validator 208 is powered off or in an extended sleep state (such as greater than an hour). The computer executable instructions can be moved by an OS 902*s'* from the storage memory 903*b* to the RAM 902*b* during a boot process or a process for the validator 208 to begin supporting communications with blockchain network 400.

Note that the associated data or values for the steps can also be stored within RAM 902*b* for a period of time to both conduct the step and use the resulting data in subsequent steps. As one example, in a step 256 to verify a digital signature 215 (depicted and described in connection with FIG. 2*a* above), the output from a step 256 comprising a pass/fail value 245 can be stored in RAM 902*b* and be input into a step 508 to generate a confirmed transaction 210-3. In other words and as one example, the depiction of a step 256 in RAM 902*a* can include both (i) the computer executable instructions to conduct the step and (ii) the data or values associated with the step such as the pass/fail value 245 generated or processed by the step. Consequently, a step depicted in RAM 902*a* can include all of the associated data and instructions or logic to conduct the step, where details for the steps are depicted in the Figures above.

Nonvolatile memory 903*b* or "storage memory" 903*b* (which can also be referred to herein as "memory 903*b*") within validator 208 can comprise a non-volatile memory for long-term storage of data, including times when validator 208 may be powered off or within an extended sleep state such as a sleep state longer than several minutes. Memory 903*b* may be a NAND flash memory or a NOR flash memory and record firmware for validator 208, such as a bootloader program and OS 902*s'*. Memory 903*b* can record long-term and non-volatile storage of data or files for validator 208. In an exemplary embodiment, OS 902*s'* is recorded in memory 903*b* when validator 208 is powered off, and portions of memory 903*b* are moved by CPU 901*b* into RAM 902*b* using a boot loader when validator 208 powers on.

Memory 903*b* (i) can be integrated with CPU 901*b* into a single integrated circuit (potentially as a "system on a chip"), or (ii) operate as a separate integrated circuit or a removable card or "disk", such as a solid state drive (SSD). Storage memory 903*b* can also comprise a plurality of spinning hard disk drives in a redundant array of independent disks (RAID) configuration. Memory 903*b* may also be referred to as "device storage" and can include exemplary file systems of FAT16, FAT 32, NTFS, ext3, ext4, UDF, or similar file systems. As contemplated herein, the terms "memory 903*b*", "storage memory 903*b*", and "nonvolatile memory 903*b*" can be considered equivalent. As depicted in FIG. 9, non-volatile memory 903*a* can record an address 404 for validator 208, a public key PK.V 206, the entire blockchain 200 and an address algorithm 411 from FIG. 4 could be stored within nonvolatile memory 903*a* for the validator 208. Memory 903*a* could store a balance 907*b* in coins or tokens that belong to the address 404 or public key PK.V 206. The address or public key PK.V 206 could be credited with a reward 445 in coins or tokens when the validator 208 proposes an accepted block 201 for blockchain network 400. Additional data stored within nonvolatile memory 903*a* can be the supported PQC parameters 111 related to processing digital signatures, and the digital signature algorithms 115 for processing digital signatures, such as XMSS, LMS, Dilithium, Falcon, and SPHINCS+.

When validator 208 is powered off, nonvolatile memory 903*b* can store an operating system (OS) 902*s'*. When validator 208 is powered on, RAM memory 902*b* could store portions of the OS 902*s'*. The operating system (OS) 902*s'* can include Internet protocol stacks such as a User Datagram Protocol (UDP) stack, Transmission Control Protocol (TCP) stack, a domain name system (DNS) stack, a TLS stack, a boot process loaded by a boot loader from storage memory 903*b*, etc. The operating system 902*s'* may include timers and schedulers for managing the access of software to hardware resources within validator 208, where the hardware resources managed by OS 902*s'* can include CPU 901*b*, RAM 902*b*, nonvolatile memory 903*b*, and system bus 905*b*, and well as connections to the public IP network 108 via a network interface 904*b*.

OS 902*s'* for validator 209 in FIG. 9 can contain algorithms, programs, or computer executable instructions (by processor 901*b* or SPE 901*v*) for communicating with a blockchain network 400. Example steps depicted include the steps to process the transmission of a pending transaction 210-3 and receiving a confirmed transaction 210-4. An OS 902*s* can also include the executable instructions for processor 901*b* to send messages, such as but not limited to, a block 201 as depicted and described above in connection with FIG. 3 and FIG. 4. In other words, OS 902*s*' can include libraries and drivers such that IP packets containing the block 201 could be assembled based on the output and data from the step 510 depicted and described in connection with FIG. 5, and then the OS 902*s*' could write the data for IP packets via the system bus 905*b* to the network interface 904*b*, where the network interface 904*b* can subsequently transmit the IP packets with the block 201 to the IP network 108 and blockchain network 400. Equivalent steps by OS 902*s* could be taken to receive IP packets with a pending transaction 210-3' or a different pending transaction 210'.

An OS 902*s*' can also include the executable instructions for processor 901*b* to receive messages such as, but not limited to, a message with pending transactions 210' including pending transactions 210-3' and 210-4' as depicted and described above in connection with FIG. 5 and FIG. 6. In other words, OS 902*s*' can include libraries and drivers such that the data for the transactions could be received from the public IP network 108 using the network interface 904*b* and system bus 905*b*. The OS 902*s*' could parse the data received in a series of packets for the message contain transactions 210' and store contents from the transactions in RAM 902*b* such that the validator 208 could conduct the subsequent steps using the data from the pending transactions 210'. The OS 902*s*' could write data from the pending transactions 210' to RAM 902*b*, and then the computer executable steps in RAM 902*b* or nonvolatile memory 903*b* such as associated with step 610 to convert the data from a pending transaction 210-4' into a confirmed transaction 210-4 within a block 201.

Validator 208 can include a network interface 904*b* to communicate with public IP network 108 and a blockchain network 400 or other QSBN 301, as depicted in FIG. 4 above. Network interface 904*b* can comprise either a wired connection such as Ethernet or a wireless connection. For wireless configurations of validator 208, then network interface 904*b* can comprise a radio, which could connect with an antenna in order to transmit and receive radio frequency signals. For a wireless configuration of validator 208, network interface 904*b* within validator 208 can provide connectivity to a public IP network 108 through Wi-Fi or 3GPP standards such as 4G LTE, and 5G networks, or subsequent and similar standards.

Validator 208 may also optionally include user interface 906*b* which may include one or electrical components for receiving inputs and/or one or more electrical components for conveying outputs. User interfaces are known in the art and thus user interfaces are not described in detail here. User interface 906*b* could comprise a touch screen or screen display with keyboard and mouse, if validator 208 has sophisticated interaction with a user, such as a network administrator. Validator 208 can optionally omit a user interface 906*b*, if no user input or display is required for establishing communications blockchain network 400 or public IP network 108.

Although not depicted in FIG. 9, validator 208 can include other components to support operation, such as a clock, power source or power connection, antennas, etc. Other possibilities exist as well for hardware and electrical components operating in a validator 208 without departing from the scope of the present disclosure. Using the electrical components depicted in FIG. 9, a validator 208 could send receive blocks 201 and transmit blocks 201 generated by validator 208 in order to conduct communications with a blockchain network 400 comprising a plurality of other QSBN 301 and quantum safe blockchain clients (QSBC) 304.

Although not depicted in FIG. 9, and SQL database 302 could include the exemplary hardware components and several software components for the QSBN depicted in FIG. 9. The SQL database could include a processor 901, random access memory (RAM) 902, storage memory 903, a network interface 904, a system bus 905, and a user interface 906. The RAM memory could include executable instructions 804 (in FIG. 8) for a periodic update process to record data from confirmed blocks 201 received by a QSBN 301. The RAM memory 902 or storage memory 903 could include executable instructions for the full chain verification step 807. The storage memory 903 could include tables related to certificates such as certificate table 805 (in FIG. 8). The storage memory 903 could include an operating system. The network interface 904 could communicate with both SQL clients 303 and QSBN 301, for embodiments where QSBN 301 operates on a server or collection of servers with server hardware 105*n*.

CONCLUSION

Various exemplary embodiments have been described above. Those skilled in the art will understand, however, that changes and modifications may be made to those examples without departing from the scope of the claims.

The invention claimed is:

1. A method for a quantum safe blockchain node to generate a pending register certificate transaction, the method performed by the quantum safe blockchain node (QSBN), the method comprising:
   a) storing in a nonvolatile memory (i) a post-quantum cryptography (PQC) digital signature algorithm, (ii) a private key and corresponding public key for the PQC digital signature algorithm, (iii) a one-time signature (OTS) index value associated with the public key, and (iv) a contract address for a register certificate transaction;
   b) receiving, via a network interface, a uniform resource locator (URL) for a certificate, an address for an owner of the certificate, a first registration number for a parent certificate of the certificate, and at least one of a fingerprint for the certificate and the certificate;
   c) storing, in a RAM memory, data for a pending register certificate transaction comprising the public key, a transaction nonce comprising the OTS index value, a transaction amount, the address for the owner, the fingerprint for the certificate, the URL, the first registration number, and an expiration time for the certificate;
   d) generating, by a processor, a PQC digital signature using the PQC digital signature algorithm, the private key, and the OTS index value, the PQC digital signature over at least the data for the pending register certificate transaction;
   e) transmitting, by the network interface, to a blockchain network the data for the pending register certificate transaction and the digital signature and receiving a confirmed register certificate transaction for a block, the data, the digital signature, and a second registration number for the certificate; and
   f) storing, from the confirmed register certificate transaction, at least the fingerprint for the certificate, the first registration number for the parent certificate, and the second registration number for the certificate.

2. The method of claim 1, wherein the PQC digital signature algorithm comprises the e Xtended Merkle Signature Scheme (XMSS) or the Leighton-Micali Signature (LMS) algorithm.

3. The method of claim 1, wherein the PQC digital signature algorithm comprises the CRYSTALS-Dilithium algorithm.

4. The method of claim 1, wherein the fingerprint for the certificate is computed using a secure hash function comprising SHA-2, SHA-3, or SHAKE256.

5. The method of claim 1, wherein the QSBN verifies that the fingerprint is not already present in a local ledger or database prior to transmitting the pending register certificate transaction.

6. The method of claim 1, wherein the address for the owner of the certificate is a quantum safe public key corresponding to a stateless signature algorithm.

7. The method of claim 1, further comprising:

prior to transmitting the pending register certificate transaction, verifying that the transaction amount meets or exceeds a required minimum token value associated with the contract address.

8. The method of claim 1, wherein the contract address is associated with a quantum safe smart contract deployed on a blockchain virtual machine supporting post-quantum cryptographic execution.

9. The method of claim 1, wherein the transaction nonce is selected to be equal to the OTS index value used in generating the digital signature.

10. The method of claim 1, wherein the confirmed register certificate transaction is stored in a relational SQL database linked to the QSBN.

11. The method of claim 1, further comprising:

generating the fingerprint for the certificate by computing a hash of the DER-encoded representation of the certificate.

12. The method of claim 1, wherein the certificate is an X.509 version 3 certificate.

13. The method of claim 1, further comprising:

storing a record associating the second registration number with a block number and a transaction index within the block.

14. The method of claim 1, wherein the QSBN is configured to receive the certificate from the URL and independently verify that its hash matches the received fingerprint.

15. The method of claim 1, further comprising:

g) generating, by the processor, a pending certificate revocation transaction comprising the fingerprint for the certificate and a revocation reason code.

16. The method of claim 15, wherein the pending certificate revocation transaction further comprises the address for the owner of the certificate and the second registration number for the certificate.

17. The method of claim 15, further comprising:

h) generating, by the processor, a second PQC digital signature over the revocation transaction using the private key and an incremented OTS index value.

18. The method of claim 17, wherein the revocation transaction is transmitted to a smart contract address associated with a quantum safe revocation contract on the blockchain.

19. The method of claim 15, wherein the revocation transaction is stored in a block along with a timestamp and transaction identifier, and the QSBN stores the revocation status in a local database.

20. The method of claim 15, further comprising:

retrieving the confirmed revocation transaction from the blockchain and verifying the stored revocation status prior to responding to queries regarding the certificate.

\* \* \* \* \*